(12) United States Patent
Davidson et al.

(10) Patent No.: US 7,555,157 B2
(45) Date of Patent: Jun. 30, 2009

(54) SYSTEM AND METHOD FOR TRANSFORMING GRAPHICAL IMAGES

(76) Inventors: Geoff Davidson, 4622 Davidson Road, Inverary, Ontario (CA) K0H 1X0; Glen Arendt, 449 Scuttlehold Road, RR 1, Plainfield, Ontario (CA) K0K 2V0; John P. Mellor, 106 Country Club Rd., Terre Haute, IN (US) 47803; John Davidson, 4622 Davidson Road, Inverary, Ontario (CA) K0H 1X0

( * ) Notice: Subject to any disclaimer, the term of this patent is extended or adjusted under 35 U.S.C. 154(b) by 1025 days.

(21) Appl. No.: 10/236,269

(22) Filed: Sep. 6, 2002

(65) Prior Publication Data

US 2003/0086603 A1    May 8, 2003

Related U.S. Application Data

(60) Provisional application No. 60/318,214, filed on Sep. 7, 2001.

(51) Int. Cl.
*G06K 9/00* (2006.01)
(52) U.S. Cl. ....................................... 382/154
(58) Field of Classification Search ........................ None
See application file for complete search history.

(56) References Cited

U.S. PATENT DOCUMENTS

| | | |
|---|---|---|
| 891,013 A | 6/1908 | Smith |
| 1,527,733 A | 2/1925 | Heise |
| 2,350,796 A | 6/1944 | Morioka |

(Continued)

FOREIGN PATENT DOCUMENTS

EP    0 244 636 A1    11/1987

(Continued)

OTHER PUBLICATIONS

Peden, Douglas D., Bridges of Mathematics, Art, and Physics, available at www.mi.sanu.ac.yu/vismath/pedens/index.html, visited on Jul. 29, 2002.

(Continued)

*Primary Examiner*—Matthew C. Bella
*Assistant Examiner*—Alex Liew
(74) *Attorney, Agent, or Firm*—Ice Miller LLP; Thomas A. Walsh

(57) ABSTRACT

A system and a method for transforming graphical images. Graphical images are adapted by the present invention to be applied to a three-dimensional topography of a substrate. After the image is applied to the substrate, the image then appears in proportion and conforms to the (topography of the substrate. In an embodiment, the present invention comprises a method for creating at least one transformed graphical image. The topography of a substrate is measured by using a digitizing apparatus to obtain at least one image of the topography of a measurement article. The digitizing apparatus comprises at least one sensor that is electronically interconnected with a computer memory. The at least one image of the measurement article is transmitted into the computer memory. A graphical image is transformed in computer memory in accordance with the measurements of the topography of the measurement article to result in a transformed graphical image.

16 Claims, 36 Drawing Sheets
(8 of 36 Drawing Sheet(s) Filed in Color)

U.S. PATENT DOCUMENTS

| | | | |
|---|---|---|---|
| 3,085,923 A | | 4/1963 | Agnew |
| 3,185,602 A | | 5/1965 | Morioka |
| 3,544,402 A | | 12/1970 | Agnew |
| 3,580,758 A | | 5/1971 | Morioka |
| 3,884,577 A | | 5/1975 | Carpentier |
| 4,239,359 A | | 12/1980 | Morioka |
| 4,752,964 A | * | 6/1988 | Okada et al. ............... 382/154 |
| 4,846,577 A | | 7/1989 | Grindon |
| 4,931,817 A | | 6/1990 | Morioka |
| 5,040,005 A | | 8/1991 | Davidson et al. |
| 5,280,305 A | | 1/1994 | Monroe et al. |
| 5,363,159 A | | 11/1994 | Melvin |
| 5,768,643 A | | 6/1998 | Morioka |
| 5,926,388 A | | 7/1999 | Kimbrough et al. |
| 6,009,190 A | * | 12/1999 | Szeliski et al. ............. 382/154 |
| 6,081,659 A | | 6/2000 | Garza et al. |
| 6,125,197 A | * | 9/2000 | Mack et al. ................ 382/154 |
| 6,253,164 B1 | | 6/2001 | Rohm et al. |
| 6,401,002 B1 | | 6/2002 | Jang et al. |
| 6,405,095 B1 | * | 6/2002 | Jang et al. .................. 700/118 |
| 6,445,969 B1 | | 9/2002 | Kenney et al. |
| 6,594,381 B2 | * | 7/2003 | Tsap et al. ................. 382/154 |
| 7,027,048 B2 | * | 4/2006 | Brombolich ............... 345/420 |

FOREIGN PATENT DOCUMENTS

| | | |
|---|---|---|
| FR | 2 768 967 A1 | 4/1999 |
| GB | 2 227 334 A | 7/1990 |
| WO | WO 94/27198 | 11/1994 |

OTHER PUBLICATIONS

Mellor, J.P., Geometry and Texture from Thousands of Images, *Structure from Multiple Images Of Large-Scale Environment*, (in conjunction with the European Conference on Computer Vision), Jul. 1-2, 2000, Dublin, Ireland.

Mellor, J.P.; Teller, Seth; Lozano-Perez, Tomas; Dense Surface Patches from Thousands of Pose Images, *Image Understanding Workshop*, (*IUW '98Proceedings*) vol. 2, pp. 537-542, Nov. 1998, Monterey, CA.

Mellor, J.P.; Teller, Seth; Lozano-Perez, Tomas; Dense Depth Maps from Epipolar Images, *Image Understanding Workshop*, (*IUW '97Proceedings*) vol. 2, pp. 893-900, May 1997, New Orleans, LA.

Mellor, J.P., Automatically Recovering Geometry and Texture from Large Sets of Calibrated Images, Technical Report AITR-1674, MIT, Oct. 1999, available by ftp at publications.ai.mit.edu.

Levy, Bruno, Constrained Texture Mapping for Polygonal Meshes, Computer Graphics Proceedings, Annual Conference Series, 2001, Aug. 12-17, 2001, pp. 417-424, SIGGRAPH 2001, Los Angeles, CA.

* cited by examiner

US 7,555,157 B2

SYSTEM AND METHOD FOR TRANSFORMING GRAPHICAL IMAGES

RELATED APPLICATION

This non-provisional application claims the benefit of U.S. Provisional Patent Application Ser. No. 60/318,214, filed Sep. 7, 2001, the disclosure of which is hereby incorporated herein in its entirety.

BACKGROUND

Many production processes involve forming or molding a three-dimensional part. For example, plastic thermoforming, metal stamping, and metal cold forming involve forming a three-dimensional part from a sheet of a substrate material through the use of vacuum and/or pressure that conforms the substrate material to a mold or die. Blow molding involves the use of air pressure to shape a parison comprising a substrate material inside a mold. Injection molding involves forcing a plastic or metal substrate into a mold under pressure. Other production processes in which a three-dimensional part is formed include compression molding, rotational molding, ironing, drawing, pressing, stretch forming, shrink forming, punching, explosive forming (also-called "high energy rate forming"), sputtering, lamination, and shrink wrapping. In addition, in-mold decoration and insert-mold decoration are processes related to the molding of a three-dimensional part wherein the part is molded and decorated simultaneously.

Those of skill in the art will appreciate that a substrate material in such a production process may undergo complex changes during production. For example, consider a thermoforming process using a plastic substrate, such as, for example, ABS, acrylic, polycarbonate, polyesters, polyethylene, polypropylene, polystyrene, polyvinyl chloride (PVC), polyethylene teraphthalate (PET), and acrylonitrile, and another plastic resin. Prior to thermoforming, the plastic substrate normally has a substantially uniform thickness. During thermoforming, the heated plastic substrate stretches as it is formed. In most cases, the topographic die used in thermoforming is colder than the heated plastic sheet substrate. As a result, when the plastic substrate makes contact with the mold, it "freezes off" at that point and ceases stretching. Other areas of the plastic substrate not yet in contact with the mold continue to stretch. The effect is a potentially large variation in thickness and relative stretch of the substrate as it comes into contact with the mold.

FIGS. 1A-D show a simple thermoformed plastic part formed with vacuum and a die according to the prior art. In FIG. 1A, plastic sheet 101 is clamped into frame 102 and heated by heater 103. In FIG. 1B, the softened sheet is drawn over die 104 and a seal is created between frame 102 and die 104. Vacuum 105 is then applied through die 104 and atmospheric pressure pushes plastic sheet 101 tightly against the surface of die 104, as shown in FIG. 1C. FIG. 1D shows a finished thermoformed part produced according to the prior art.

In general, the portions of the plastic substrate that contact the die first tend to be thicker. The sides and lower portions of the plastic substrate contact the die last. These areas must stretch the most and tend to be thinner. However, it will be appreciated by those of skill in the art that with different heating setups, greater stretch and thinning in other areas may be experienced. For example, if a plastic sheet is heated unevenly, the regions undergoing greater heating will stretch more than the regions absorbing less heat. Thus, if a plastic sheet absorbs more heat in the center than along the edges, the sheet will drape and stretch in the center before the forming, as shown in FIG. 2. Using die 104 of FIGS. 1-2, the center of the plastic sheet will contact the die and freeze off first, but due to the uneven heating the center of the plastic sheet will be thinner than the outer areas that absorbed less heat.

A similar effect is experienced in metal stamping and cold forming. The metal substrate may be thinned considerably in certain areas as the substrate stretches during the stamping or forming process.

Forming a three-dimensional part only one step in its manufacture. The aesthetic value, and to a large extent the overall value, of the part is determined by the quality with which it is decorated. Two basic techniques for decorating a three-dimensional part are known—the substrate can be decorated prior to the production process (called "pre-decorating"), or the substrate can be decorated after the production process (called "post-decorating").

The initial steps in pre-decorating a substrate in sheet form often are easy and inexpensive. In the case of a plastic substrate, prior to thermoforming the plastic substrate is in flat sheets or rolls and can easily be fed through a printer to apply the decoration. A metal substrate in sheet form also can be easily and inexpensively decorated. However, during the production process, a flat substrate flows and stretches to conform to the shape of the mold or die. This flowing and stretching of the substrate misaligns and deforms the decoration. For simple shapes with little relief, the misalignment and deformation may not be significant. However, for complex shapes with significant relief, the misalignment and deformation frequently is intolerable.

Another solution involves post-decorating the part. The possibility that the decoration will become distorted is eliminated by this technique. However, because the part has a three-dimensional shape after production, complicated and expensive techniques often are needed to decorate such parts. In many cases, post-decorating parts becomes prohibitively expensive.

Yet another approach is an adaptation of the pre-decorating technique. According to this adaptation, the substrate is pre-decorated, but the decoration applied to the flat substrate is purposely distorted. As the shape and surface of the substrate change during production, the distorted decoration is intended to transform to its desired appearance. The challenge with this approach is figuring out how to pre-distort the decoration, taking into consideration the non-uniform changes that may occur to the shape and surface of the substrate during production. Prior art methods for determining the extent of intentional pre-distortion for a part decoration are not sufficiently accurate for application where precise representation of the decoration is expected, such as in an advertising application where the advertiser's trademark or logo is displayed. Thus, it is desired to provide a more accurate method for determining the degree of intentional pre-distortion for a part decoration.

An analogous problem exists in the fields of in-mold decoration and insert-mold decoration. In an in-mold decoration process of a type known in the art, a pre-decorated carrier, typically a thin polyester film, is placed into a mold prior to the injection of a plastic or metal substrate into the mold. After molding, the carrier is discarded, leaving only the decoration on the surface of the molded part. In an insert-mold decoration process, a pre-decorated film is placed into a mold and a plastic or metal substrate is injected directly against the pre-decorated film. Insert-mold decoration differs from in-mold decoration in that the pre-decorated film becomes an integral part of the molded assembly in insert-mold decoration process. In either case, the challenge remains figuring out how to pre-distort a decoration that is applied to the carrier in in-mold decoration, or to the pre-decorated film in insert-mold decoration, taking into consideration the surface topography of the mold and the shape and surface characteristics of the plastic or metal substrate to which the decoration eventually is applied.

Yet another analogous problems exists in the field of image projection. Well-known techniques are available for pre-distorting an image and then projecting the image onto a smoothly curved surface whereby the image appears in proportion on the surface. Indeed, the historic art of anamorphosis is an application of such techniques. The application of anamorphosis to conform images to planar, cylindrical, conical, and parabolic surfaces is well developed. The degree of pre-distortion of an image that is necessary for such surfaces can be developed by applying known geometric principles. However, a challenge arises when it is desired to project an image onto a surface comprising a complex topography. Geometric modeling of such an image's pre-distortion is not efficient. Frequently, significant trial and error must be employed to arrive at the degree of pre-distortion necessary to cause the image to appear in proportion and to conform to the topography of the complex surface when it is projected.

For the foregoing reasons, it is desired to provide a system and method for transforming the appearance of an image. According to the desired system and method, the appearance of the image is transformed with a computer to adapt the image to the topography of a substrate to which the image is to be applied. After the image is applied to the substrate, the image conforms to the topography of the substrate.

It is further desired to provide a system and a method for predetermining the amount of distortion required for images to be projected onto a surface comprising a complex topography, so that when projected onto such a surface, the images appear in proportion and conform to the topography of the complex surface. The desired system and a method should be readily adaptable to a plurality of different shapes and sizes of surfaces.

It is further desired to provide a system and a method for predetermining the amount of distortion required for decorations to be applied to parts, and then for producing pre-distorted decorations suitable for application on substrate materials. The substrate materials containing the pre-distorted decorations then may be formed into such parts. Such decorations transform to their desired appearance as the substrate takes on the contours of the finished part. The resulting product will be a three dimensional part having an undistorted decoration. The desired system and a method should be readily adaptable to a plurality of different shapes and sizes of parts, and a variety of different sizes, shapes, and materials of substrates.

SUMMARY

The present invention comprises a system and a method for transforming graphical images. The transformed graphical images are adapted to be applied to a three-dimensional topography of a substrate to which the image is to be applied. After the image is applied to the substrate, the image conforms to the topography of the substrate.

The present invention may be advantageously adapted to provide a system and a method for predetermining the amount of distortion required for images to be projected onto a surface comprising a complex topography, so that when projected onto such a surface, the images appear in proportion and conform to the topography of the complex surface. The present invention also may be advantageously adapted to provide a system and a method for predetermining the amount of distortion required for decorations to be applied to parts, and then for producing pre-distorted decorations suitable for application on substrate materials. The substrate materials containing the pre-distorted decorations then may be formed into three dimensional part having an undistorted decoration.

In an embodiment, the present invention comprises a method for creating at least one transformed graphical image. The method comprises the step of providing a substrate having a three-dimensional topography. The transformed graphical image is to be applied to the substrate. Next, the topography of the substrate is measured. Finally, an untransformed graphical image is transformed in accordance with the measurements of the topography of the substrate.

In an aspect of this embodiment of the present invention, the step of measuring the topography of the substrate comprises providing a measurement article that has a three-dimensional topography consistent with the topography of the substrate. The measurement article comprises a plurality of measurement points that collectively are suggestive of the topography of the measurement article. At least one image of the plurality of measurement points is stored in a computer memory. A three-dimensional grid is created in computer memory, wherein the three-dimensional grid is reflective of the topography of the measurement article.

In another aspect of this embodiment of the present invention, the step of storing an image of the measurement article in computer memory includes the step of obtaining at least one image of the measurement article's plurality of measurement points using a digitizing apparatus. The digitizing apparatus comprises at least one sensor that is electronically interconnected with the computer memory. The at least one image of the plurality of measurement points obtained by the digitizing apparatus is transmitted into the computer memory. In another aspect of this embodiment, the digitizing apparatus comprises a plurality of sensors. Each of the plurality of sensors concurrently obtains a separate image of the of the plurality of measurement points. The method includes the step of combining the separate images of the plurality of measurement points into an integrated image of the plurality of measurement points in computer memory. The plurality of sensors may be adapted to comprise a plurality of optical sensors arranged in a stereoptic configuration.

In another aspect of this embodiment of the present invention, the method further comprises, before the step of obtaining at least one image of the plurality of measurement points with the digitizing apparatus, the step of positioning the digitizing apparatus so that at least one of the at least one sensors is positioned to obtain at least one image of at least a portion of the plurality of measurement points. Where the at least one sensor is not able to obtain at least one image all of the plurality of measurement points simultaneously, the method further comprises repeating the steps of positioning the digitizing apparatus, storing, in the computer memory, the at least one image of the plurality of measurement points obtained by the digitizing apparatus, and transmitting the at least one image of the plurality of measurement points from the digitizing apparatus into the computer memory, until at least one image of each of the plurality of measurement points is stored in the computer memory.

In another aspect of this embodiment of the present invention, the step of transforming the at least one untransformed graphical image into at least one transformed graphical image includes the step of providing a three-dimensional grid that is reflective of the topography of the substrate. The three-dimensional grid and the at least one transformed graphical image are combined in computer memory. Then, the combined three-dimensional grid and at least one untransformed graphical image are flattened into a two-dimensional grid. The flattening transforms the at least one untransformed graphical image into at least one transformed graphical image. In another aspect of this embodiment, the three-dimensional grid comprises a plurality of three-dimensional grid points, and planar grid data is provided. The planar grid data comprises a plurality of planar grid points that are equal in number to the plurality of three-dimensional grid points in the three-dimensional grid. The grid points from the three-dimensional grid corresponded to the grid points from the planar grid data in computer memory. Then, the grid points from the three-dimensional grid are translated into the corresponding planar grid points. To flatten the at least one untransformed graphical image.

In an aspect of this embodiment of the present invention wherein the transformed graphical image is to be applied to a surface of the substrate comprising a portion of the topography of the substrate that is less than the entirety of the topography of the substrate, the step of measuring the topography of the substrate comprises the step of providing a measurement article having a three-dimensional topography, wherein at least a portion of the topography of the measurement article is consistent with the portion of the topography of the substrate to which the transformed graphical image is to be applied. The portion of the topography of the measurement article comprises a plurality of measurement points that collectively are suggestive of the portion of the topography of the measurement article that is consistent with the portion of the topography of the substrate to which the transformed graphical image is to be applied. The step of measuring the topography of the substrate further comprises the steps of positioning a digitizing apparatus comprising at least one sensor so that at least one of the at least one sensors is positioned to view at least the portion of the topography of the measurement article corresponding to the portion of the topography of the substrate to which the transformed graphical image is to be applied, such that at least one image of the plurality of measurement points comprising the portion of the topography of the measurement article may be obtained by the at least one sensor, storing, in a computer memory, the at least one image of the plurality of measurement points obtained by the at least one sensor, and creating a three-dimensional grid in the computer memory, wherein the three-dimensional grid is reflective of the portion of the topography of the measurement article corresponding to the portion of the topography of the substrate to which the transformed graphical image is to be applied. Where the at least one sensor is not able to simultaneously obtain at least one image of the entirety of the portion of the topography of the measurement article corresponding to the portion of the topography of the substrate to which the transformed graphical image is to be applied, the method further comprises repeating the step of positioning the digitizing apparatus and the step of storing, in computer memory, the at least one image of the plurality of measurement points, until at least one image of all of the measurement points comprising the portion of the topography of the measurement article is obtained by the at least one sensor.

In an embodiment, the present invention comprises a method for creating at least one transformed graphical image, wherein the at least one transformed graphical image is adapted to a topography of a substrate to which the at least one transformed graphical image is to be applied. The method comprises the steps of providing a measurement article having a three-dimensional topography consistent with the topography of the substrate, wherein the measurement article comprises a plurality of measurement points that collectively are suggestive of the topography of the measurement article, obtaining at least one image of the plurality of measurement points with a digitizing apparatus comprising at least one sensor electronically interconnected with a first computer comprising a first computer memory, transmitting the at least one image of the plurality of measurement points from the digitizing apparatus into the first computer memory, creating a three-dimensional grid in the first computer memory, the three-dimensional grid being reflective of the at least one image of the plurality of measurement points, combining, in a second computer memory, the three-dimensional grid and at least one untransformed graphical image, and flattening, in the computer memory, the combined three-dimensional grid and at least one untransformed graphical image into a two-dimensional grid, the flattening step resulting in transformation of the at least one untransformed graphical image into the at least one transformed graphical image.

In an embodiment, the present invention comprises a digitizing apparatus comprising at least one sensor, means for positioning the at least one sensor in relation to a measurement article, means for positioning the measurement article so that at least a portion thereof is within a view viewable of at least one sensor, and a computer. In an aspect of this embodiment, the digitizing apparatus comprises a plurality of sensors each of which is operable to concurrently obtain a separate image of the plurality of measurement points, and wherein the computer is operable to integrate the plurality of separate images into at least one integrated image in the computer memory. In an aspect of this embodiment, the digitizing apparatus comprises a plurality of optical sensors arranged in a stereoptic configuration. In an aspect of this embodiment, the digitizing apparatus comprises means for repetitively relocating the at least one sensor in relation to the measurement article.

In an embodiment, the present invention comprises a computer comprising a fixed storage medium, a computer memory operably connected with the fixed storage medium, and software means stored on the fixed storage medium and interactive with the computer memory, the software means operable to (a) create an image of a topography of a three-dimensional measurement article in computer memory from at least one image of the topography of the three-dimensional measurement article obtained by at least one sensor electronically interconnected with the computer, (b) create a three-dimensional grid in the computer memory, the three-dimensional grid being reflective of the image of the topography of the three-dimensional measurement article, (c) combine the three-dimensional grid with at least one untransformed graphical image in the computer memory, and (d) flatten, in the computer memory, the combined three-dimensional grid and the at least one untransformed graphical image into a two-dimensional grid, the flattening resulting in a transformation of the at least one untransformed graphical image into a transformed graphical image.

In an aspect of this embodiment of the present invention, the computer is operable to combine at least two separate images of the topography of the three-dimensional measurement article obtained by the at least one sensor into an integrated image of the topography of the three-dimensional measurement article in computer memory.

In an aspect of this embodiment of the present invention, the computer further comprises at least one output device electronically interconnected with the computer, the output device(s) is/are adapted to apply the transformed graphical image onto a substrate. In an aspect of this embodiment of the present invention, the output device(s) is/are operable to apply the transformed graphical image onto the substrate according to an application process selected from a group of application processes consisting of painting, printing, screen printing, offset lithography, flexography, gravure, ink diffusion, pad printing, inkjet printing, laser printing, in-mold decoration, insert-mold decoration, adhesive deposition, coating deposition, lamination, and decaling.

In an embodiment, the present invention comprises a system of computers comprising a first computer comprising a fixed storage medium, computer memory operably connected with the fixed storage medium, and software means stored on the fixed storage medium and interactive with the computer memory, the software means operable to (a) create an image of a topography of a three-dimensional measurement article in computer memory from at least one image of the topography of the three-dimensional measurement article obtained by at least one sensor electronically interconnected with the computer, and create a three-dimensional grid in the computer memory, the three-dimensional grid being reflective of the image of the topography of the three-dimensional measurement article, a second computer comprising a fixed storage medium, computer memory operably connected with the fixed storage medium, and software means stored on the fixed storage medium and interactive with the computer memory, the software means operable to (a) combine the three-dimensional grid and at least one untransformed graphical image in computer memory, and (b) flatten, in the computer memory, the combined three-dimensional grid and the at least one untransformed graphical image into a two-dimensional grid, the flattening resulting in transformation of the at least one untransformed graphical image into a transformed graphical image, and means for transmitting data between the first computer and the second computer.

In an aspect of this embodiment of the present invention, the first computer is operable to combine at least two separate images of the topography of the three-dimensional measurement article into an integrated image of the topography of the three-dimensional measurement article in computer memory.

In an aspect of this embodiment of the present invention, the system of computers further comprises at least one output device electronically interconnected with at least one of the first computer or the second computer, the output device(s) is/are adapted to apply the transformed graphical image onto a substrate. In an aspect of this embodiment of the present invention, the output device(s) is/are operable to apply the transformed graphical image onto the substrate according to an application process selected from a group of application processes consisting of painting, printing, screen printing, offset lithography, flexography, gravure, ink diffusion, pad printing, inkjet printing, laser printing, in-mold decoration, insert-mold decoration, adhesive deposition, coating deposition, lamination, and decaling.

These and other features and advantages of the present invention, and the manner of attaining them, will be more apparent and better understood by reference to the following descriptions of embodiments of the invention taken in conjunction with the accompanying drawings and with the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

The present invention comprises a system and method for transforming the appearance of graphical images. The graphical images to which the present invention is applied are those intended for application to a substrate. As used herein, "substrate" means any surface or substance to which a graphical image is applied such as, for example, a surface upon which a graphical image is projected, a flat sheet of a formable material, or a decal that is applied to a mechanical part. A substrate has a three-dimensional topography, but the substrate may not take on its three-dimensional topography until after the graphical image is applied thereto. It is within the scope of the present invention that the graphical image applied to the substrate by any means known in the art, including painting, projection, printing, screen printing, offset lithography, flexography, gravure, ink diffusion, pad printing, inkjet printing, and laser printing.

According to the present invention, the appearance of the graphical image is transformed to adapt the graphical image to the topography of a substrate to which the graphical image is to be applied. After the graphical image is applied to the substrate, the graphical image conforms to the topography of the substrate and takes on its desired appearance.

Figure 1A:
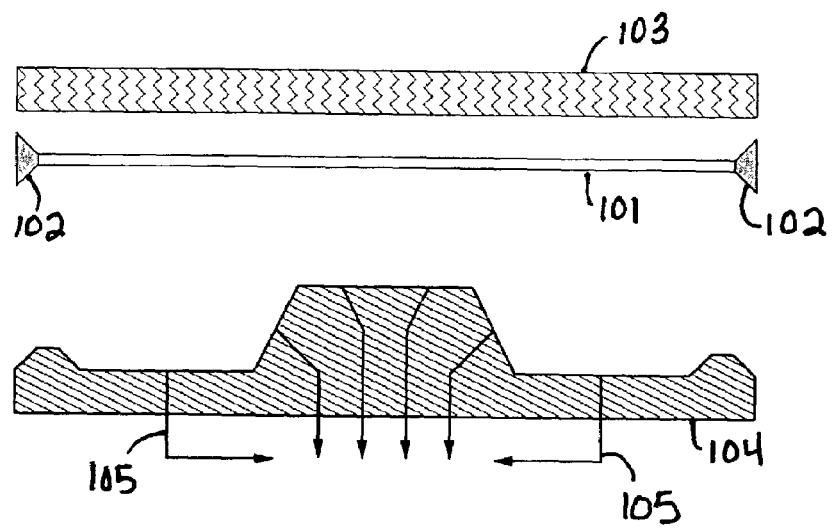
FIGS. 1A-D show a process of thermoforming a plastic part according to the prior art.
Figure 1B:
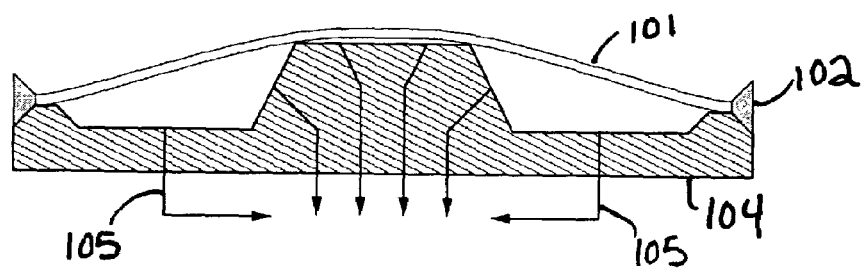
Figure 1C:
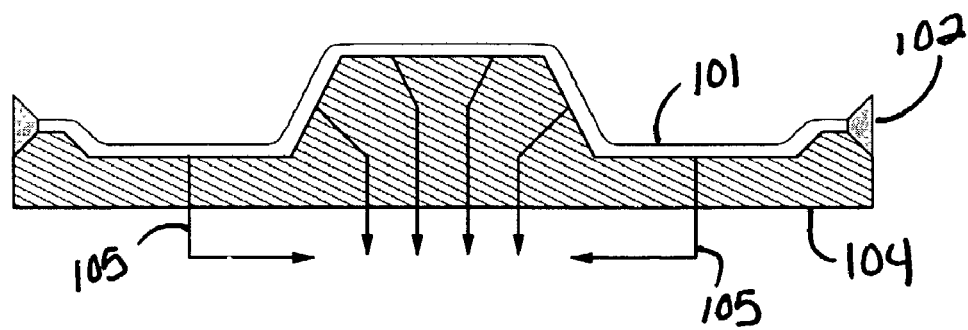
Figure 1D:
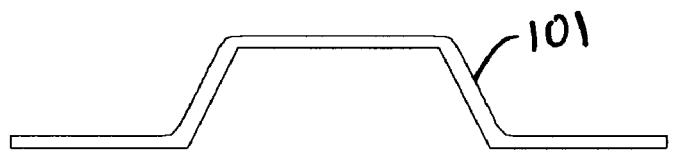
Figure 2:
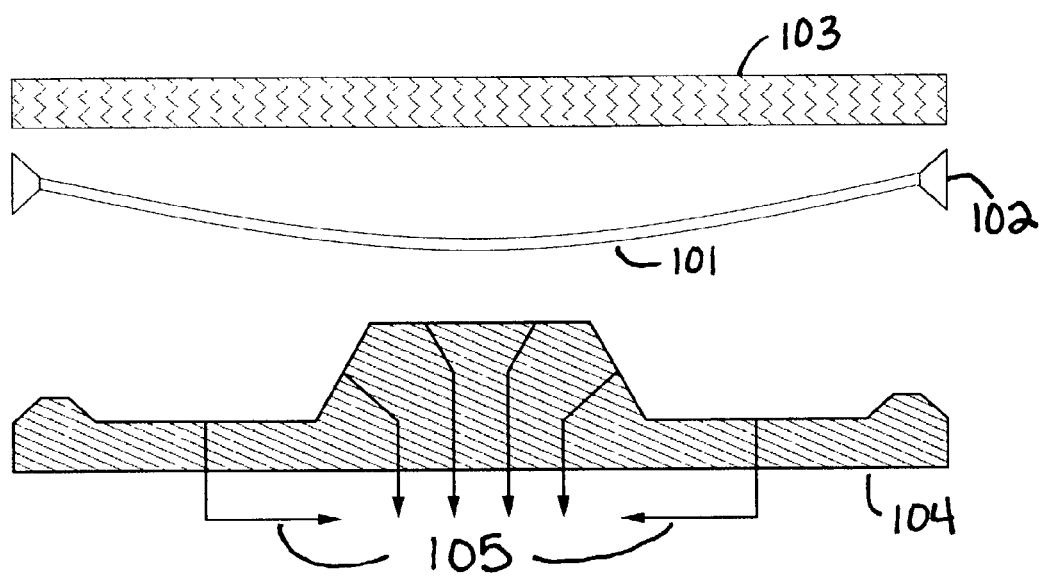
FIG. 2 illustrate the drape and stretch experienced by a plastic sheet during a thermoforming process according to the prior art.
Figure 3:
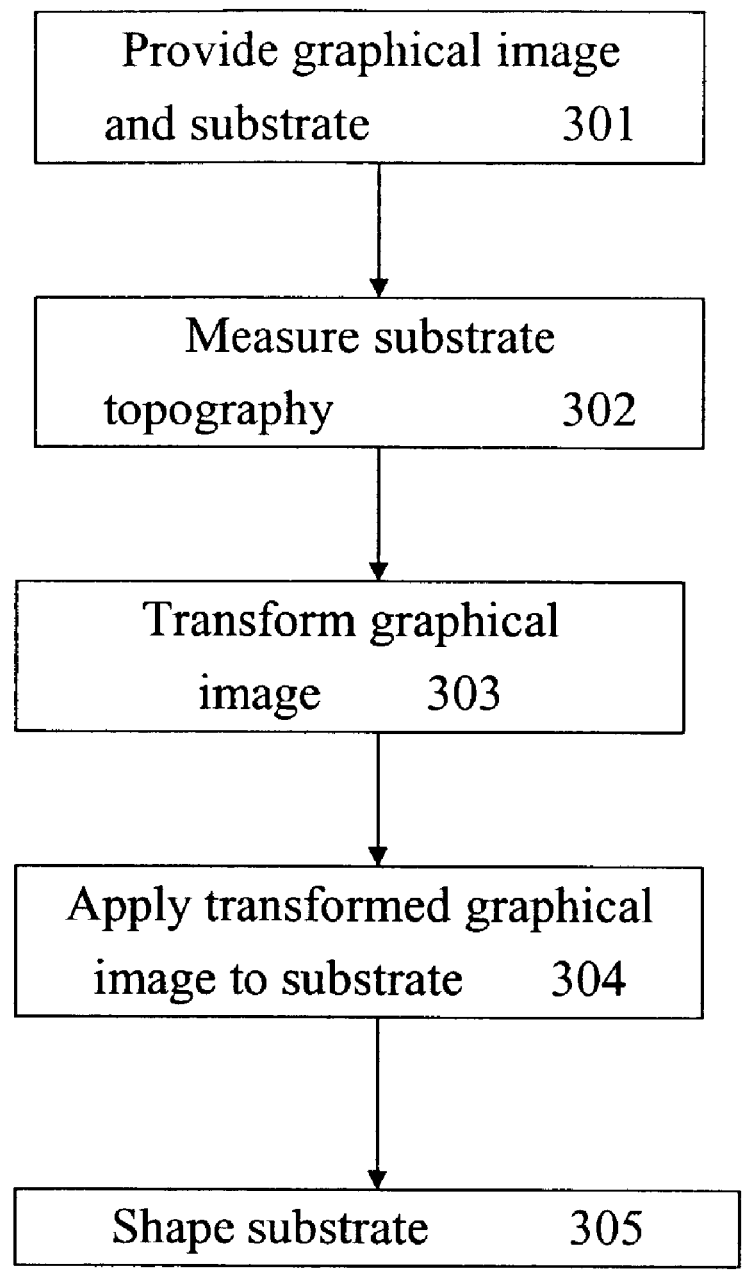
FIG. 3 shows a flow chart illustrating an embodiment of the present invention.

FIG. 3 shows a flowchart illustrating an embodiment of the method of the present invention. In the step shown as block 301 of FIG. 3, a graphical image (called a "base graphical image") and a substrate are provided. It is desired to apply the graphical image to the substrate. The substrate has, or after processing will have, a three-dimensional topography. In the step shown as block 302 of FIG. 3, the three-dimensional topography of the substrate is measured. Optionally, the substrate may be processed before the step shown as block 302 to give the substrate the desired three-dimensional topography. For example, the substrate may be a flat substrate such as a plastic sheet that is formed into a three-dimensional topography, such as by thermoforming.

In the step shown as block 303 of FIG. 3, the graphical image is transformed in accordance with measurements of the three-dimensional topography of the substrate. In the step shown as block 304 in FIG. 3, the transformed graphical image is applied to the substrate, or to another substrate having substantially the same properties as the substrate provided in the step shown as block 301. Optionally, in the step shown as block 305 of FIG. 3, the substrate to which the transformed graphical image was applied in the step shown as block 304, is shaped into a three-dimensional topography that is substantially the same as the three-dimensional topography measured in the step shown as block 302. The transformed graphical image takes on its desired appearance when it is applied to the topography of the substrate.

In an embodiment, the present invention may be advantageously adapted to comprise a system and a method for determining the amount of distortion required for decorations to be applied to three-dimensional parts, and then for producing pre-distorted decorations suitable for application to a substrate comprising one or more of a variety of different substrate materials from which the three-dimensional part has been, or is to be, fabricated. The pre-distorted decoration compensates for the three-dimensional topography of the part. The resulting product will be a three-dimensional part having an decoration that is in proportion and conforms to the three-dimensional topography of the part.

For example, consider a process wherein a flat substrate such as a sheet of aluminum is formed into a three-dimensional part, such as, for example, by stamping, or a sheet of a plastic material is formed into a three-dimensional part, such as, for example, by thermoforming. A pre-distorted decoration according to the present inventing compensates for dimensional changes in the substrate that occur during the forming process. When substrate to which the pre-distorted decoration was applied is formed over or inside a die, mold, or tool, the pre-distorted decoration takes on its desired appearance as the substrate takes on the contours of the die, mold, or tool. The resulting product will be a three-dimensional part having an undistorted decoration applied thereto.

In another example, consider a process wherein a part decoration is in the form of a first substrate that is applied to a three-dimensional part comprising a second substrate. For example, the decoration may be in the form of an adhesive decal upon which a pre-distorted decoration according to the present inventing is applied. The decal then is applied to the second substrate that has a three-dimensional topography, such as by hand application or another decal application process known in the art. When the decal comprising the pre-distorted decoration is applied to the second substrate, the pre-distorted decoration takes on its desired appearance as the decal takes on the contours of the second substrate. The resulting product will be a three-dimensional part having an undistorted decoration applied thereto. As used herein, the term "decaling" includes the application of an adhesive decal to a second substrate, and also includes lamination, wherein a film (the first substrate) is applied to second substrate by the application of heat and/or pressure.

In another similar example, the first substrate may comprise a carrier, such as a thin polyester film, upon which the pre-distorted decoration is applied. The carrier then is applied to the second substrate, such as in an in-mold decoration process. In yet another example, the first substrate is a film upon which a pre-distorted decoration is applied. The first substrate then is applied to the second substrate, such as in an insert-mold decoration process. The term "appliqué" is used hereinafter to refer to both the carrier in an in-mold decoration process, and the film in an insert-mold decoration process. When the appliqué comprising the pre-distorted decoration according to the present inventing is applied to the second substrate, the pre-distorted decoration takes on its desired appearance as the appliqué takes on the contours of the second substrate. The resulting product will be a three-dimensional part having an undistorted decoration applied thereto.

In yet another example, consider a shrink wrapping process. In a shrink wrapping process of a type known in the art, a plastic substrate shrinks to conform to the topography of an underlying material. A decoration applied to the shrink wrap plastic substrate changes appearance as the shrink wrap plastic substrate changes shape. According to the present invention, the decoration applied to the shrink wrap plastic substrate is pre-distorted according to the present inventing, and the shrink wrap plastic substrate comprising the pre-distorted decoration is applied to the underlying material substrate. The pre-distorted decoration takes on its desired appearance as the shrink wrap plastic substrate takes on the contours of the second substrate. The resulting product will be a three-dimensional part having an undistorted decoration applied thereto by shrink wrapping.

In an embodiment, the present invention may be advantageously adapted to comprise a system and a method for pre-determining the amount of distortion required for images to be projected onto a surface comprising a three-dimensional topography. For example, it may be desired to project a business logo onto three-dimensional advertising signage. A graphical image is transformed according to the present invention so that when projected onto such a surface, the graphical image appears in proportion and conforms to the three-dimensional topography of the surface.

FIGS. 4A-D show block diagrams illustrating representative embodiments of the system of the present invention. The embodiment of the present invention shown in FIG. 4A comprises digitizing apparatus 401, computer 402, and, optionally, output device 403. As will be discussed in more detail hereinafter, digitizing apparatus 401 comprises one or more sensors. The one or more sensors of the present invention are adapted to record the topography of "target subject matter," which may include a substrate. The one or more sensors of digitizing apparatus 401 of the present invention are configurable in accordance with the target subject matter for which topographic characteristics are to be recorded. Thus, a variety of different sensors may be used depending on the needs of the practitioner of a particular implementation of the present invention.

In an embodiment, the sensors of digitizing apparatus 401 comprise one or more optical sensors (such as, for example, one or more cameras). Where the sensors comprise optical sensors, it is preferred that two or more optical sensors arranged in a stereoptic configuration are provided. The optical sensor(s) of digitizing apparatus 401 in this embodiment may be adapted for one or more of the visible spectrum, the infrared spectrum, and/or the ultraviolet spectrum.

One or more images of the target subject matter are recorded by the one or more sensors of digitizing apparatus 401 and stored in computer 402. Computer 402 comprises one or more computers, computing devices, processors, or systems of a type known in the art, such as one or more personal computers, mainframe computers, workstations, notebook computers, laptop computers, and the like. Computer 402 comprises such software (operational and application), hardware, and componentry as would occur to one of skill in the art, such as, for example, one or more microprocessors, fixed memory, random access memory ("RAM"), input/output devices, device controllers, and the like. The fixed memory of computer 402 may comprise an electromagnetic memory such as one or more hard disk drives and/or one or more floppy disk drives or magnetic tape drives, and may comprise an optical memory such as one or more CD-ROM, CD-R, CD-RW, DVD-ROM, DVD-R, and/or DVD-RW drives.

Computer 402 also comprises one or more video display means upon which information may be displayed in a manner perceptible to the user, such as, for example, a computer monitor, cathode ray tube, liquid crystal display, light emitting diode display, touchpad or touchscreen display, and/or other means known in the art for emitting a visually perceptible output. Computer 402 also comprises one or more data entry means operable by a user of computer 402, such as, for example, a keyboard, a keypad, pointing device, mouse, touchpad, touchscreen, microphone, and/or other data entry means known in the art. Finally, computer 402 also may comprise one or more audio display means such as one or more loudspeakers and/or other means known in the art for emitting an audibly perceptible output.

The configuration of computer 402 in a particular implementation of the present invention is left to the discretion of the practitioner. In one implementation, computer 402 comprises a Dell™ Precision Workstation 340 comprising a 2.53 gigahertz Intel® Pentium® 4 processor, 533 megahertz bus, 512 megabytes of RAM, a Geforce-4 128 megabyte video card, and an 80 gigabyte fixed disk drive.

Digitizing apparatus 401 and computer 402 are electronically interconnected in this embodiment. The electronic interconnection between digitizing apparatus 401 and computer 402 may comprise any means known in the art for electronically interconnecting such devices and for transmitting data and information therebetween. Thus, the electronic interconnection between digitizing apparatus 401 and computer 402 may comprise the Internet, the commercial telephone network, one or more local area networks, one or more wide area networks, one or more wireless communication networks, coaxial cable, fiber optic cable, twisted pair cable, the equivalents of any of the foregoing, or the combination of any two or more of the foregoing. In one embodiment, the electronic interconnection between digitizing apparatus 401 and computer 402 is compatible with IEEE 1394.

Optional output device 403 comprises a means for applying a graphical image transformed according to the present invention onto a substrate. For example, where the substrate comprises one or more sheets of a plastic material to be thermoformed, optional output device 403 comprises an inkjet printer, laser color printer, or other output device known in the art and capable of printing such images on plastic sheets prior to thermoforming. Where the substrate comprises a three-dimensional surface onto which the transformed graphical image is to be projected, output device 403 comprises a projector or other device known in the art and capable of projecting graphical images onto a surface. Output device 403 may be electronically interconnected to computer 402 by means known in the art for electronically interconnecting a computer and the chosen output device including, without limitation, the Internet. In an alternate embodiment, in addition to, or in lieu of, an electronic interconnection between computer 402 and output device 403, information may be transmitted between computer 402 and output device 403 via a computer storage medium, such as, for example, a compact disc, floppy disk, portable fixed disk, or electromagnetic tape.

Figure 4A:
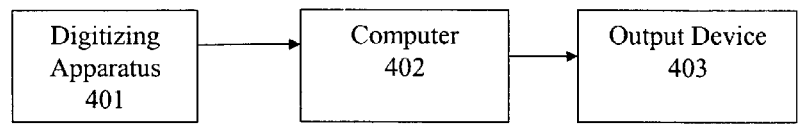
FIGS. 4A-D show block diagrams illustrating representative embodiments of the present invention.
Figure 4B:
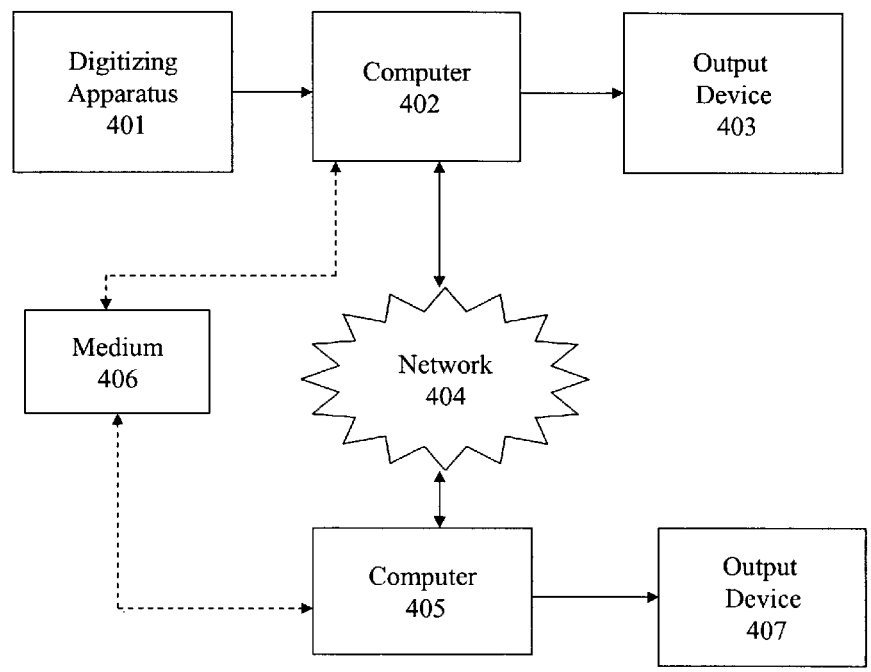

FIG. 4B shows a block diagram of another representative embodiment of the system of the present invention. Shown in FIG. 4B are digitizing apparatus 401, computer 402, output device 403, network 404, computer 405, medium 406, and output device 407. Digitizing apparatus 401, computer 402, and output device 403 comprise the features discussed previously in regard to FIG. 4A.

Computer 405 comprises one or more computers, computing devices, processors, or systems of a type known in the art, such as one or more personal computers, mainframe computers, workstations, notebook computers, laptop computers, and the like. Computer 405 comprises one or more video display means on which information may be displayed in a manner perceptible to the user, one or more data entry means operable by a user of computer 405, and, optionally, one or more audio display means. Computer 405 also comprises such operational and application software, hardware, and componentry as would occur to one of skill in the art, such as, for example, one or more microprocessors, fixed memory, RAM, input/output devices, device controllers, and the like. The fixed memory of computer 405 may comprise an electromagnetic memory such as one or more hard disk drives and/or one or more floppy disk drives or magnetic tape drives, and may comprise an optical memory such as one or more CD-ROM, CD-R, CD-RW, DVD-ROM, DVD-R, and/or DVD-RW drives. The configuration of computer 405 in a particular implementation of the present invention is left to the discretion of the practitioner. In one implementation, computer 405 comprises a Dell™ Precision Workstation 340 comprising a 2.53 gigahertz Intel® Pentium® 4 processor, 533 megahertz bus, 512 megabytes of RAM, a Geforce-4 128 megabyte video card, and an 80 gigabyte fixed disk drive.

In an implementation of this embodiment, computer 405 is electronically interconnected to computer 402 by network 404. Network 404 comprises any means known in the art for electronically interconnecting two computers and for transmitting data and information therebetween. Thus, network 404 may comprise the Internet, the commercial telephone network, one or more local area networks, one or more wide area networks, one or more wireless communication networks, coaxial cable, fiber optic cable, twisted pair cable, the equivalents of any of the foregoing, or the combination of any two or more of the foregoing.

In addition to, or in lieu of, the electronic interconnection between computer 405 and computer 402 via network 404, information may be transmitted between computer 402 and computer 405 via medium 406. Medium 406 comprises a one or more information storage media known in the art upon which information may be electronically stored by a first computer and retrieved by a second computer, such as, for example, a compact disc, floppy disk, portable fixed disk, or electromagnetic tape.

Optional output device 407 comprises a means for applying a graphical image transformed according to the present invention onto a substrate. For example, where the substrate comprises one or more sheets of a plastic material to be thermoformed, optional output device 407 comprises an ink-jet printer, laser color printer, or other output device known in the art and capable of printing such images on plastic sheets prior to thermoforming. Where the substrate comprises a three-dimensional surface onto which the transformed graphical image is to be projected, output device 407 comprises a projector or other device known in the art and capable of projecting graphical images onto a surface. Output device 407 may be electronically interconnected to computer 405 by means known in the art for electronically interconnecting a computer and the chosen output device including, without limitation, the Internet. In an alternate embodiment, in addition to, or in lieu of an electronic interconnection between computer 405 and output device 407, information may be transmitted between computer 405 and output device 407 via a computer storage medium, such as, for example, a compact disc, floppy disk, portable fixed disk, or electromagnetic tape.

Figure 4C:
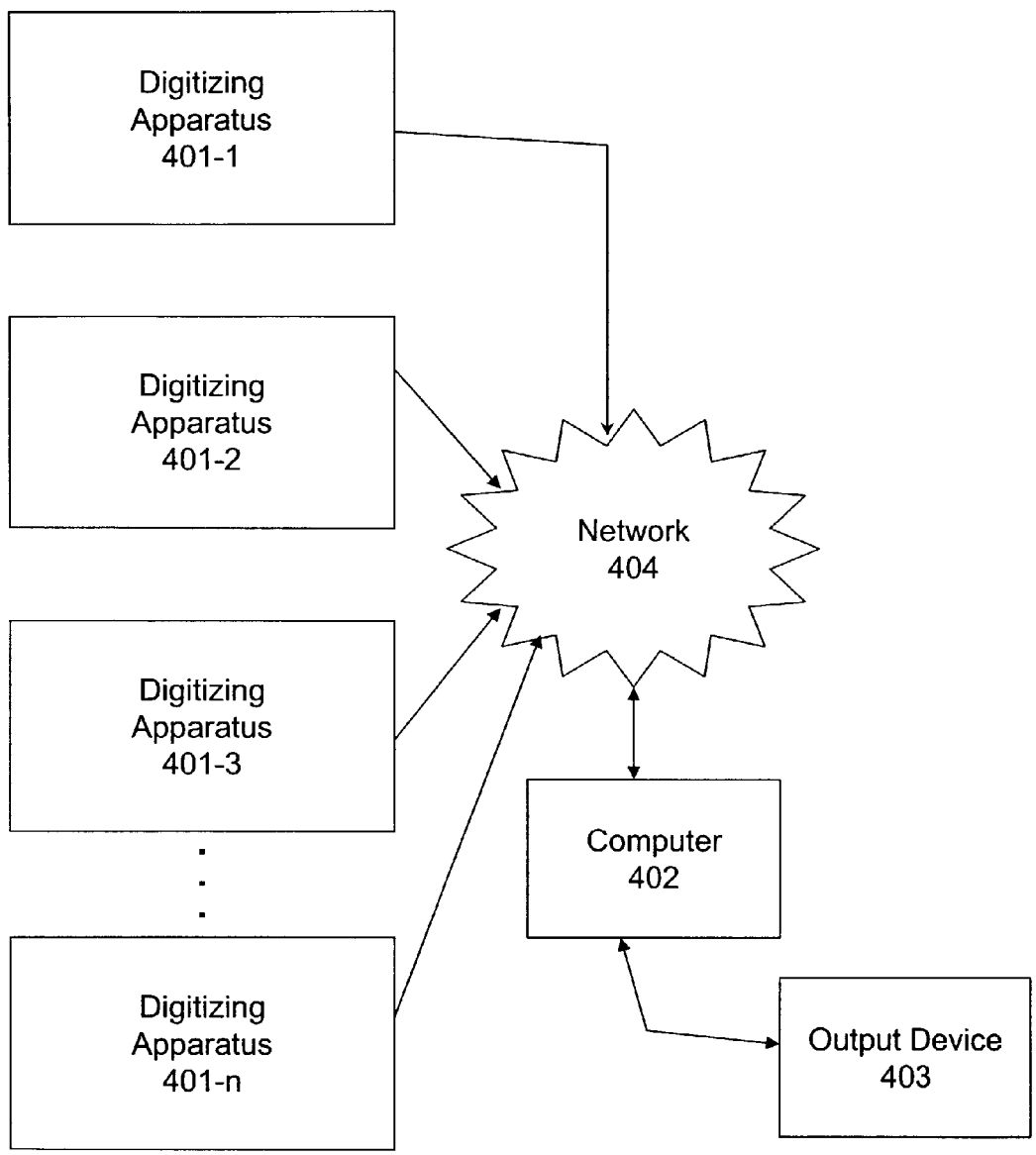

FIG. 4C shows a block diagram of yet another representative embodiment of the system of the present invention. Shown in FIG. 4C are a plurality of digitizing apparatuses 401, labeled digitizing apparatus 401-1, digitizing apparatus 401-2, digitizing apparatus 401-3, up to digitizing apparatus 401-*n*. Also shown in FIG. 4C are computer 402, optional output device 403 and network 404. Digitizing apparatuses 401, computer 402, optional output device 403, and network 404 comprise the features discussed previously in regard to FIGS. 4A-B. In the embodiment shown in FIG. 4C, the plurality of digitizing apparatuses 401 are electronically interconnected to computer 402 through network 404.

Figure 4D:
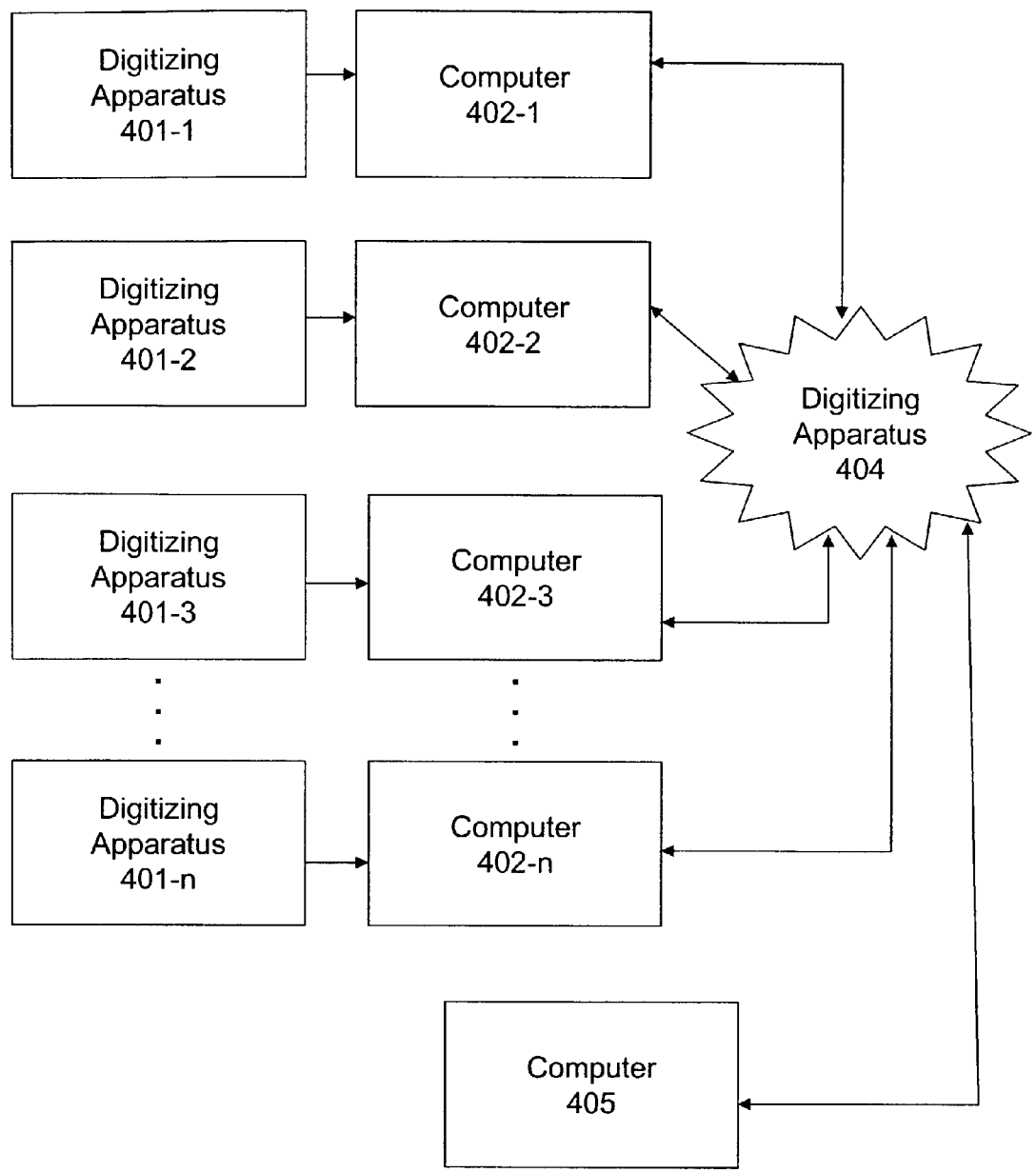

FIG. 4D shows a block diagram of still another representative embodiment of the system of the present invention. Shown in FIG. 4D are a plurality of digitizing apparatuses 401, a plurality of computers 402, network 404, and computer 405. Each digitizing apparatus 401 is electronically interconnected with a computer 402 as discussed previously in regard to FIGS. 4A-B. The plurality of computers 402 are electronically interconnected with computer 405 through network 404, as discussed previously herein in regard to FIG. 4B. The block diagram shown in FIG. 4D does not show optional output device 403, medium 406, or optional output device 407. However, it is within the scope of this embodiment that these elements of the system are present, and interconnected with the system as previously discussed herein.

The embodiments of the system of the present invention shown in block diagram form in FIGS. 4A-D are merely representative of the possible embodiments of the system falling within the scope of the present invention. Utilizing means for electronic interconnection known in the art, the digitizing apparatus(es), the computer(s), and the output device(s) can be present in substantially any number and combination and still fall within the scope of the present invention. For example, although not explicitly shown in FIG. 4B or 4D, it is within the scope of the present invention that a plurality of computers 405 are present, each individually programmed and configured to carry out the functions of computer 405 as described herein. In another example, computer 405 may comprise a plurality of electronically interconnected computers that collectively are programmed and configured to carry out the functions of computer 405 as described herein.

As discussed in more detail hereinafter, the present invention also comprises software means for recording topographic measurements, for creating a three-dimensional grid representative of the recorded topographic measurements, for combining the three-dimensional grid with a graphical image, and for converting the combined three-dimensional grid and graphical image into a transformed graphical image. In an embodiment, the software means of the present invention comprise a first software means and a second software means, wherein the first software means is operable, among other functions, to record topographic measurements and to create a three-dimensional grid representative of the recorded topographic measurements, and the second software means is operable, among other functions, to combine the three-dimensional grid with a graphical image and to convert the combined three-dimensional grid and graphical image into a transformed graphical image. In another embodiment, a single software means is operable, among other functions, to record topographic measurements, to create a three-dimensional grid representative of the recorded topographic measurements, to combine the three-dimensional grid with a graphical image, and to convert the combined three-dimensional grid and graphical image into a transformed graphical image. Other configurations and adaptations of the software means of the present invention that may occur to one of skill in the art are possible and fall within the scope of the present invention.

Computers 402 and 405 of the representative embodiments of the present invention shown in FIGS. 4A-D comprise the software means of the present invention. Preferably, the software means of the present invention provides a graphical user interface for computers 402 and/or 405, the graphical user interface comprising well-known features of graphical user interface technology, such as, for example, frames, multiple windows, scroll bars, buttons, icons, and hyperlinks, and well known features such as a "point and click" interface.

In an embodiment of the present invention, a software means for combining the three-dimensional grid with a graphical image, and for converting the combined three-dimensional grid and graphical image into a transformed graphical image, comprises a graphical user interface providing access to tools and features of the software means. According to this embodiment, such tools and features are accessible by both menu command across the top bar of the interface, and by floating menu cells containing icons, as is common to many graphical user interfaces. All graphical user interface windows in this embodiment can be resized, moved, minimized, and collapsed. According to this embodiment, windows in which three-dimensional content is displayed have full Open GL or Direct X support, including Gaussian shading, anti-aliasing, multiple texture mapping with alpha channel transparency support, wire frame overlay, and variable layer transparency.

The following list comprises one exemplary set of menus, tools, features, and commands that may be useful in embodiments of the present invention's software means. Other combinations of menus, tools, features, and commands, including menus, tools, features, and commands not listed below, also are possible and within the scope of the present invention.

Figure 5:
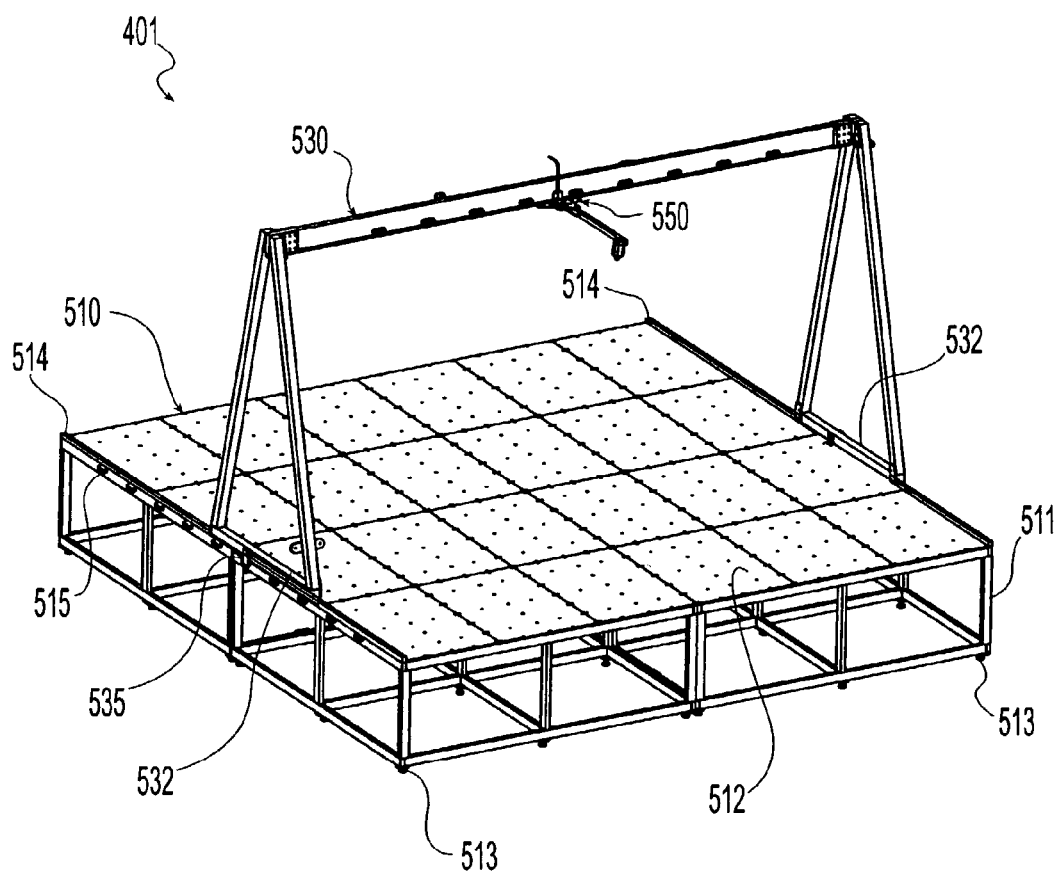
FIG. 5 shows a perspective view of an embodiment of a digitizing apparatus according to the present invention.

Windows Menus:
 File:
  New: Opens a new scene and deletes existing scene with a system save warning.
  Open: Opens a previously saved scene in a predetermined format
  Save: Saves a scene in a predetermined format, including all textures, grids, splines, hierarchies, masks and projections.
  Save As: Saves only three-dimensional grids and splines
  Import: Imports grids and splines as, for example, DXF, IGES and SoftImage model formats
  Import As: Imports Photoshop and Illustrator and other file formats as paths and converts them into splines and faces
  Export: Exports grids and splines as, for example, DXF, IGES and SoftImage model form
  Export Image: Exports content of active 3D window as an image file such as, for example, a JPEG, TIFF, PSD, or TARGA file
  Preview: Previews the active 3D window as it will appear as a printer output.
  Page Setup: Setup menu for printing/burning/recording active 3D windows
  Print: Sends output to external printer or film recorder.
  Preferences: Menu opens for setting software preferences, including default file formats, interface customizations, screen resolution and gamma, image size, color depth and dpi.
  Recent Files: Opens recent scene or texture files
  Exit: Exits the software
 Edit:
  Undo: Undo stack operations
  Cut: Cuts a selected object or texture from the scene
  Copy: Copies a selected object or texture within the scene.
  Paste: Pastes an object or texture from the windows clipboard
  Delete Selected: Deletes selected curve or grid
  Edit Vertices: Edits the vertices and vertex controllers of selected grids or splines.
 View:
  Background Grid: Shows a faint grey background grid
  Textures: Toggles textures on/off
  Masks: Toggles masks on/off
  Show Points: Shows/Hides an object's vertices
  Show Normals: Shows/Hides an object's normals
  Show Vertex Controls: Shows/Hides an objects vertex controls
  Show Rulers: Shows/Hides a calibrated ruler in the 3D windows
  Show Units: Shows/Hides the units on the ruler
  Set Units and Rulers: Opens a dialogue box which sets the rulers and unit properties
  Zoom In: Zooms the selected window in, using a numeric dialogue box or with a rectangular select
  Zoom Out: Zooms the selected window out, using a numeric dialogue box or with a rectangular select
  Fit on Screen: Zoom image to fit to screen in selected window
  Restore Interface: Restores interface to default look
  Customize: Open dialogue which allows user to save interface in customized form at startup
 Digitize:
  Choose Digitizer: Opens dialogue which allows user to pick digitizer type (such as, for example, the digitizing apparatus of the present invention or another digitizer)
  Open Visual Scanner: Opens an interface to the digitizing apparatus
  Collect Data: Starts data input as point by point collection
  Process Data: Converts point data into surface
  Store Scan: Saves scan as raw scanner data
  Create Grid: Creates a three-dimensional grid from the digitizer data Tools:
 Grid:
  Set Reference Grid: Creates a reference grid that matches the three-dimensional grid info
  Grid Info: Collects grid info from three-dimensional grid
  Distort Grid: Automatically straightens three-dimensional grid and attached hierarchical objects
  Show Grid: Shows/Hides three-dimensional grids
  Spline: Draws a Bezier spline
  Set Reference Spline: Assigns spline as a Line Art object
  Edit Vertices: Edits grid or spline vertices
  Edit Vertex Controllers: Edits Bezier controllers of grid and spline vertices
  Draw Spline: Draws Bezier splines
  Add Point: Adds a point to existing splines
  Delete Point: Deletes point(s) from Bezier splines
  Filter Points: Simplifies spline to match curve with minimum number of points
  Join Segments: Joins two spline curves end to end
  Change Direction: Changes direction of spline to allow end to end joining of curves
  Split Lines: Splits Bezier curve into two sections
  Open/Close Spline: Close/Open toggles an existing spline
  Create Fillet: Creates a fillet between two curves or surfaces
  Create Offset: Creates an offset curve x units from selected curve
 Mask:
  Draw Mask: Draws a mask region using the spline draw tool
  Auto Mask: Calculates a mask region by examining normals of a three-dimensional grid
  Unsharp Mask: Auto softening of mask edge
  Feather: User controlled feathering of mask edge
  Merge Masks: Boolean addition of two mask layers
  Intersect Masks: Finds the intersected area between two mask layers and creates new mask Add to mask: Add to mask layer by drawing additional spline region Subtract from Mask: Subtract from mask layer by drawing additional spline region Add Mask Layer: Create a new mask layer Remove Mask: Deletes a mask layer Toggle Mask: Inverts a mask region Link Mask: Links/Unlinks a mask to a texture layer Texture:

Replace Low Resolution Image: Replaces low resolution working texture with high resolution copy Add Texture Layer: Adds a new texture layer to the three-dimensional grid Corner Register Texture: Allows corner dragging/resizing of textures Auto Register: Aligns textures to grids using registration marks in PSD layers Free Transformation: Allows free translation/rotation and scaling of texture Rotate: Allows free rotation of texture Scale: Allows free scaling of texture 3D Tools:
Scale:
X: Allows restricted scaling of selected object in the x-axis
Y: Allows restricted scaling of selected object in the y-axis
Z: Allows restricted scaling of selected object in the z-axis
Free Scaling: Unrestricted scaling of selected object in all axes
Rotate:
X: Allows restricted rotation of selected object in the x-axis
Y: Allows restricted rotation of selected object in the y-axis
Z: Allows restricted rotation of selected object in the z-axis
Free Rotation: Unrestricted rotation of selected object in all axes
Translate:
X: Allows restricted translation of selected object in the x-axis
Y: Allows restricted Translation of selected object in the y-axis
Z: Allows restricted Translation of selected object in the z-axis
Free Translation: Unrestricted translation of selected object in all axes
Set Coordinates: Sets an object's centre to the global centre
Move Center: Moves an objects centre freely Image Tools:
Link to Photoshop:
Send Flattened Image: Sends contents of window to, for example, PhotoShop as flattened image
Send as Layers: Sends contents of window to, for example, PhotoShop as texture layers
Include Mask: Sends contents of window to, for example, PhotoShop including mask layers
Include objects: Sends contents of window to, for example, PhotoShop or Illustrator including splines/grids as paths
Rebuild Photoshop Texture: Fills Photoshop and Illustrator paths with original colors and gradients
Select:
Select/Unselect Object: Selects/Unselects spline, grid or registration mark
Select All: Selects all objects
Single Select Mode: Restricts selections to single objects
Multi Select Mode: Allows multiple objects to be selected with rectangular marquee
Select Mask: Allows mask object to be selected
Select Texture: Allows texture to be selected Select Next Texture: Toggles through multiple textures
Hierarchy:
Set Parent Grid: Sets parental status to grid
Attach to Grid: Attaches splines to grids as hierarchical children
Attach to Object: Attaches splines to other object as hierarchical children
Reference to Grid: Allows children objects to distort with parental grid
Detach from Grid: Breaks hierarchical link to grid
Set Parent: Sets parental status to object
View Hierarchy Tree: Opens dialogue window showing hierarchical links in graphical form
Window:
Show Navigation: Opens navigation icon menu window
Show File Management: Opens file management window
Show 3D Tools: Opens 3D tools icon menu window
Show Paint Tools: Opens paint tools icon menu window
Show Line Tools: Opens line tools icon menu window
Show Layers: Opens layers menu window
Show Mask: Opens mask tools icon menu window
Show Textures: Opens texture tools icon menu window
Show Render Options: Opens render options menu window
Show Front: Opens Front 3D view
Show Right: Opens Right 3D view
Show Top: Opens Top 3D view
Show Perspective: Opens Perspective 3D view
Show Render: Opens Rendered view
Help:
Elastic Help: Opens extensive help menus
Tutorial: Opens one of 3 step by step tutorials for training FIG. 5 shows a perspective view of an embodiment of digitizing apparatus 401 according to the present invention. The embodiment of digitizing apparatus 401 shown in FIG. 5 comprises table assembly 510, gantry assembly 530, and sensor platform 550.

Table assembly 510 comprises frame 511, table top 512, a plurality of leveling feet 513, rails 514, and a plurality of gantry positioners 515. In the embodiment of table assembly 510 shown in FIG. 5, frame 511 comprises a rigid, cage-like framework. In one implementation of this embodiment, frame 511 is constructed of modular T-slotted aluminum framing fixedly joined using appropriate fasteners. Other materials and methods may be used, provided that after assembly, frame 511 comprises sufficient sturdiness and rigidity to support the weight of the other components of this embodiment of digitizing apparatus 401 and the other items that will be placed upon it during operation of the present invention (discussed hereinafter), and to withstand the movement of gantry assembly 530 and sensor platform 550 during the operation of the present invention without undue flexing or swaying of digitizing apparatus 401 or any portion thereof.

Table top 512 is installed on top of frame 511 and affixed thereto. Table top 512 comprises a rigid material capable of supporting the items that will be placed upon it during the operation of the present invention. In the embodiment of table assembly 510 shown in FIG. 5, table top 512 comprises a plurality of plastic sheet stock pieces arranged to cover the top of frame 511. The thickness of the plastic sheet stock is left to the discretion of the practitioner, and may vary from implementation-to-implementation depending on, for example, the dimensions and weight of the items to be placed thereupon. Other rigid materials may be used for table top 512 such as, for example, wood or aluminum.

In the embodiment of table assembly 510 shown in FIG. 5, each of the plurality of plastic sheet stock pieces comprises a plurality of threaded holes regularly spaced over the surface of the sheet stock piece. The threaded holes are engageable with clamping device 570 (not shown in FIG. 5) for immobilizing the materials placed on table top 512 during the operation of the present invention. Optionally, plastic sheeting material may be placed over table top 512 during operation of the digitizing apparatus.

Figure 6:
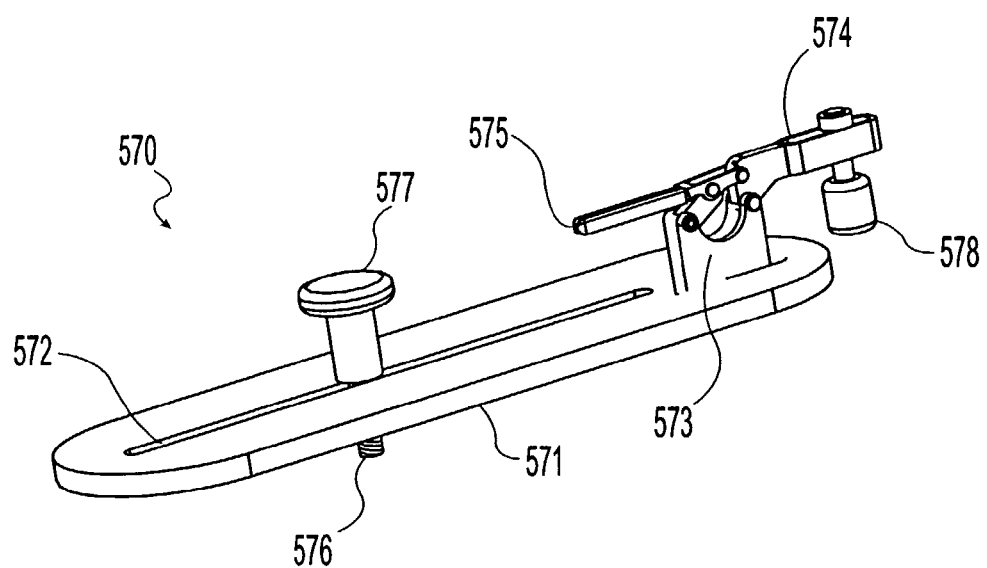
FIG. 6 shows a perspective view of a clamping device used in connection with an embodiment of a digitizing apparatus of the present invention.

An embodiment of clamping device 570 is shown in perspective view in FIG. 6. In the embodiment shown in FIG. 6, clamping device 570 comprises body 571 comprising slot 572 and clamp support 573. Rotatably affixed to clamp support 573 are clamp arm 574 and lever 575. Clamp arm 574 terminates in bumper 578 as shown in FIG. 6. Clamp arm 574 and lever 575 are rotatably engaged with each other as shown in FIG. 6 so that raising lever 575 raises clamp arm 574 and bumper 578. Conversely, lowering lever 575 lowers clamp arm 574 and bumper 578. Lowering lever 575 forces bumper 578 against the material to be clamped to table top 512. Lever 575 is adapted to resist upward movement when it is in the fully lowered position, thus causing bumper 578 to retain its position against the material to be clamped to table top 512. The distance between arm 574 and the distal end of bumper 578 is adjustable to accommodate materials of different thicknesses that are provided for clamping against table top 512.

Clamping device 570 also comprises screw 576 and knob 577. Knob 577 has a first end and a second end. The first end of knob 577 comprises a flat surface with screw 576 protruding substantially perpendicularly therefrom. The second end of knob 577 is adapted to engage with a human hand. Screw 576 is inserted through slot 572 until the first end of knob 577 abuts the top surface of body 571. Slot 572 is sized to permit the insertion of screw 576 substantially anywhere along the length of slot 572. In addition, slot 572 is sized to permit body 571 to slide along and to rotate about screw 576. Screw 576 is threaded such that it is engageable with the threaded holes in table top 512. When the bottom surface of body 571 is placed against the top surface of table top 512 and screw 576 is engaged with a threaded hole in the table top 512, the action of the threaded engagement of screw 576 in the threaded hole in table top 512 forces the bottom surface of knob 577 against the top surface of body 571, thus forcing the bottom surface of body 571 against the top surface of table top 512. Clamping device 570 is thereby held firmly in place on table top 512. Accordingly, when lever 575 is lowered, material held between bumper 578 and table top 512 is hindered from movement during operation of the digitizing apparatus. The position of bumper 578 relative to screw 576 when screw 576 is engaged in table top 512 may be adjusted by sliding body 571 along screw 576 and/or by rotating body 571 about screw 576.

Referring back to FIG. 5, in the embodiment of table assembly 510 shown therein, leveling feet 513 comprise a plurality of vertically adjustable supports installed on the underside of frame 511. Leveling feet 513 engage with the surface upon which digitizing apparatus 401 is installed. During operation, table top 512 should be substantially level and provide a substantially uniform surface. Leveling feet 513 can be individually adjusted to raise and lower portions of frame 511 and table top 512 in relation to the surface upon which digitizing apparatus 401 is installed, to provide a substantially level and substantially uniform surface to table top 512.

In the embodiment of table assembly 510 shown in FIG. 5, rails 514 are present on two opposite ends of frame 511. Rails 514 may be integral with, or affixed to, frame 511. Table top 512 fits between rails 514, with rails 514 extending vertically above the top surface of table top 512 in this embodiment. Rails 514 are engageable with gantry assembly 530 to permit gantry assembly 530 to travel substantially the length of rails 514, as will be discussed in more detail hereinafter.

In the embodiment of table assembly 510 shown in FIG. 5, a plurality of gantry positioners 515 are affixed to frame 511 adjacent to each rail 514 (only one set of gantry positioners 515 is shown in FIG. 5). Each of the plurality of gantry positioners 515 are engageable with gantry assembly 530, as will be discussed in more detail hereinafter. Preferably, the plurality of gantry positioners 515 are installed at regular intervals along substantially the entire length of each rail 514. The number and spacing of gantry positioners 515 are left to the discretion of the practitioner in each implementation of this embodiment of the present invention.

Figure 7:
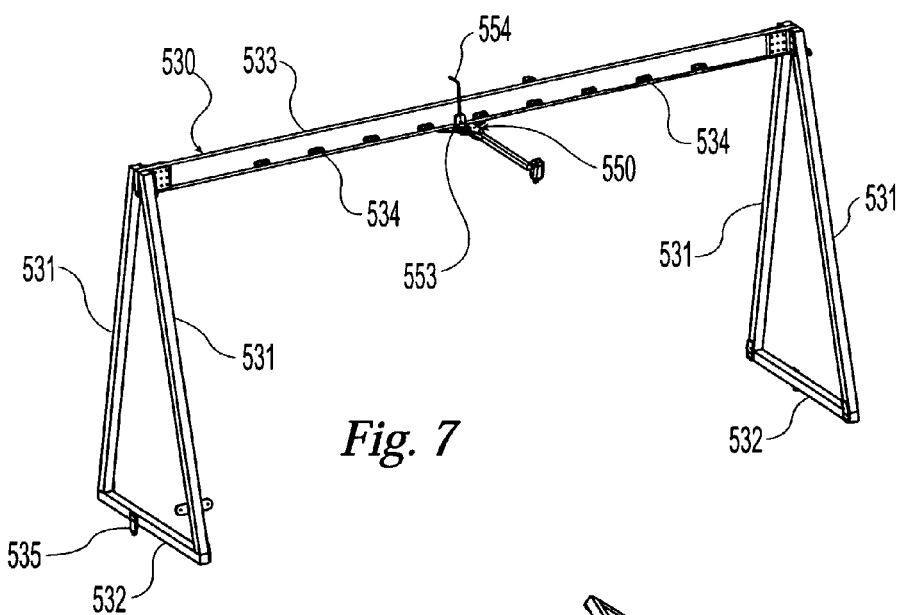
FIG. 7 shows a perspective view of an embodiment of a digitizing apparatus gantry assembly according to the present invention.

FIG. 7 shows a perspective view of an embodiment of gantry assembly 530. In the embodiment shown in FIG. 7, gantry assembly 530 comprises leg members 531, base members 532, crossbeam 533, and a plurality of sensor positioners 534 and gantry locators 535. The components of gantry assembly 530 can be constructed of any material having sturdiness and rigidity sufficient to support the weight of sensor assembly 550, and to withstand the movement of gantry assembly 530 and camera assembly 550 during the operation of the present invention (discussed hereinafter), without undue flexing or swaying of digitizing apparatus 401 or any portion thereof. In one implementation, gantry assembly 530 is constructed of aluminum.

In the embodiment of gantry assembly 530 shown in FIG. 7, a first and a second gantry support are shown, with each gantry support comprising two leg members 531 and one base member 532. Each set of two leg members 531 is fixedly joined to opposing ends of its corresponding base member 532 by means known in the art for fixedly joining the selected material. When joined, leg members 531 and base members 532 of the first and second gantry supports each takes on the shape of a vertically oriented isosceles triangle. To enhance mechanical stability, the first and the second gantry supports may be tilted slightly toward each other so that the distance between the apexes of each gantry support is less than the distance between the base members 532 of each gantry support. The apex of each gantry support is adapted to receive crossbeam 533. Crossbeam 533 has a first end and a second end. By the use of joining methods known in the art, the first end of crossbeam 533 is fixedly joined with leg members 531 at the apex of the first gantry support, and the second end of crossbeam 533 is fixedly joined with leg members 531 at the apex of the second gantry support, as shown in FIG. 7.

In the embodiment of gantry assembly 530 shown in FIG. 7, base members 532 of gantry assembly 530 are adapted to be movably engaged with rails 514 of table assembly 510, permitting gantry assembly 530 to travel substantially the entire length of rails 514. The movable engagement between base members 532 and rails 514 can be, for example, a sliding arrangement wherein base members 532 are adapted to slide along rails 514, or a rolling arrangement wherein base members 532 are adapted to roll along rails 514. A rolling arrangement is preferred.

Each base member 532 in the embodiment of gantry assembly 530 shown in FIG. 7 comprises a gantry locator 535 affixed thereto by means known in the art. The gantry locators 535 should be installed in corresponding positions on their respective base members 532 such that if a line were to be drawn between the center of each gantry locator 535, the line would be parallel to crossbeam 533. In one implementation, each gantry locator 535 is affixed to its respective base member 532 substantially midway between the opposing ends of the respective base member 532.

Gantry locators 535 are engageable with the gantry positioners 515 of frame 511. Engagement of gantry locators 535 with gantry positioners 515 permits gantry assembly 530 to be positioned and held in place at predetermined locations along rails 514. In one arrangement, each gantry positioner 515 comprises a socket, and each gantry locator 535 is adapted to comprise a pin aligned for engagement with the socket of a gantry positioner 515. Gantry assembly 530 is moved along rails 514 until it reaches the desired position. The pin of each gantry locator 535 then is engaged with the socket of a gantry positioner 515, thereby retaining gantry assembly 530 in the desired position. Note, however, that gantry positioners 515 should be installed in matched pairs (with one gantry positioner 515 of each matched pair adjacent to each rail 514) so that the crossbeam 533 of gantry assembly 530 can maintained in a configuration that is substantially perpendicular to rails 514 when held in position by the interaction of gantry positioners 515 and gantry locators 535.

Gantry assembly 530 may be moved along rails 514 by hand operation, or by a power source such as electricity, compressed air, hydraulics, or another power source and/or method known in the art. Likewise, the operation of gantry positioners 515 and gantry locators 535 may be hand operated or powered by electricity, compressed air, hydraulics, or another power source and/or method known in the art. In an embodiment of the present invention wherein the movement and positioning of gantry assembly 530 along rails 514 is accomplished by a power source, the movement and positioning of gantry assembly 530 along rails 514 may be controlled by software means running on computer 402. In such a "computer-controlled" embodiment, a user of computer 402 may use one or more data entry means of computer 402 to select or provide a desired position for gantry assembly 530. Software means running on computer 402 is operable in response thereto to cause gantry assembly 530 to move to the desired position along rails 514 under the control of the gantry assembly's power source. Optionally, the user of computer 402 can program or otherwise provided computer 402 with two or more positions for gantry assembly 530, with computer 402 being operable in response thereto to cause gantry assembly 530 to move to the desired positions along rails 514 sequentially under the control of the gantry assembly's power source. The operation of gantry positioners 515 and gantry locators 535 can be similarly controlled by computer 402. Thus, gantry positioners 515 and gantry locators 535 can be operated in concert with the computer-controlled movement(s) of gantry assembly 530.

In the embodiment of gantry assembly 530 shown in FIG. 7, a plurality of sensor positioners 534 are installed on crossbeam 533 adjacent to the lower edge of crossbeam 533. Each of the plurality of sensor positioners 534 is engageable with sensor platform assembly 550, as will be discussed in more detail hereinafter. Preferably, the plurality of sensor positioners 534 are installed at regular intervals along substantially the entire length of crossbeam 533. The number and spacing of sensor positioners 534 are left to the discretion of the practitioner in each implementation of this embodiment of the present invention.

Figure 8:
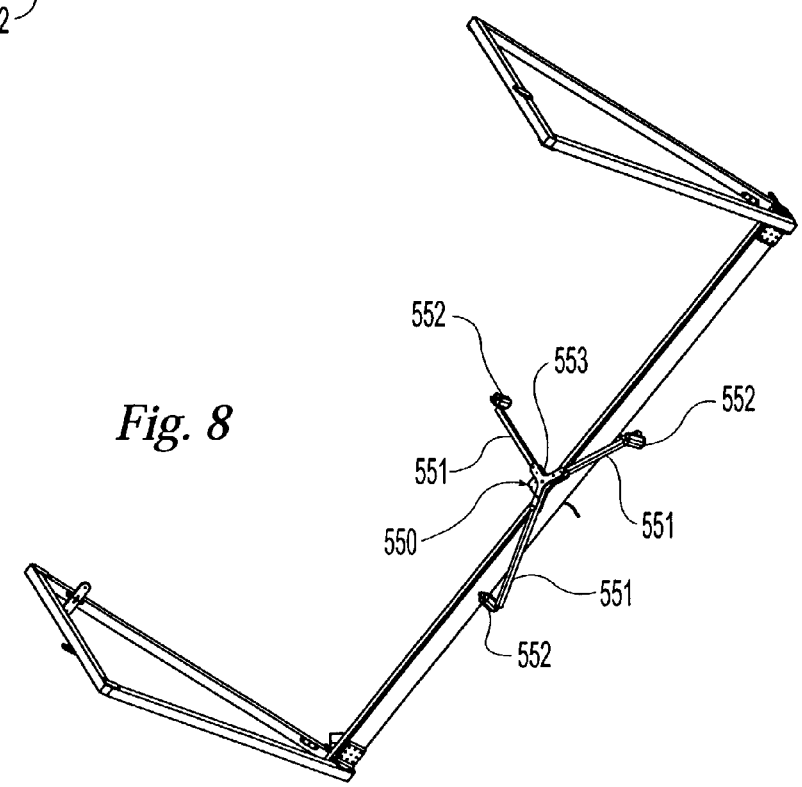
FIG. 8 shows an underside perspective view of an embodiment of a digitizing apparatus sensor platform according to the present invention.

FIG. 8 shows an underside perspective view of an embodiment of sensor platform 550. In the embodiment shown in FIG. 8, sensor platform 550 comprises arms 551, sensors 552, hub 553, and wire guide 554. Arms 551 and hub 553 are fabricated from a suitable material such as aluminum. Each arm 551 comprises a first end and a second end. The first end of each arm 551 is fixedly joined with hub 553 by methods known in the art. A sensor 552 is mounted on the second end of each arm 551. The method used to fixedly join arms 551 and hub 553 must possess sturdiness and rigidity sufficient to support the weight of sensor 552 at the second end of each arm 551 during the operation of the present invention (discussed hereinafter), without movement of sensors 552 in relation to hub 553, and without undue flexing or swaying of arms 551 and sensors 552. The arrangement of arms 551, sensors 552, and hub 553 in this embodiment of sensor platform 550 results in sensors 552 being positioned as the vertices of a substantially equilateral triangle. In an implementation of this embodiment, hub 553 is adapted to comprise a light source positioned within the triangular shape formed by sensors 552. The light source is not shown in FIG. 8. The light source illuminates the target subject matter from substantially the same direction as images of the target subject matter are obtained by the sensors. Use of such a lighting configuration may improve the results achieved by the present invention.

In the embodiment shown in FIGS. 7-8, hub 553 is adapted so that it may be suspended from the lower edge of crossbeam 533. Hub 553 also is adapted in this embodiment to be moveably engageable with the lower edge of crossbeam 533, thereby permitting sensor platform 550 to travel substantially the length of crossbeam 533. The moveable engagement between hub 553 and crossbeam 533 can be, for example, a sliding arrangement wherein hub 553 is adapted to slide along the lower edge of crossbeam 533, or rolling engagement wherein hub 553 is adapted to roll along the lower edge of crossbeam 533. A rolling arrangement is preferred.

Hub 553 is adapted to engage with sensor positioners 534 of crossbeam 533. Engagement of sensor positioners 534 with hub 553 permits sensor platform 550 to be positioned and held in place at predetermined locations along crossbeam 533. In one arrangement, each sensor positioner 534 comprises a socket, and a hub 553 is adapted to comprise a pin aligned for engagement with the socket of a sensor positioner 534. Sensor platform 550 is moved along crossbeam 533 until it reaches the desired position. The pin of hub 553 then is engaged with the socket of the sensor positioner 534, thereby retaining sensor platform 550 in the desired position.

Sensor platform 550 may be moved along crossbeam 533 by hand operation, or by a power source such as electricity, compressed air, hydraulics, or another power source and/or method known in the art. Likewise, the interaction of sensor positioners 534 and hub 553 may be hand operated or powered by electricity, compressed air, hydraulics, or another power source and/or method known in the art. In an embodiment of the present invention wherein the movement and positioning of sensor platform 550 along crossbeam 533 is accomplished by a power source, the movement and positioning of sensor platform 550 along crossbeam 533 may be controlled by software means running on computer 402. In such a "computer-controlled" embodiment, a user of computer 402 may use one or more data entry means of computer 402 to select or provide a desired position for sensor platform 550. Software means running on computer 402 is operable in response thereto to cause sensor platform 550 to move to the desired position along crossbeam 533 under the control of the sensor platform's power source. Optionally, the user of computer 402 can program or otherwise provide computer 402 with two or more positions for sensor platform 550, with computer 402 being operable in response thereto to cause sensor platform 550 to move to the desired positions along crossbeam 533 sequentially under the control of the gantry assembly's power source. The operation of sensor positioners 534 and hub 553 can be similarly controlled by computer 402. Thus, sensor positioners 534 and hub 553 can be operated in concert with the computer-controlled movement(s) of sensor platform 550.

In an embodiment, the movement and positioning of gantry assembly 530 along rails 514 and the movement and positioning of sensor platform 550 along crossbeam 533 may be concurrently computer-controlled. Accordingly, the user of computer 402 can program or otherwise provide computer 402 with one or more positions for gantry assembly 530 and/or sensor assembly 550, with computer 402 being operable in response thereto to cause gantry assembly 530 and/or sensor assembly 550 to move to the desired position(s) sequentially under the control of the respective power source(s).

Referring back to FIG. 7, in an embodiment where the electronic interconnection between sensor 552 and computer 402 comprises wires terminating at each sensor 552, the wires may be routed through wire guide 554, which is affixed to hub 553 for this purpose. Thus, the wires are routed away from the moving interface between hub 553 and crossbeam 533, thereby reducing the risk of damage to the wires.

In the embodiment shown in FIGS. 5-8, three sensors 552 are shown. However, other embodiments of the present invention may use more or fewer sensors. At least two sensors normally are used. In one implementation of the embodiment of digitizing apparatus 401 shown in FIGS. 5-8, sensors 552 comprise digital cameras having a resolution of at least 1280× 960 pixels, such as, for example, model DFW-SX900 digital cameras available from Sony Corporation. Other models of digital and analog cameras may be used as sensors.

The dimensions and proportions of the embodiment of digitizing apparatus 401 shown in FIGS. 5-8 can adapted according to the needs of a practitioner in a particular implementation of the present invention. In an implementation of this embodiment of digitizing apparatus 401, the dimensions of table top 512 are about 12 ft.×12 ft. Table top 512 in this implementation comprises plastic sheet stock pieces each measuring about 2 ft.×3 ft. Frame 511 in this implementation is constructed in four sections, each measuring about 6 ft.×6 ft. The sections of frame 511 in this implementation may be readily joined and separated to facilitate movement and shipment of the frame. Gantry positioners 515 are positioned at approximately 1 ft. intervals adjacent to each rail 514 in this implementation. The bottom of crossbeam 533 is about 72 in. above the surface of table top 512, and camera positioners 534 are positioned at approximately 1 ft. intervals along cross beam 533 in this implementation. Finally, three sensors 552 are mounted in a triangular arrangement about 40 in. apart in this implementation of digitizing apparatus 401.

Figure 9A:
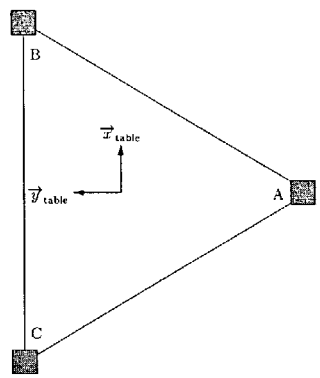
FIGS. 9A-B show block diagrams of a sensor configuration in a three sensor embodiment of a digitizing apparatus according to the present invention.
Figure 9B:
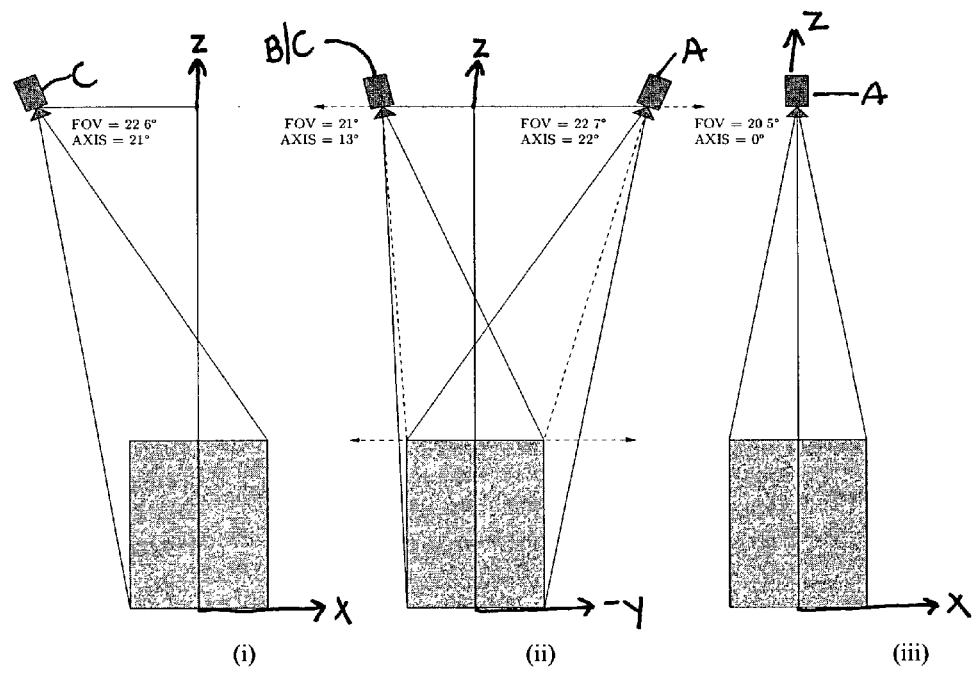

FIGS. 9A-B show block diagrams of a sensor configuration in an implementation of a three sensor embodiment of the present invention. In this implementation, sensors A, B, and C are optical sensors comprising Sony DFW-SX900 digital cameras mounted in a triangular arrangement about 40 in. apart. Sensors A, B, and C are mounted so that the lenses of the respective digital cameras are suspended approximately 69 in. above the surface upon which the target subject matter is placed. Thus, sensors A, B, and C obtain images of the topography of the target subject matter from overhead.

In describing the sensor implementation shown in FIGS. 9A-B, the familiar Cartesian coordinate system is used. The x-axis and y-axis form a plane parallel to the surface on which the target subject matter is placed, such as the surface of table top 512 in the embodiment of digitizing apparatus 401 shown in FIG. 5. The z-axis is perpendicular to the plane formed by the x and y axes. FIG. 9A shows an overhead view of the sensor configuration. View (ii) of FIG. 9B shows a view looking into the yz plane. Views (i) and (iii) of FIG. 9B show views looking into the xz plane. The shaded region shown in each view of FIG. 9B represents the "working volume" which is simultaneously visible from all three sensors.

In the implementation shown in FIGS. 9A-B, sensor A requires a field of view ("FOV") of about 22.7°×20.5°, and sensors B and C each require a FOV of about 22.6°×21° to obtain a desired working volume of about 2 ft.×2 ft.×2 ft. "AXIS" as shown in each view of FIG. 9B is the measurement of the angle between the optical axis of the particular sensor and a plane that includes the z-axis (i.e., the xz plane or the yz plane). In view (i) of FIG. 9B, the AXIS measurement indicates that the angle between the optical axis of sensor C and the yz plane is about 21° in this implementation. View (ii) of FIG. 9B shows that the AXIS measurement for the angle between the optical axis of camera C and the xz plane is about 13° in this implementation, and that the angle between the optical axis of sensor A and the xz plane is about 22° in this implementation. View (iii) of FIG. 9B shows that the AXIS measurement for the angle between the optical axis of sensor A and the yz plane is about 0° in this implementation. Sensor B is not shown in FIG. 9B. However, the absolute value of the AXIS measurements of sensor B relative to the xz plane and relative to the yz plane as the same as those shown for sensor C. The arrangement of sensors A, B, and C in this implementation provides a working volume sufficient to ensure that an approximately 1 ft.×1 ft. region of the topography of the target subject matter (measured parallel to the xy plane), with about 6 in. of overlap on each side of the approximately 1 ft.×1 ft. region, can be obtained anywhere within in the working volume.

Figure 10:
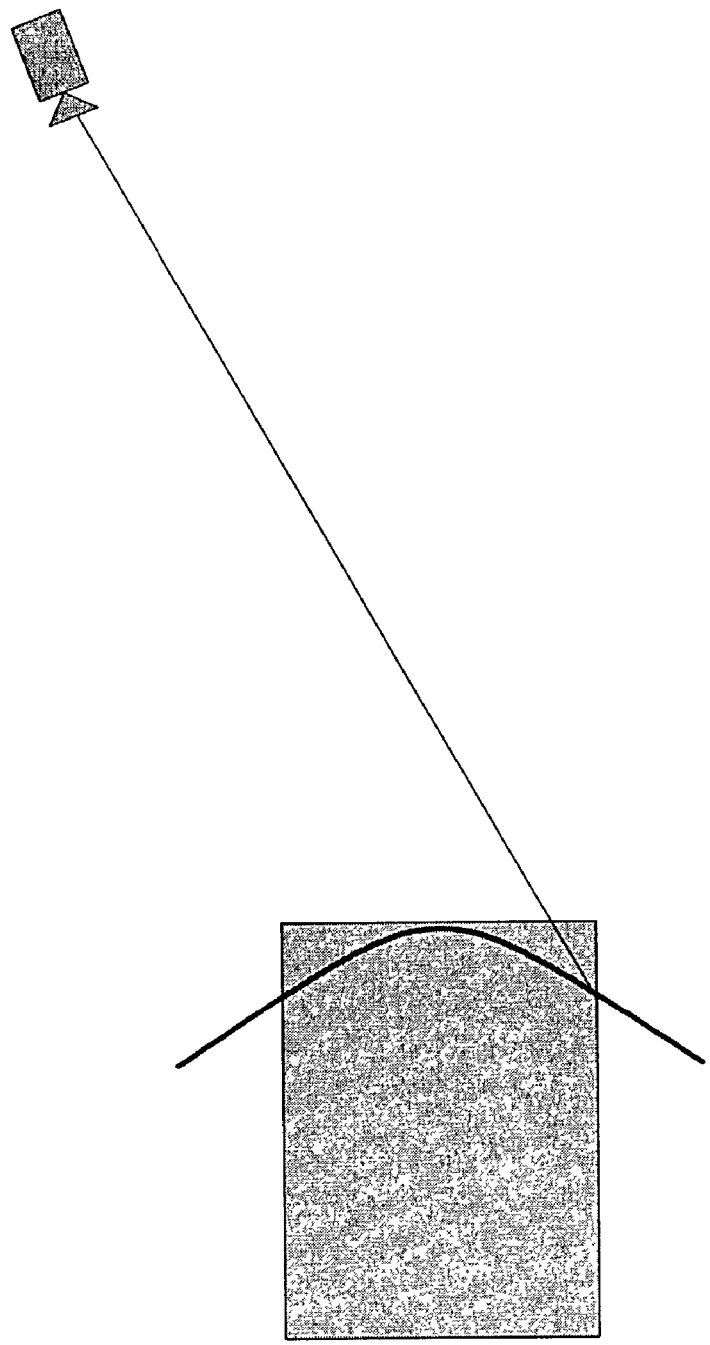
FIG. 10 shows a diagram illustrating a limitation of the sensor configuration shown in FIGS. 9A-B.

Excessive foreshortening caused by steep surfaces of the target subject matter may limit the usefulness of images obtained by this embodiment of digitizing apparatus 401. For example, if the slope of the area of the topography of the target subject matter exceeds about 35°, one or more sensors in the configuration shown in FIGS. 9A-B may not be able to properly image the steep area. FIG. 10 shows the limiting case of the sensor configuration of FIGS. 9A-B. As discussed in more detail hereinafter, other digitizing apparatus embodiments and/or sensor configurations may be employed to obtain images where the topography of the target subject matter comprises one or more slopes exceeding about 35°.

The Sony DFW-SX900 camera used in this implementation of the present invention has a resolution of 1280×960 pixels using an 8 mm (6.4 mm×4.8 mm) charge-coupled device ("CCD") for receiving an image. The image plane of a CCD camera is a rectangular array of discrete light sensitive elements. The output from each of these elements is an analog signal proportional to the amount of light incident upon it. The values for each light sensitive element is read one element at a time, row by row, until the entire array has been read. The analog value of each light sensitive element is converted to a digital value by internal circuitry known in the art. In addition, color cameras require the signals from adjacent red, green, and blue sources to be combined. The result is an array of digital values which can be read into the memory of a computer. A single element of the array in memory is commonly called a pixel.

In the implementation shown in FIGS. 9A-B, a 12 mm C-mount lens (not shown) is mounted on each digital camera. The 12 mm lens, which provides a FOV of 30°×22.6°, is the longest focal length lens that meets the FOV requirements for the sensor configuration discussed in regard to FIGS. 9A-B. Shorter focal length lenses increase the FOV, but also reduce the accuracy with which topographic features of the target subject matter can be located. In the sensor configuration discussed in regard to FIGS. 9A-B, the maximum depth (distance along the optical axis) achievable is 80.2 inches. At this depth, a pixel images a square of about 0.034 in.×0.034 in on a plane perpendicular to the optical axis of each sensor.

Figure 11:
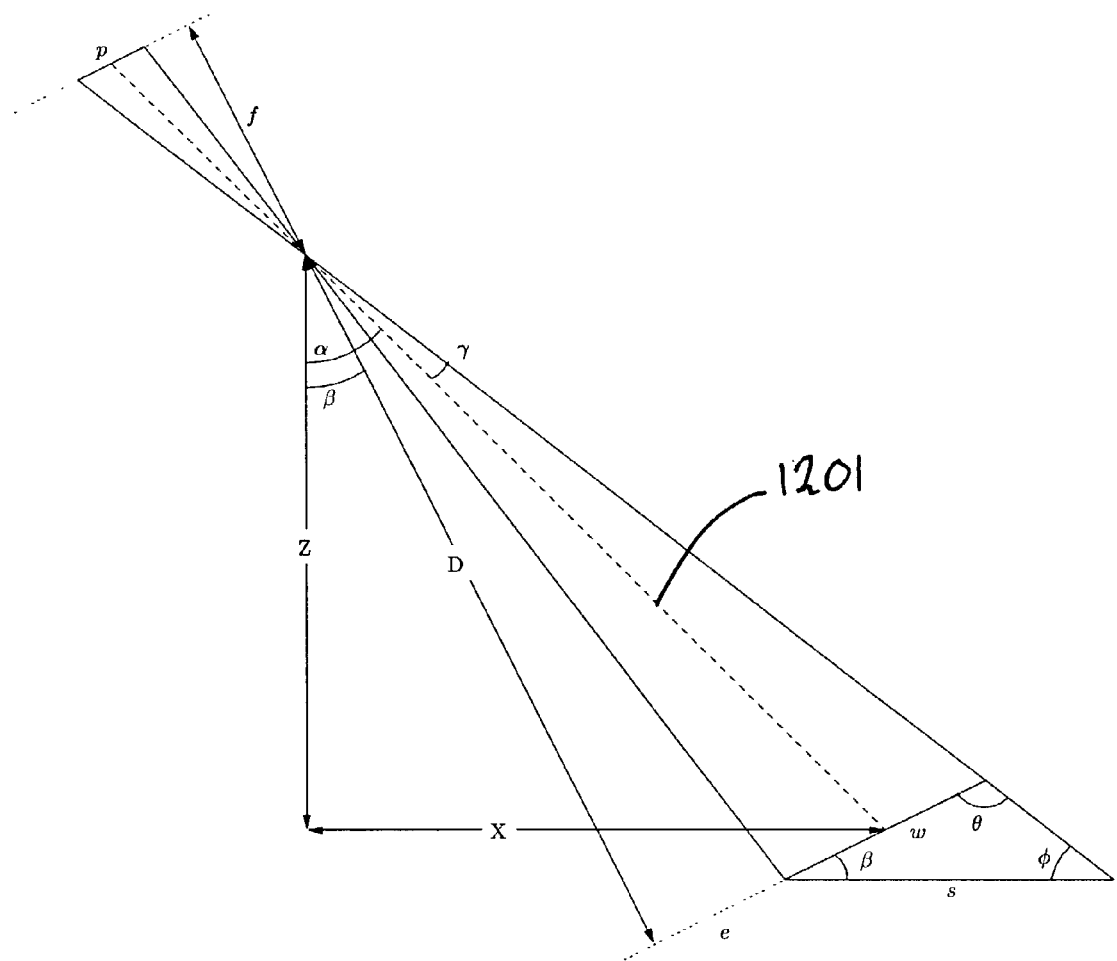
FIG. 11 shows a diagram illustrating the projection of a pixel onto a horizontal plane according to the sensor configuration shown in FIGS. 9A-B.

FIG. 11 shows a pixel p projected onto the xy plane according to the sensor configuration shown in FIGS. 9A-B. In FIG. 11, p is a pixel of size 0.005 mm; f is the focal length and D is the depth along the optical axis of the camera, both of which are known; dashed line 1201 represents the line of sight through the pixel and the center of projection of the sensor; w is the projection of pixel p onto a plane parallel to the image plane at depth D; $\alpha$ is the angle formed by the z-axis and line of sight 1201; $\beta$ is angle formed by the optical axis of the sensor and the z-axis; x is the distance in the x-direction between the camera's center of projection and the centerline of the projection of pixel p onto a plane parallel to the image plane; z is the distance in the z-direction between the camera's center of projection and the centerline of the projection of pixel p onto a plane parallel to the image plane; e is the distance between the end of projection w and the point where the optical axis of the sensor and the plane of projection w intersect; $\gamma$ is approximately the half angle of the field of view of pixel p; $\theta$ is a constructed angle variable equal to 90+$\alpha$−$\beta$+$\gamma$, $\phi$ is a constructed angle variable equal to 180−($\beta$+$\theta$); s represents the projection of image w on the xy plane. In FIG. 11, the line of sight through the pixel in the center of projection of the sensor is not coincident with the optical axis of the sensor. The unknown variables shown in FIG. 11 can be adapted according to the following set of equations:

$$w = \frac{pD}{f}, \quad (1)$$

$$\alpha = \tan^{-1}\frac{x}{z} \quad (2)$$

$$\tan(\alpha - \beta + \gamma) = \frac{e+w}{D}, \quad (3)$$

$$e = D\tan(\alpha - \beta) - \frac{w}{2} \quad (4)$$

$$\theta = \frac{\pi}{2} + \alpha - \beta + \gamma \quad (5)$$

$$\phi = \frac{\pi}{2} - \alpha - \gamma. \quad (6)$$

After solving equations 1-6 for the values of the unknown variables, projection s can be calculated as follows:

$$s = \frac{pD(\sin\beta\tan(\alpha + \gamma) + \cos\beta)}{f} \quad (7)$$

$$\approx \frac{pD}{f\cos\beta} \quad (8)$$

For the sensor configuration shown in FIGS. 9A-B, the maximum value of s is 0.036 inches. Thus, in the sensor configuration shown in FIGS. 9A-B, a point imaged by a pixel can be at most 0.018 inches in x and y from the line of sight through the pixel and the center of projection of the sensor.

It is known that a camera can keep only a limited range of depths in focus. The range of depths which are acceptably focused is known as the "depth of field." The near, $Z_{near}$, and far, $Z_{far}$, limits of the depth of field can be expressed as $$Z_{near} = \frac{Z}{1 + uk\frac{Z-f}{f^2}} \text{ and} \quad (9)$$

$$Z_{far} = \frac{Z}{1 - uk\frac{Z-f}{f^2}} \quad (10)$$

where Z is the depth of field that is exactly in focus, u is the maximum blur spot diameter (sometimes called the circle of least confusion), k is aperture setting expressed as an F-stop number, and f is the focal length of the lens. Blur spot diameter u is frequently set to one pixel, which for the Sony DFW-SX900 is 6.4 mm/1280 pixels×4.8 mm/960 pixels=0.005 mm×0.005 mm. In practice, $Z_{near}$ represents distance from the camera to the closest point in the working volume, and $Z_{far}$ represents the distance from the camera to the farthest point in the working volume. In the implementation of the sensor configuration of FIGS. 9A-B wherein the sensors of digitizing apparatus 401 comprise Sony DFW-SX900 digital cameras, setting $Z_{near}$=4.1 ft., $Z_{far}$=6.8 ft., and f=12 mm, and solving Equations 9 and 10 for Z and k yields 5.1 and 4.5, respectively. Thus, images of the target subject matter within the working volume may be obtained by this implementation of digitizing apparatus 401 using an F-stop of 4.5, assuming adequate illumination.

Figure 12:
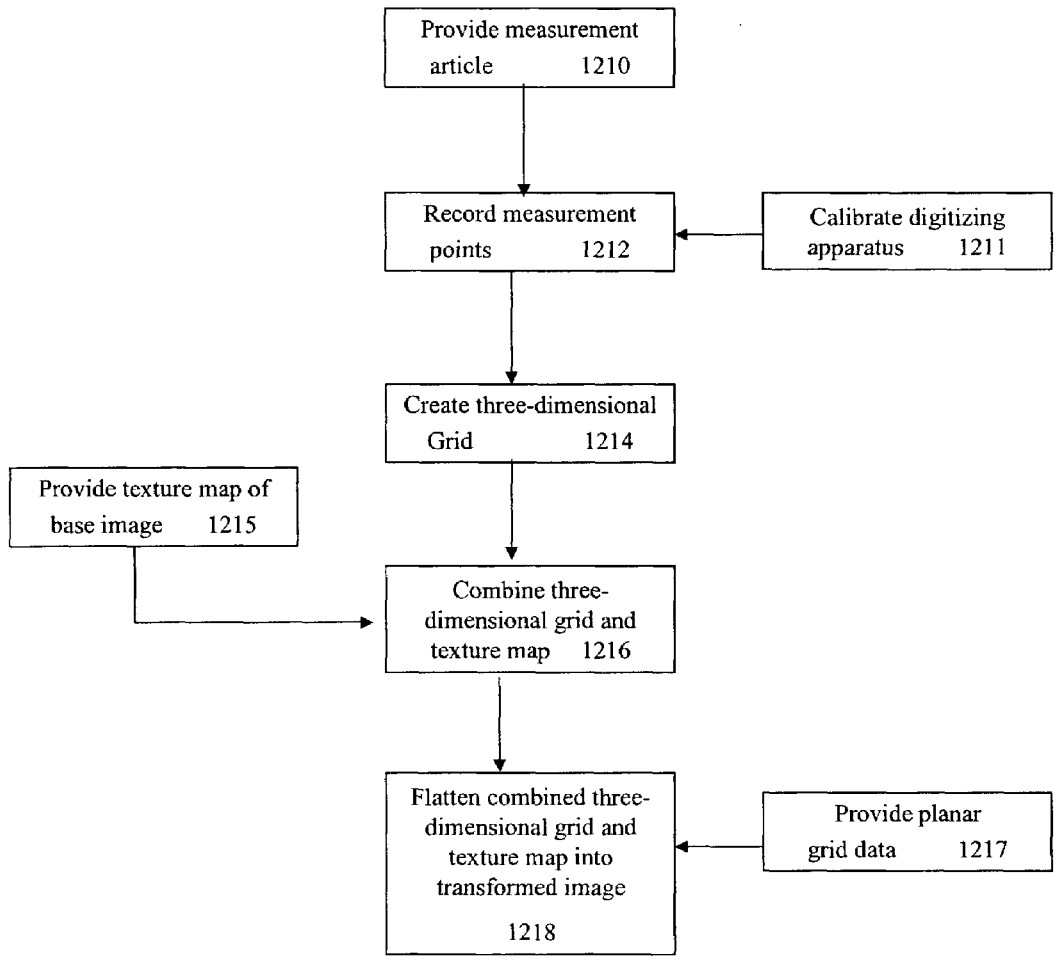
FIG. 12 shows a flowchart illustrating an embodiment of the present invention.

FIG. 12 shows a flow chart illustrating the operation of an embodiment of the present invention. In the step shown as block 1210 of FIG. 12, a "measurement article" comprising a three-dimensional topography is provided. In this embodiment, the measurement article comprises the target subject matter. The topography of the measurement article is recorded by digitizing apparatus 401 and computer 402 in this embodiment.

The topography of the measurement article simulates the topography of the substrate to which the transformed graphical image will be applied. For example, in an implementation where the present invention is adapted for producing pre-distorted part decorations, the measurement article comprises a topography that is substantially the same as the topography of the finished part. In another example, in an implementation where the present invention is adapted for producing pre-distorted images for projection onto a surface, the measurement article comprises a topography that is substantially the same as the topography of the surface on which the image is to be projected.

The source of the measurement article varies according to the particular implementation of the present invention. In an implementation where the present invention is adapted for producing pre-distorted images for projection onto a surface, the actual surface upon which the image will be projected may comprise the measurement article. Alternatively, another surface comprising a topography that is substantially the same as the topography of the surface on which the image is to be projected may be used.

In an embodiment of the present invention adapted for producing pre-distorted decorations for application to a flat substrate before the flat substrate is formed into a three-dimensional part, the measurement article may comprise a flat substrate formed into a topography that is substantially the same as the topography of the finished part. Because of the complex changes experienced by a flat substrate material as it is formed into a three-dimensional part, for best results the flat substrate material formed into the measurement article should have substantially the same forming characteristics as the substrate material to be used in forming the finished part. For example, in a plastic thermoforming application, the flat plastic substrate used in the measurement article should be of the same polymer, and should have substantially the same color, length, width, thickness, density, surface treatment, and ink coverage as the plastic substrate to be used in thermoforming the finished plastic part. The flat plastic substrate used in the measurement article should have the same extrusion direction as the plastic substrate to be used in thermoforming the finished plastic part. The flat plastic substrate used in the measurement article also should have the same thermal characteristics as the plastic substrate to be used in thermoforming the finished plastic part. In addition, because it is typical for only one corner of a sheet of a flat plastic substrate to be cut square, the origin and orientation of the sheet of the flat plastic substrate used in the measurement article should be the same as the origin and orientation of the plastic substrate to be used in thermoforming the finished plastic part. For best results, the flat plastic substrate used in the measurement article should be from the same batch as the plastic substrate to be used in producing the finished plastic part, or should be produced under conditions that are consistent with the conditions under which the plastic substrate to be used in producing the finished plastic part is produced.

Likewise, in a metal forming application of the present invention, the sheet of the flat metal substrate used in the measurement article should be of the same alloy, and should have substantially the same length, width, thickness, density, grain orientation, and forming characteristics as the metal substrate to be used in forming the finished metal part. For best results, the sheet of the flat metal substrate should be from the same batch as the metal substrate to be used in producing the finished metal part, or should be produced under conditions that are consistent with the conditions under which the metal substrate to be used in producing the finished metal part is produced.

To produce a measurement article from a flat substrate material, a topographic mold is required. The topographic mold used in production of the measurement article has substantially the same dimensions, contours, and proportions as are desired in the finished part. In an embodiment, the dimensions, contours, and proportions of the topographic mold may be derived from a three-dimensional computer model of the finished part. The topographic mold may be constructed from any suitable material as would occur to one of skill in the art to use such as, for example, wood, plaster, a plastic material, steel, aluminum, or other compounds or materials suitable for milling or casting. Methods for creating a topographic mold depend on the material selected, but are known to those of skill in the art.

The measurement article is produced by conforming the flat substrate material to the surface of the topographic mold. It is known in the plastic thermoforming art that the extent to which a flat plastic substrate material stretches and deforms during thermoforming can be affected by ambient conditions such as the temperature and relative humidity of the environment in which the flat plastic substrate material is stored, and the temperature and relative humidity of the environment in which thermoforming is performed. In one embodiment, the temperature of the environment in which the flat plastic substrate material is stored and formed is in the range of about 10° C. to about 40° C., and the relative humidity of the environment in which the plastic sheet is stored and formed is less than about 85%. Preferably, the temperature and relative humidity of the environment in which the flat plastic substrate material is stored and formed into a measurement article are substantially the same as the temperature and relative humidity of the environment in which the production plastic material is stored, and in which the plastic parts are produced.

In addition, the process conditions under which the thermoforming of a plastic measurement article is conducted should be reflective of the conditions under which production thermoforming is conducted. For example, the temperature to which the plastic substrate is heated and the temperature of the topographic mold during thermoforming of the measurement article should be substantially the same as the temperature to which the plastic substrate is heated and the temperature of the topographic mold during production thermoforming.

Similarly, the process conditions under which a metal measurement article is conducted should be reflective of the conditions under which production forming of the metal part is conducted.

Measurement articles in embodiments of the present invention adapted for processes such as decaling, lamination, in-mold decoration, insert-mold decoration, and shrink wrapping frequently comprise a first and a second component. For example, in an embodiment of the present invention adapted for decaling or lamination, the first component of the measurement article comprises a material consistent with the first substrate upon which the decoration is to be applied, and the second component of the measurement article comprises a material consistent with the second substrate to which the first substrate is to be applied. In an embodiment of the present invention adapted for in-mold or insert-mold decoration, the first component of the measurement article comprises a material consistent with the appliqué material, and the second component of the measurement article comprises a material consistent with the plastic or metal substrate to which the appliqué is applied during the molding process. In an embodiment of the present invention adapted for shrink wrapping, the first component of the measurement article comprises a material consistent with the shrink wrap plastic substrate, and the second component of the measurement article comprises a material consistent with the underlying material to which the shrink wrap plastic substrate is applied.

In the step shown as block 1211 of FIG. 12, the digitizing apparatus of the present invention is calibrated. In operation, the digitizing apparatus' sensors obtain images of the target subject matter. These images are used in transforming the appearance of a graphical image, and for other purposes discussed herein. Calibration of the digitizing apparatus is necessary to improve the likelihood that that the images obtained by the digitizing apparatus' sensors accurately reflect the target subject matter.

The calibration procedure in a particular embodiment of the present invention used depends on the type, number, and configuration of the sensor(s) selected for the digitizing apparatus in that embodiment. In an embodiment of the present invention, calibration of the digitizing apparatus comprises acquiring two or more images of a target subject matter. A plurality of points on or related to the target subject matter have known positions in three-dimensional "world" coordinate system. The images of the target subject matter obtained by the digitizing apparatus' sensors contain images of these world points in a sensor-based coordinate system, which usually is two-dimensional. Calibration involves determining the mathematical relationships between the location of these points in the three-dimensional "world" coordinate system, and the images of the points in the sensor-based coordinate system.

In an embodiment of the digitizing apparatus wherein the sensors comprise digital cameras, the digital cameras are calibrated using a calibration method known in the art, such as, for example, Tsai's algorithm or the bundle adjustment method. Tsai's algorithm is described by Roger Y. Tsai in his article entitled "A Versatile Camera Calibration Technique for High-Accuracy Three-dimensional Machine Vision Metrology Using Off-the-Shelf TV Cameras and Lenses," published in the *IEEE Journal of Robotics and Automation*, RA-3(4): 323-344, August 1987, the disclosure of which is incorporated herein by reference. The bundle adjustment method is described by S. I. Granshaw in his article entitled "Bundle Adjustments Methods in Engineering Photogrammetry," published in the *Photogrammetric Record*, 10(56):181-207. The camera model used herein comprises the pin-hole camera model utilizing the perspective projection model of three-dimensional to two-dimensional image formation.

Figure 13:
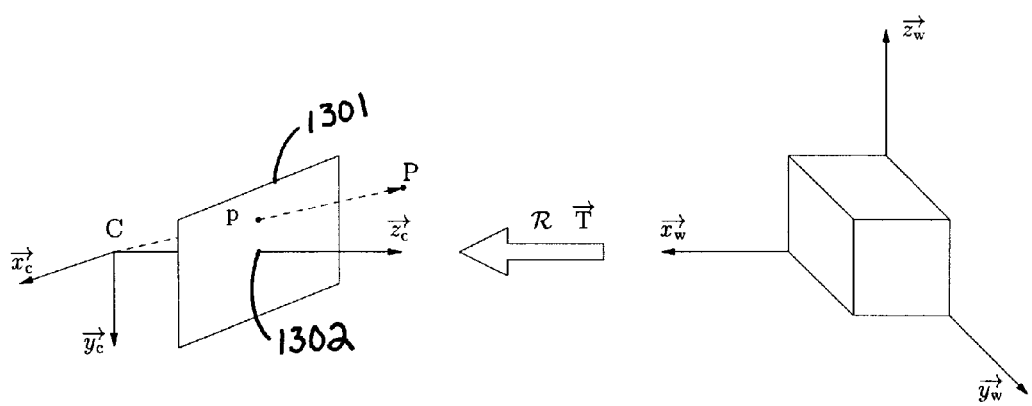
FIG. 13 shows a diagram of a camera-centered coordinate system and a "world" or "absolute" coordinate system according to an embodiment the present invention.

The left side of FIG. 13 shows a perspective view of a camera-centered Cartesian coordinate system according to the camera model used in the present invention. The camera's optical axis is coincident with the z-axis and its center of projection C is at the origin. The camera's image plane 1301 is parallel to the xy plane and located a distance f (the "focal length") from the origin. Thus, the values of image plane pitch $\theta_x$ and image plane tilt $\theta_y$ both are 0.

The point where the image plane and the optical axis intersect is known as the "principal point." The principal point is designated by reference numeral 1302 in FIG. 13. According to the perspective projection model, a three-dimensional point $P_c=[X_c, Y_c, Z_c, 1]$ projects to point $p=[x, y, 1]$ on the two-dimensional image plane according to the following equations:

$$x = f \frac{X_c}{Z_c} \quad (11)$$

$$y = f \frac{Y_c}{Z_c} \quad (12)$$

In theory, image plane 1301 is continuous. However, in practice, image plane 1301 is represented by an array of discrete pixels in computer memory. It is not possible to exactly map the discrete pixels to the continuous coordinate system of image plane 1301. In addition, the image capturing processes introduce noise and ambiguity in the image data such as, for example, pixel jitter which in extreme cases can cause the x and y axes to appear non-orthogonal or skewed. However, in the camera model used in the present invention, it is assumed that skew angle $\theta_{xy}$ (the angle between the x and y axes minus 90°) is 0.

The row and column number of a given pixel are identified as y' and x', respectively, in the camera model used in the present invention. Several parameters are defined to quantify the relationship between the pixel array in memory and the coordinate system of the image plane. Coordinates $x_0, y_0$ are the pixel coordinates of principal point 1302. Scale factor variables $s_x$ and $s_y$ are the number of pixels per unit distance in the x and y direction of the image plane, respectively. These parameters, along with focal length f and skew angle $\theta_{xy}$, are known as the "intrinsic" or "internal" camera calibration parameters, and are used in Tsai's camera calibration algorithm.

The projection of three-dimensional point $P_c=[X_c, Y_c, Z_c, 1]$ to point $p'=[x', y', 1]$ in computer memory is described by the following equations:

$$x' = fs_x + \frac{X_c}{Z_c} + x_0 \quad (13)$$

$$y' = fs_y + \frac{Y_c}{Z_c} + y_0 \quad (14)$$

or more compactly $$p = LP \quad (15)$$

which can be restated as $$p = \begin{bmatrix} fs_x & \tan\theta_{xy} & x_0 \\ 0 & fs_y & y_0 \\ 0 & 0 & 1 \end{bmatrix} P \quad (16)$$

Matrix L is a 3×3 upper triangular matrix which contains the internal camera calibration parameters.

Referring back to FIG. 13, the right side thereof shows an arbitrary Cartesian coordinate system which can be referred to as the "world" or "absolute" coordinate system. A point $P_w$ in the world coordinate system is transformed into a point $P_c$ the camera-centered Cartesian coordinate system shown in the left side of FIG. 13 by the following equation:

$$P_c = \Re P_w + \vec{T} \quad (17)$$

which can be restated as $$P_c = \begin{bmatrix} \Re & \vec{T} \\ 0 & 1 \end{bmatrix} P_w \quad (18)$$

where $\Re$ is a 3×3 orthonormal rotation matrix and $\vec{T}$ is a 1×3 translation vector. The matrix relating point $P_w$ and point $P_c$ is commonly referred to as the "extrinsic" or "external" camera parameters. The external camera parameters are used in Tsai's camera calibration algorithm.

The pin-hole camera model used in the present invention is a linear model and is not able to model nonlinear effects such as lens distortion. The major categories of lens distortion are radial distortion, where the path of a light ray traveling from the object to the image plane through the lens is not always a straight line; decentering distortion, where the optical axis of individual lens components are not always collinear; and thin prism distortion, where the optical axis of the lens assembly is not always perpendicular to the image plane. Radial distortion is another internal camera calibration parameter, represented by $k_l$. Tsai's algorithm explicitly solves for the radial distortion parameter.

The camera calibration procedure of the present invention uses a set of corresponding points to find the internal ($fs_x$, $fs_y, x_0, y_0, k_l$), and external ($\Re$ and $\vec{T}$) parameters which map world points to image points. These parameters serves as inputs to Tsai's algorithm, which is used to recover the camera calibration. Since $fs_x$ and $fs_y$ cannot both be separated, the value of $s_x$ is set to 1.0. Thus, parameter $fs_x$ is equal to the focal length of the camera measured in pixels.

Figure 14:
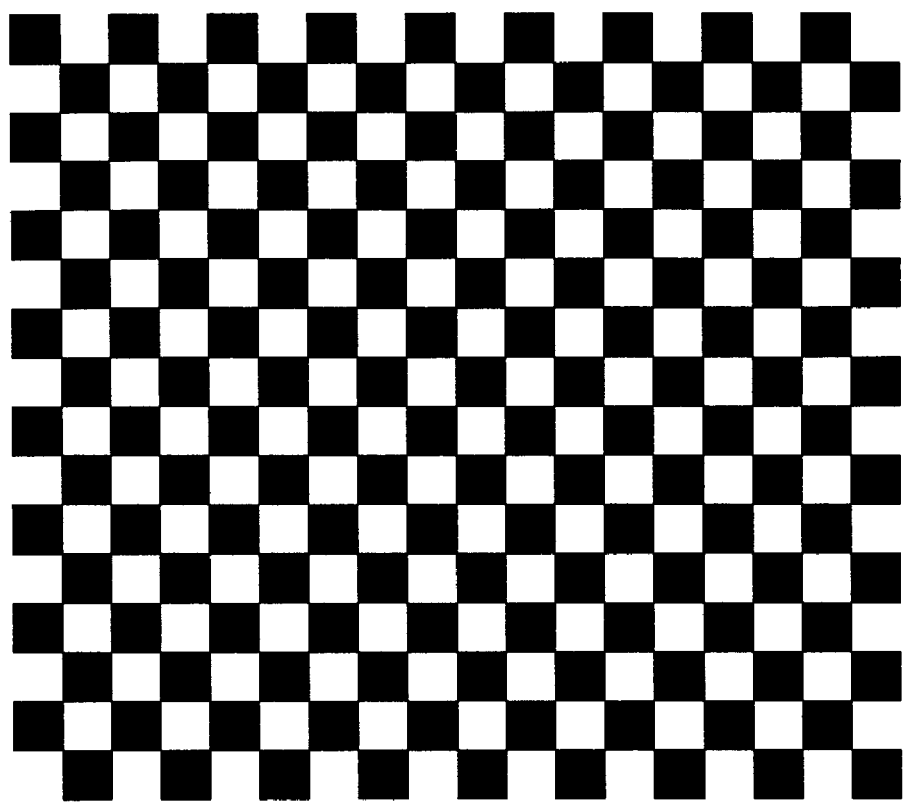
FIG. 14 shows an exemplary checkerboard pattern used in an embodiment of a calibration procedure according to the present invention.

FIG. 14 shows an exemplary two-dimensional checkerboard pattern used in an embodiment of a camera calibration procedure according to the present invention. The checkerboard pattern shown in FIG. 14 is mounted on a planar template and then is used to build a set of corresponding image points and world points.

According to this embodiment of the camera calibration procedure, the points where the image of two black squares and two white squares meet can be precisely located using a corner detector of a type known in the art, such as the corner detector disclosed by C. J. Harris and M. Stevens in *Proceedings of the 4th Alvey Vision Conference*, pp. 147-151, the disclosure of which is incorporated herein by reference. A corner detector identifies points where two distinct edges meet. For example, consider a small region Q around point p. Construct matrix M, defined as $$M = \begin{bmatrix} \sum E_x^2 & \sum E_x E_y \\ \sum E_x E_y & \sum E_y^2 \end{bmatrix} \quad (19)$$

where vector $[E_x, E_y]^T$ is the image gradient ($E_x$ and $E_y$ represent the image gradient in the x and y directions, respectively), and the sums are taken over the region Q. The eigenvectors of M encode edge direction, and the eigenvalues of M encode edge strength. Thus, corners can be identified as locations where the smallest eigenvalue $\lambda_2$ is large. Eigenvalue $\lambda_2$ will also be large for points near the actual corner. By finding the peak of $\lambda_2(x, y)$, a corner can be located with sub-pixel accuracy.

The coordinates of the world points are determined by the physical dimensions of the checkerboard pattern and its placement in the world coordinate system. The outer dimensions of the template containing the checkerboard are known, as are the dimensions of the black and white squares of the checkerboard pattern. Typically, one of the outer corners of the checkerboard pattern, or one of the outer corners of the template containing the checkerboard pattern, is arbitrarily chosen as the origin. Because the dimensions of the black and white squares are known, the x and y coordinates of the points where two black squares and two white squares meet (each a "world point") can be calculated. After the x and y coordinates of the world points are calculated, each image point can be matched with the correct world point.

The regularity of the checkerboard pattern can be exploited to automatically establish the correspondence and reduce the number and size of regions which must be explored for points where two black squares and two white squares meet. An embodiment of a camera calibration procedure according to the present invention is as follows:

1. Position the checkerboard. The checkerboard pattern should be substantially parallel to the xy plane (e.g., the surface of table top 512 in FIG. 5), and at a known z displacement above the xy plane. Because the origin, the x and y dimensions of the black and white squares, and the z distance between the origin and the xy plane all are known, the [x,y,z] coordinates of the world points can be calculated.
2. Obtain an image of the checkerboard pattern using digitizing apparatus 401. Store the obtained image in computer 402.
3. Using software means running on computer 402, dilate the stored image so that the white squares are more clearly distinguishable from the black squares.
4. Using software means running on computer 402, "threshold" the dilated image to produce a binary image. Step 2 hereof results in each pixel having a "pixel value." For example, pixel values may range from 0 to 255 for grayscale, or (0, 0, 0) to (255, 255, 255) for color. Conventionally, the lowest value (0 or (0,0,0)) represents black, and the highest value (255 or (255,255,255)) represents white. However, it is unlikely that all pixels comprising images of the black squares of the checkerboard pattern have pixel values of 0 (or (0,0,0)), and that all pixels comprising images of the white squares of the checkerboard pattern have pixel values of 255 (or (255, 255,255)). Some variability in pixel values is anticipated due to non-uniform ambient lighting and other factors. However, because the checkerboard calibration pattern contains only white and black colors, it is anticipated that the image obtained in step 2 above will result in pixels whose values will form at least two clusters. One cluster of pixel values (for the pixels representing the black squares) will skew toward the lower end of the range, and another cluster of pixel values (for the pixels representing the white squares) will skew toward the upper end of the range.

"Thresholding" involves selecting a threshold pixel value between the two clusters. Pixels values above the threshold pixel value are considered to be white and are assigned the value 255 (or (255,255,255)). Pixel values below the threshold pixel value are considered to be black and are assigned the value 0 (or (0,0,0)). The new pixel values are saved in computer 402.

Figure 15A:
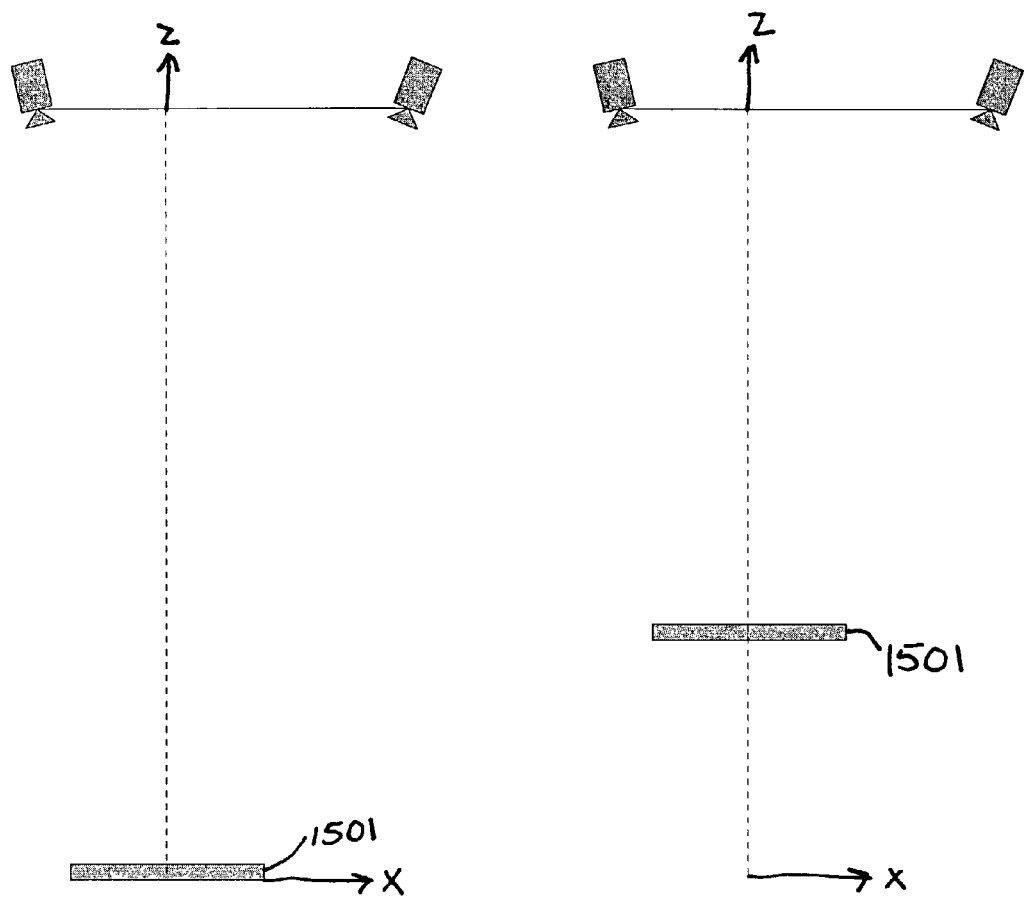
FIG. 15A shows a side view of a calibration template in two different z-axis displacement positions during a calibration procedure according to the present invention.
Figure 15B:
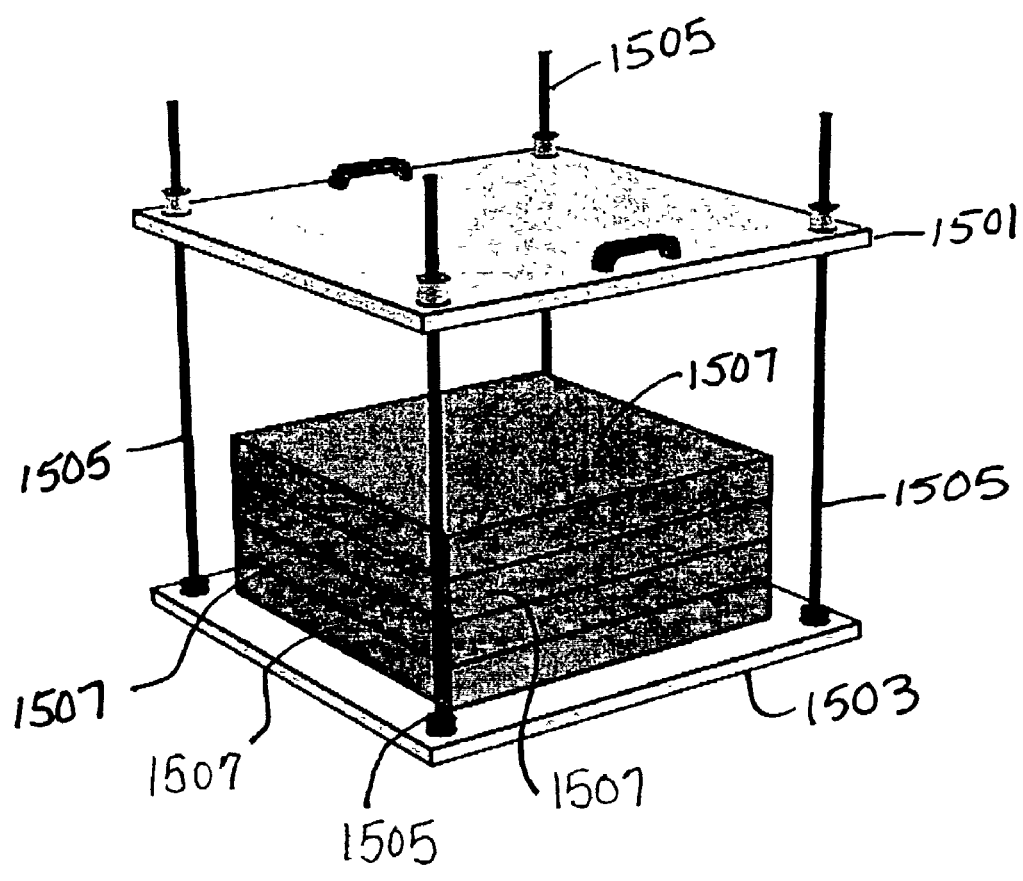
FIG. 15B shows a perspective view of a calibration jig used in a calibration procedure according to the present invention.

5. Using software means running on computer 402, fit quadrilaterals to the white squares. Because it is known that the checkerboard pattern contains only white and black squares of specific dimensions, white objects that are not quadrilaterals or are significantly smaller than or larger than anticipated, are assumed to be noise and are discarded.
6. Using software means running on computer 402, save the locations where two quadrilateral corners are close together in computer 402. These are the "image points" of interest that will be used to construct the mathematical relationship between image points and world points.
7. Using software means running on computer 402, order the image points by rows and then columns in the pixel array.
8. Using software means running on computer 402, find the precise x and y location of each image point using a corner detection method.
9. Using software means running on computer 402, apply the previously defined z displacement to construct the world points. Store the constructed world points in computer 402.
10. Reposition the checkerboard pattern, selecting a new z displacement while ensuring that the x and y positioning of the checkerboard does not change. Repeat steps 1-9 until enough points are collected. Usually 8-12 images are sufficient. FIG. 15A shows a side view of calibration template 1501 in two different z-axis displacement positions during calibration. FIG. 15B shows a perspective view of a calibration jig used to raise and lower the calibration template 1501 in predetermined z-axis displacement increments. Shown in FIG. 15B are calibration template 1501, base 1503, a plurality of guides 1505, and a plurality of spacers 1507. The checkerboard pattern is not shown in FIG. 15B. The thicknesses of calibration template 1501, base 1503, and spacers 1507 are known. Guides 1505 are rigid members engaged with calibration template 1501 and base 1503, and serve to align calibration template 1501 and base 1503. During use, base 1503 is engaged against the surface comprising the xy plane (e.g., the surface of table top 512 in FIG. 5).

Optionally, base 1503 may be affixed to the surface comprising the xy plane to prevent it from moving in the x or y direction. Calibration template 1501 is raised along guides 1505, and at least one spacer is inserted between calibration template 1501 and base 1503 as shown in FIG. 15B. After a first set of calibration images is taken one, or more spacers 1507 can be added to or removed from the space between calibration template 1501 and base 1503, thereby adjusting the z-axis displacement of calibration template 1501 so that a second set of calibration images may be taken.

11. Using software means running on computer 402, apply Tsai's algorithm to recover the camera calibration.
12. Repeat Steps 1-11 for each camera. The origin of the checkerboard pattern must be the same for each camera. Once a camera is calibrated, it should not be adjusted (focus, aperture, etc.) or moved relative to the other cameras. In practice, multiple cameras can be calibrated in parallel rather than sequentially.

Calibration not only provides information about individual cameras, but also the relationship between cameras. For example, if $P_A$ is a world point expressed in the coordinate system of camera A, then $P_B$, the same world point expressed in the coordinate system of camera B, is $$P_B = \mathfrak{R}_B \mathfrak{R}_A^{-1}(P_A - \vec{T}_A) + \vec{T}_B \quad (20)$$

This relationship will be used hereinafter (in Equation 22 and elsewhere) to reconstruct the world coordinates of the imaged points during operation of this embodiment of the present invention.

The calibration step shown as block 1211 in FIG. 12 is not required each time the digitizing apparatus is used. As long as the camera's settings and the positions and orientations of the cameras relative to each other are not changed after calibration, the digitizing apparatus should remain in calibration.

Referring back to FIG. 12, in the step shown as block 1212 thereof digitizing apparatus 401 is used to obtain one or more images of all or a portion of the topography of the measurement article. The one or more images obtained by digitizing apparatus 401 are recorded in computer 402. To facilitate the recordation of the measurement article's topography by digitizing apparatus 401 and computer 402, the measurement article comprises a plurality of "measurement points" that collectively are representative of its topography. The plurality of measurement points are configured in a manner that makes the measurement points detectable by the digitizing apparatus' sensors. Each measurement point detected by the digitizing apparatus' sensors is stored in the memory of computer 402, and then used by computer 402 to create a three-dimensional computer model of the measurement article's topography, as is discussed in more detail hereinafter in regard to the step shown as block 1214 of FIG. 12.

The number, spacing, and positioning of the plurality of measurement points is left to the discretion of the practitioner, and may vary from one implementation of the present invention to the next. In general, a greater number of measurement points is preferred to a lesser number, because the use of a greater number of measurement points provides more data about the topography of the measurement article. However the number, spacing, and positioning of measurement points is limited by the resolution of the sensors. Thus, given a fixed working volume, use of a higher resolution sensor can enable the use a greater number of measurement points than the use of a lower resolution sensor. Where the sensors comprise digital cameras, measurement points should not be positioned closer than the distance that equates to two pixels in the image plane of the camera. Preferably, measurement points are separated by a distance that equates to at least three pixels in the image plane of the camera.

Measurement points may take on any format as long as the measurement points are detectable by the sensors. Accordingly, where the sensors are configured for only the visible spectrum, the measurement points are detectable in the visible spectrum. Where the sensors are configured for the infrared or ultraviolet spectrums, measurement points are detectable in the desired spectrum. Where the sensors are configured for radiation of another wavelength or range of wavelengths, measurement points are detectable in the wavelength or range of wavelengths for which the sensor is configured.

Measurement points may comprise any arrangement of discernable elements. For example, measurement points may comprise the vertices of a pattern of intersecting lines, or the corners of a pattern of squares, or may be as simple as pixels. Measurement points also may comprise a non-orthogonal pattern of discernable elements. When an object is printed the ink is put onto the substrate in a dot pattern. These patterns are usually less than 300 dots per inch. These printed dots are an arrangement of discernable elements that may be used as measurement points.

In an embodiment, the plurality of measurement points comprises a two-dimensional array, wherein each of the plurality of measurement points comprises a [u,v] coordinate in the array. One measurement point is identified as the origin (coordinate [0,0] in the array) and then each other measurement point may be assigned a [u,v] coordinate relative to the origin and relative to the other measurement points between it and the origin.

The orientation of the array of measurement points relative to the topography of the measurement article is recorded. For example, two or more "alignment points" common to the array of measurement points and the topography of the measurement article may be recorded. These alignment points then may be used for future accurate alignment of the array of measurement points and the topography of the measurement article.

Any means known in the art and appropriate for the measurement article may be used to allocate measurement points to the three-dimensional topography of the measurement article. For example, in an embodiment where the present invention is adapted for producing transformed graphical image for projection onto a surface, and the measurement article is representative of the surface upon which the transformed graphical image is to be projected, an image of the measurement points may be projected onto the measurement article, or the measurement points may be printed or painted onto the measurement article by means known in the art, or the measurement points may be applied onto the measurement article such as in the form of one or more decals.

Where the present invention is adapted for producing predistorted decorations for application to a flat substrate before the flat substrate is formed into a three-dimensional part, and the measurement article comprises at least one sheet of the flat substrate formed into a topography that is substantially the same as the topography of the finished part, the measurement points preferably are allocated to the at least one sheet of the flat substrate before it is formed into the measurement article. The measurement points preferably are allocated to the sheet of the flat substrate before forming because of the complex changes that may be experienced by the flat substrate material as it is formed into a three-dimensional part. In this adaptation of the present invention, it is desired not only to record the topography of the measurement article, but also the changes experienced by the flat substrate material as it is formed into the three-dimensional measurement article.

Measurement points may be spatially coded either using color or patterns to aid the digitizing apparatus in detecting the measurement points. In addition, to prevent confusion between the measurement points and ambient lighting on the measurement article when recording the measurement points, the measurement points may be produced using fluorescent or reflective inks and scanned under UV, IR, or laser light.

Fluorescent or reflective inks are useful in an application of the present invention to plastic thermoforming. The use of dark inks in the pattern of measurement points may induce thermal effects on the plastic substrate, because the areas of the substrate covered with dark inks absorb heat faster than the areas with lighter inks or lesser ink coverage. During forming of the measurement article, the plastic substrate flows from dark areas to light ones. Because the measurement points reflect the changes in the surface of the substrate, the thermal effect introduced by dark ink may introduced error in the measurement of the topography of the measurement article. By using fluorescing inks, the measurement points can be detected, but without the introduction of thermal effects during the forming of the measurement article. It may be necessary to coat the measurement article with fluorescing inks for the measurement points, with a transparent but thermally identical coating for the areas that do not contain measurement points.

In an embodiment of the present invention, the measurement points are arranged in a grid-like configuration. However, because of the three-dimensional topography of the measurement article, the grid-like configuration of the measurement points in this embodiment is not planar. Thus, while each measurement point comprises a [u,v] coordinate in the array of measurement points, each measurement point also comprises a [x,y,z] position in the three-dimensional Cartesian coordinate system of digitizing apparatus 401. The [x,y,z] positions of measurement points are recovered by digitizing apparatus 401 and computer 402 and then used by computer 402 to create a three-dimensional grid representing the measurement article's topography, as is discussed in more detail hereinafter in regard to the step shown as block 1214 of FIG. 12.

Figure 16:
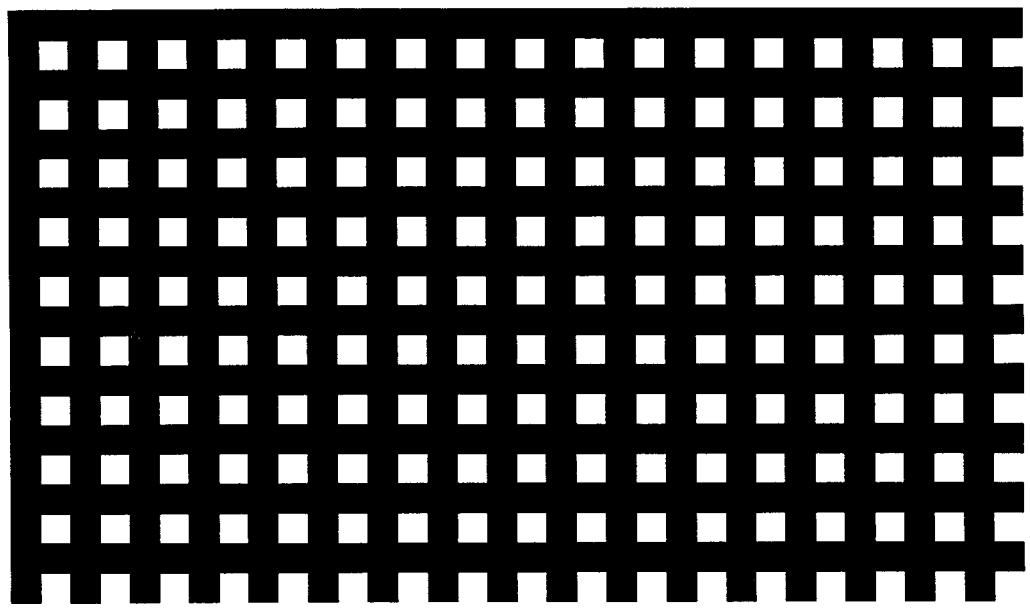
FIG. 16 shows a portion of an exemplary striped pattern used in an embodiment of the present invention.

In an embodiment, the measurement points comprise vertices of a pattern of intersecting stripes. FIG. 16 shows a portion of an exemplary stripe pattern that may be used in this embodiment. In the stripe pattern shown in FIG. 16, a plurality of black stripes form a regular pattern of white squares. Like the checkerboard pattern used for sensor calibration, stripe pattern shown in FIG. 16 comprises many high contrast corners which can be precisely located by use of a corner detector of a type known in the art. As shown in FIG. 16, the stripe pattern is orthogonal and planar. However, when the stripe pattern takes on the three-dimensional topography of the measurement article, the stripe pattern loses its orthogonal appearance. For example, the stripe pattern may be printed on a sheet of a flat substrate and then formed into a three-dimensional measurement article. The stripe pattern deforms in accordance with the deformation of the surface of flat substrate during forming. When used in a plastic thermoforming application, the exemplary stripe pattern of FIG. 16 provides 75% ink coverage. This typically is not a problem in larger applications with loose tolerances, but the thermal effects of the ink coverage may be problematic for smaller, more precise plastic parts.

In operation, the measurement article and the digitizing apparatus' sensor(s) are positioned relative to each other so that least a portion of the measurement article is sensible by the digitizing apparatus' sensor(s). In an embodiment where the sensors of digitizing apparatus 401 comprise two or more optical sensors arranged in a stereoptic configuration, the measurement article should be simultaneously visible by at least two optical sensors for best results.

After the measurement article and the digitizing apparatus' sensor(s) are in place, an image of the portion of the measurement article within the working volume is obtained by each sensor and transmitted to computer 402 where it is recorded. Where two or more sensors each obtains an image of the same working volume, software means running on computer 402 is operable to combine the images from the individual sensors into a single image. Each such image is called a "tile."

If the measurement article is larger than the working volume of the sensors, the sensors may be moved relative to the measurement article, and an image of the portion of the measurement article then within the working volume of the sensors is obtained by each sensor and transmitted to computer 402 where it is recorded. A sequence of moving the sensors and obtaining images from the sensors' new position continues until discrete images of all portions of the complete measurement article have been obtained by the sensors and recorded in computer 402. Where digitizing apparatus 401 comprises the embodiment shown in FIG. 5, movement of the sensors is accomplished by moving gantry assembly 530 along rails 514, and by moving sensor platform 550 along crossbeam 533.

In an embodiment of the present invention where the digitizing apparatus' sensors comprise optical sensors and the measurement article comprises a shiny surface, such as, for example, where the measurement article comprises a plastic material, reflections from ambient lighting may hinder the ability of the optical sensors to obtain images of the measurement article that accurately depict the measurement points. This is particularly true where measurement points are obtained by distinguishing between white and black portions of the measurement article. For example, where the measurement points comprise vertices of a pattern of intersecting black stripes such as the exemplary stripe pattern shown in FIG. 16 reflections from ambient lighting may appear to be a white object that could be mistaken for a white square of the stripe pattern. Accordingly, erroneous measurement points may be attributed to the reflections, and desired measurement points may be obscured by the reflections. To reduce the errors introduced by ambient lighting, the digitizing apparatus may be shrouded with curtains, and controlled lighting may be added to ensure sufficient and constant illumination. The use of a circular lighting arrangement wherein the working volume is substantially evenly illuminated can reduce reflections and improve the results obtain from the present invention. A dulling substance, such as Krylon 1310 dulling spray, may be used to reduce or remove the reflections from ambient lighting.

In an embodiment of the present invention where the digitizing apparatus' sensors comprise optical sensors, the effect of reflections from ambient lighting can be substantially eliminated. In this embodiment, at least two distinct light source are used to illuminate the measurement article. The distinct light source preferably are identical. The light sources are separated by a distance great enough so that from the point-of-view of each optical sensor, the reflections of the distinct light sources visible on the measurement article do not overlap. The actual distance between light sources varies depending on the extent of light dispersal from the light sources and the size of the reflections visible on the measurement article. For example, spot lights are more focused than a softer lighting such as lighting employing the use of a diffuser. Thus, spot lights may be installed closer together than the soft lighting. Satisfactory results may be achieved by measuring the width (or diameter) of the reflection of one light source on the measurement article, and then separating the light sources by a distance equal to twice the width (or diameter) of the light source's reflection.

According to this embodiment, a light source is illuminated individually, and an image of the measurement article (or a portion thereof) is obtained by each optical sensor and stored in a computer memory. Then another light source is illuminated individually, and another image is obtained by each optical sensor and stored in a computer memory. This sequence continues until each light source has individually illuminated an image obtained by each sensor.

Next, for each sensor, the obtained images are combined in computer memory using a multiplication operation on each pixel appearing in the images. For example, where two light sources are used, a first and a second image are obtained by a sensor. The following table shows the multiplication operation as applied to a pixel in the first and second image:

| Pixel in First Image | Pixel in Second Image | Pixel in Combined Image |
| --- | --- | --- |
| Black | White | Black |
| White | Black | Black |
| Black | Black | Black |
| White | White | White |

In an embodiment comprising three optical sensors and two light sources, a total of six images are obtained. The six images are combined into three according to the foregoing procedure. Combining the images in this fashion results in dark areas getting darker and light areas staying the same. The reflections (which appear white in the images) are replaced in the combined image by the darker pixels obtained in the other image taken by the same sensor. The resulting image is substantially free of ambient light reflection. The resulting image from each sensor then may be combined with the resulting image from each other sensor to form a tile.

In an alternative to this embodiment, the measurement article is illuminated by two lights of different colors. For example, one red light and one green light may be used. The lights are separated as before. The lights are simultaneously illuminated and an image of the measurement article (or a portion thereof) is obtained by each optical sensor and stored in a computer memory. Each light provides one color channel in the image. The different colors provide different reflections in the image. The two channels then may be separated in computer memory, with the red channel being a first image and the green channel being a second image. The first and second images are combined using a multiplication operation as described above. The resulting image from each sensor then may be combined with the resulting image from each other sensor to form a tile. Any two colors appearing in the image may be used in this operation. If the image is an RGB image, then the two colors are selected from the group consisting of red, green, and blue. If the image is a CMYK image, then the two colors are selected from the group consisting of cyan, magenta, and yellow. In yet another alternative, polarized light may be used to obtained the separate images, although this may require additional cameras in the setup to extract the dual polarities at the same time.

To create a tile according to the present invention, an image of the measurement article is obtained using a sensor of digitizing apparatus 401. Software mean running on computer 402 isolates the measurement points appearing in the image. Then, software mean running on computer 402 links the measurement points into a grid and individually identifies each measurement point in the grid, such as by the use of a two-dimensional measurement point array using a [u,v] coordinate system. Where two or more sensors obtain separate images of the same portion of the measurement article, software mean running on computer 402 the separate images is operable to combine the measurement points appearing in the separate images into a single tile.

In an embodiment where the measurement points comprise vertices of a pattern of intersecting black stripes such as the exemplary stripe pattern shown in FIG. 16, the following procedure may be used for creating a tile from the topography of the measurement article according to the present invention, wherein the digitizing apparatus sensors comprise digital cameras:

1. Obtain an image of at least a portion of the measurement article with a camera and transmit the image to computer 402. The image is stored by computer 402.

2. Using software means running on computer 402, threshold the obtained image to produce a binary image. The thresholding performed in Step 2 of this embodiment uses an "adaptive threshold" technique that is different from the thresholding process used during the calibration step described previously herein. The adaptive threshold technique uses the knowledge that, because the measurement article comprises only black stripes and white squares, each image of the measurement article should comprise only black and white pixels. However, because of variations in image brightness and contrast that may arise, for example, from the measurement article's three-dimensional shape and non-uniform ambient lighting, the pixel values for the black pixels and the pixel values for the white pixels may be highly variable. Establishing a single threshold pixel value that is valid for the entire imaged portion of the measurement article may not be adequate to distinguish between black and white pixels. The adaptive threshold technique examines a plurality of small segments of each imaged portion of the measurement article and then tries to find a threshold pixel value within each small segment of the imaged portion which will locally separate the two distinct pixel colors. For example, if the imaged portion is about 1 ft.×1 ft. and the stripes are about 0.5 in. wide and separated by about 0.5 in., the "adaptive threshold areas" may be about 1.5 in.×1.5 in. each. It is anticipated that each adaptive threshold area contains at least part of a white square. Within each adaptive threshold area, thresholding is performed according to the process described previously in the discussion of the calibration procedure. Specifically, clusters of pixel values are identified; a threshold pixel value is determined; and pixels are assigned a binary pixel value designating the pixel as "white" or "black" depending on the pixel's value in relation to the threshold pixel value.

3. Using software means running on computer 402, fit contours to the white portions of the image. A "contour" according to this step is closed, connected sequence of lines, splines, or curves assigned to the obtained image to mark a boundary of a group of white pixels. Generally, white pixels are inside the contour and black pixels are outside the contour. However, contours may be fit through the middle of white pixels instead of on the edge of a white pixel that is adjacent to the edge of a black pixel. This Step 3 comprises identifying all such boundaries in the image, and recording their positions in computer memory by the use of a contour. Each white square of the striped pattern should be bounded by a contour that may be approximated by four lines. However, it is possible that the obtained image also has a one or more of such contours that do not represent the boundary of a white square. For example, ambient lighting reflecting off the measurement article may appear in the recorded image as a group of white pixels. Software means running on computer 402 fits contours to the boundaries of such groups. However, the software means running on computer 402 also has been provided information regarding the pixel dimensions that are expected for the white squares. If a contoured object is significantly larger or smaller than the expected pixel dimensions, the software means interprets such objects as something other than white squares, and eliminates them from further processing.

4. Using software means running on computer 402, detect and localize corners of the white squares using a corner detector of a type known in the art.

5. Using software means running on computer 402, determine if any corners detected and localized in Step 4 are on the contours fit to the white squares in Step 3. Four corners should match the contour of each white square.

6. Using software means running on computer 402, identify quadrilateral contours. A "quadrilateral contours" is a contour that has four corners matched thereto. Because of the three-dimensional topography of the measurement article, it is unlikely that all four corners of every white square in the image will be detected and will appear on the contours fit to the white squares. It is possible, for example, that one or more corners of a white square may be fully or partially occluded in the image. In this Step 6, quadrilateral contours are fit to those white squares in the image where all four corners are detected and appear on the contours previously fit to the white squares. Quadrilateral contours are defined as contours for which the convex hull of the associated corners form quadrilaterals. Because the dimensions of the white squares on the striped pattern are known, the pixel dimensions of the quadrilaterals appearing in an image of the striped pattern can be estimated by software means running on computer 402. Quadrilaterals which are too small or too skinny are rejected from further processing.

7. Using software means running on computer 402, link the corners of the quadrilateral contours into a grid-like configuration. The corners of the quadrilateral contours are the measurement points.

8. Repeat Steps 1-7 for each camera. Note that it is within the scope of the present invention that steps 1-7 can be performed concurrently for each camera.

9. Using software means running on computer 402, combine the measurement points from the separate images obtained by each camera into a tile. According to an embodiment of the present invention, a measurement point common to each image is designated as the local origin and assigned a local measurement point array coordinate $[u_{local}, v_{local}]$. The same local array coordinate is assigned to the measurement point where it appears in each of the separate images. Each other measurement point appearing in the separate images then is assigned a local measurement point array coordinate $[u_{local}, v_{local}]$, according to that measurement point's position relative to the local origin and relative to the other measurement points between it and the local origin. The local origin can be established by an operator of computer 402 using a data entry means of computer 402, or may be done automatically by software means running on computer 402. In one embodiment, a laser is directed on the measurement point that is to be the local origin before the separate images of the measurement article are taken. Software means running on computer 402 is operable to identify the laser in the separate images, and then is operable to assign local origin coordinate $[u_{local}, v_{local}]$, and the other local array coordinates $[u_{local}, v_{local}]$, in response to the position of the laser in the images. The separate images then are combined according to the local array coordinates $[u_{local}, v_{local}]$ of the measurement points of the images.

10. If the measurement article is larger than the x and y dimensions of the working volume, relocate the cameras and repeat steps 1-9.

11. Repeat steps 1-10 until the entire measurement article has been imaged.

The desired outcome of this embodiment of the measurement article imaging process is to define quadrilaterals whose corners (the measurement points) lie on the closed contours of the white squares of the striped pattern, and then to link the quadrilateral corners in computer memory.

Referring back to FIG. 12, in the step shown as block 1214 thereof the topography of the measurement article recorded by digitizing apparatus 401 and stored in computer 402 during the step shown as block 1212 is used to create a three-dimensional grid in computer 402. The three-dimensional grid is reflective of the topography of the measurement article.

Figure 17:
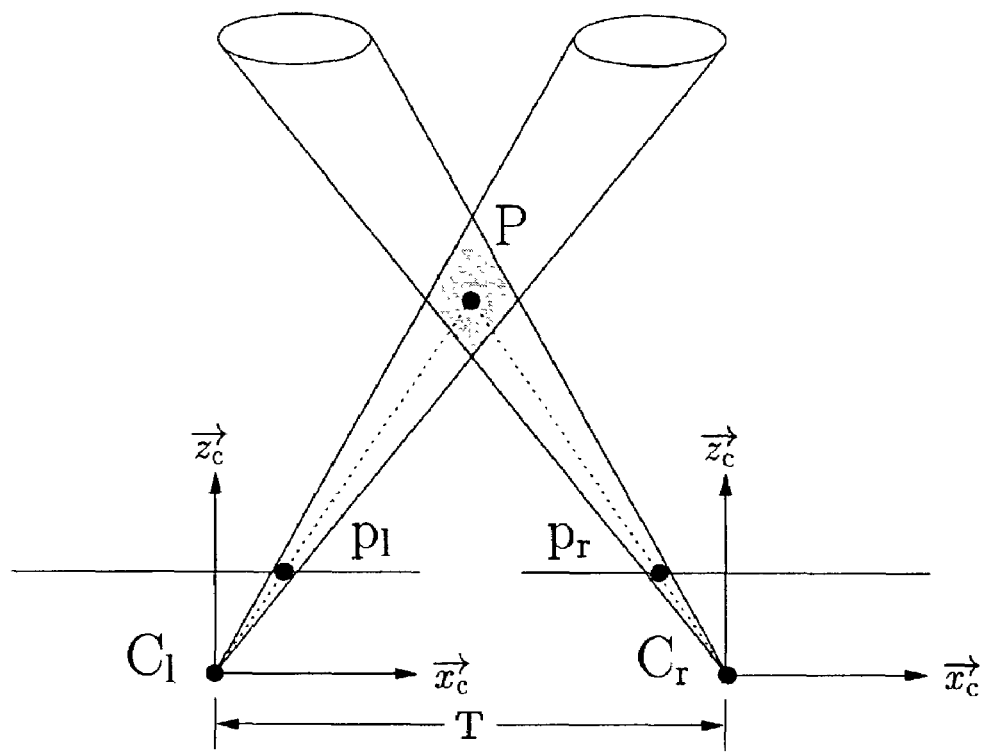
FIG. 17 shows a diagram illustrating the geometric relationship between two cameras and a point appearing within the field of view of both cameras, according to an embodiment of the present invention.

In an embodiment of the present invention wherein the sensors of digitizing apparatus 401 comprise two or more digital cameras arranged in a stereoptic configuration, at least two images of each measurement point are needed to recover three-dimensional [x,y,z] coordinates via triangulation. As shown in FIG. 17, if $P_l$ and $P_r$ are both images of measurement point P recorded by cameras $C_l$ and $C_r$, respectively, then calculating the Cartesian coordinates of measurement point P is a matter of geometry. Using similar triangles, the depth of measurement point P is $$Z_l = Z_r = \frac{fT}{x_l - x_r} \tag{21a}$$

where f is the focal length, T is the distance between cameras $C_l$ and $C_r$, $x_l$ and $x_r$ are the respective x-axis coordinates of cameras $C_l$ and $C_r$, and $Z_l$ and $Z_r$ are the respective z-axis distances between cameras $C_l$ and $C_r$ and P. The respective x-axis and y-axis distances between cameras $C_l$ and $C_r$ and P, denoted as $X_l$, $X_r$, $Y_l$, and $Y_r$, may be calculated as follows:

$$X_l = \frac{x_l Z_l}{f} \tag{21b}$$

$$X_r = \frac{x_r Z_r}{f} \tag{21c}$$

$$Y_l = \frac{y_l Z_l}{f} \tag{21d}$$

$$Y_r = \frac{y_r Z_r}{f} \tag{21e}$$

where $y_l$ and $y_r$ are the respective y-axis coordinates of cameras $C_l$ and $C_r$. Thus, for optical sensors comprising calibrated cameras, recovering a three-dimensional Cartesian coordinate of a measurement point from the measurement article reduces to establishing correspondences between images recovered by two or more of such cameras (e.g., finding the $P_r$ that matches $P_l$).

Figure 18:
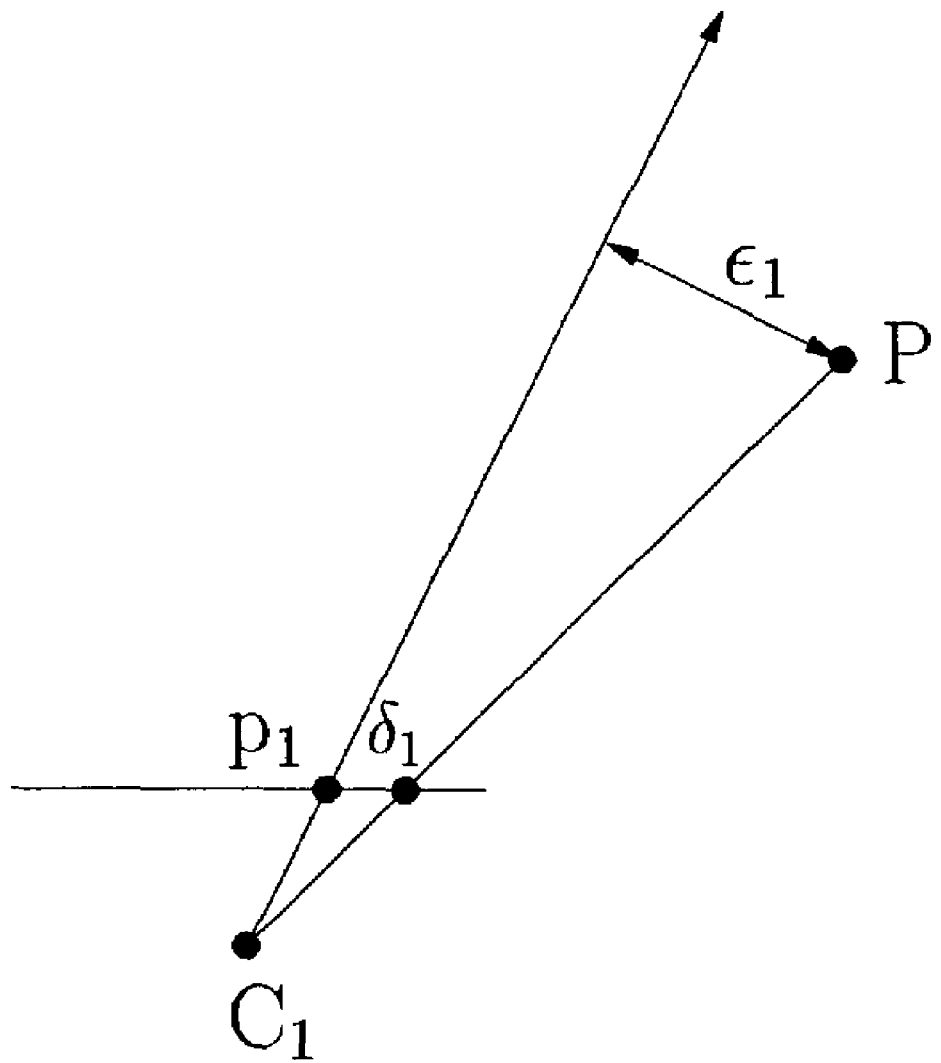
FIG. 18 shows a diagram illustrating two possible measures of error which may be used in an embodiment of the present invention.

As shown in FIG. 17, ideally, measurement point P lies along the line of sight through camera $C_i$ and image point $p_i$. Because of noise, however, this is rarely the case—particularly when P is visible in all three cameras. Assuming that the noise can be modeled as zero mean additive Gaussian noise, then best estimate of P is the one which minimizes the sum of squared errors. FIG. 18 shows two possible measures of the error which may be used in an embodiment of the present invention to estimate the three-dimensional coordinates of P. The first possible measure of the error is "$\epsilon_i$," which represents the distance in three-dimensional space between P and the line of sight through camera $C_l$ and image point $p_l$, and may be calculated for each point P as follows:

$$\varepsilon_i(P) = \overrightarrow{C_i(R_i^{-1}p_i)} \times \left((P - C_i) \times \overrightarrow{C_i(R_i^{-1}p_i)}\right) \cdot (P - C_i) \quad (22)$$

where $$\overrightarrow{C_i(R_i^{-1}p_i)}$$

is the unit vector in the direction from $C_l$ to $p_i$, and $p_i = [x'-x_0, y'-y_0, f]$.

The second possible measure of the error is "$\delta_i$," which represents the distance in two-dimensional space between $p_l$ and the projection of P onto image plane i, and may be calculated for each point P as follows:

$$\delta_i(P) = \left|p_i - L(RP - \vec{T})\right|^2 \quad (23)$$

Using $$\underset{P}{\operatorname{argmin}} \sum_i \varepsilon_i(P) \quad (24)$$

to find the best estimate of P.

$$\sum_i \varepsilon_i(P)$$

has a single minimum which occurs when the gradient equals $[0, 0, 0]$. Setting variable $d = \overrightarrow{C_l(\mathcal{R}_l^{-1}p_l)}$ and using Equations 22 and 24 yields $$[0, 0, 0] = \nabla \sum_i \varepsilon_i(P) \quad (25)$$

$$= \sum_i \nabla (d \times ((P - C_i) \times d) \cdot (P - C_i))$$

$$= \sum_i \nabla ((d \times (P \times d) - d \times (C_i \times d)) \cdot (P - C_i))$$

$$= \sum_i \nabla (DD^T P^2 - 2DD^T P C_i^T + DD^T C_i^2)$$

$$= \sum_i (2DD^T P - 2DD^T C_i)$$

$$= \left(\sum_i DD^T\right) P - \sum_i DD^T C_i$$

where $$D = \begin{bmatrix} 0 & -d_z & d_y \\ d_z & 0 & -d_x \\ -d_y & d_x & 0 \end{bmatrix} \quad (26)$$

Equation 25 reduces to $$AP = B \quad (27)$$

where $$A = \sum_i DD^T \text{ and} \quad (28)$$

$$B = \sum_i DD^T C_i \quad (29)$$

Equation 27 is an exactly determined system of linear equations which can be easily solved. The number of cameras n which view P, and the value of $\Sigma_i \epsilon_i(P)/n$ provide a measure of accuracy for the reconstructed points.

Figure 19:
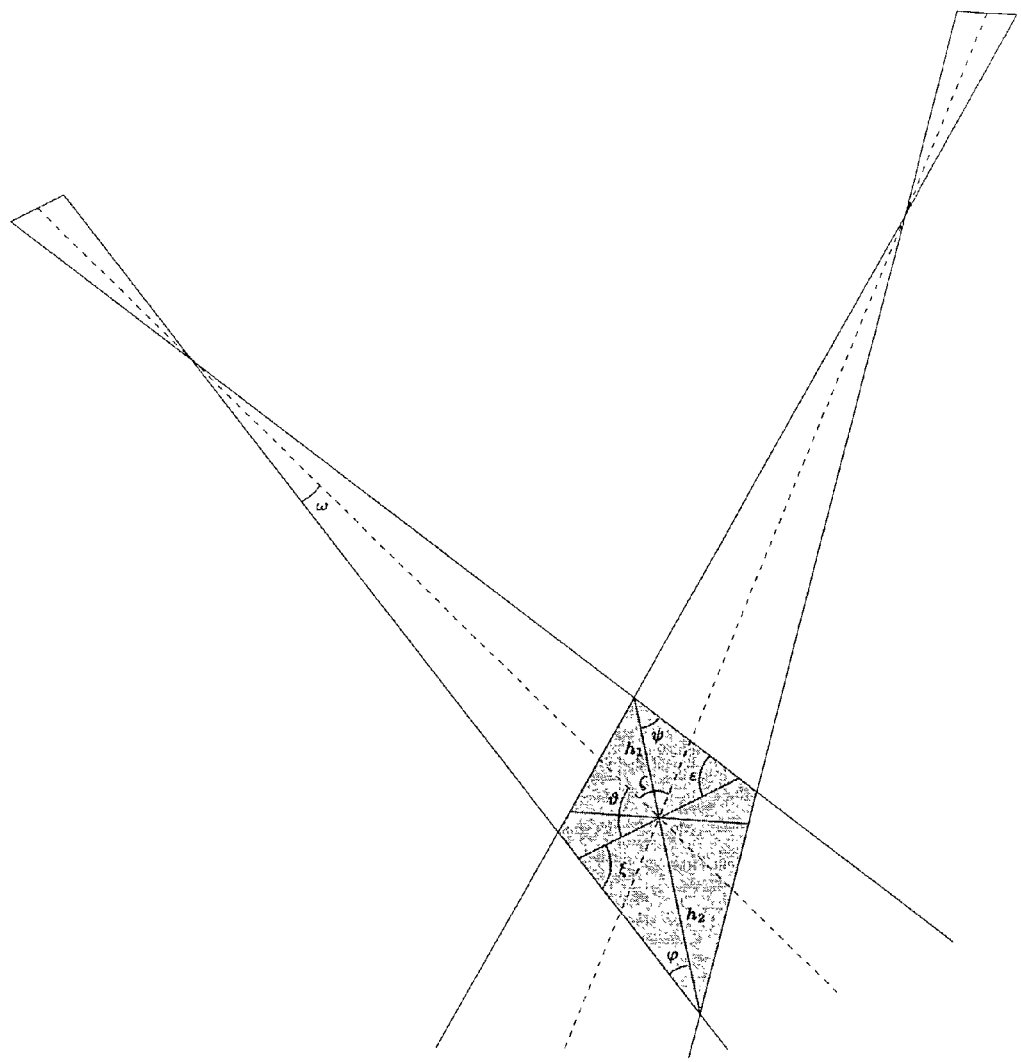
FIG. 19 shows a diagram illustrating the intersection of two pixels projected into three-dimensional space, according to an embodiment of the present invention.

FIG. 19 shows the intersection of two pixels projected into three-dimensional space. The definitions from FIG. 11 apply to the items shown in FIG. 19. $\zeta$ is the angle between the two lines of sight (shown as dashed lines in FIG. 19). The following equations may be used to derive other parameters shown in FIG. 19.

$$\varepsilon = \pi - \theta = \frac{\pi}{2} - \alpha + \beta - \gamma \quad (30)$$

$$\psi = \gamma + \frac{\zeta}{2}, \quad (31)$$

$$\omega = \alpha - \beta - \tan^{-1}\frac{e}{D}, \quad (32)$$

$$\theta = \gamma + \epsilon, \quad (33)$$

$$\xi = \omega + \theta, \quad (34)$$

and $$\phi = \psi + \epsilon - \xi. \quad (35)$$

Using the law of sines and Equations 30-35 yields:

$$h_1 = \frac{w \sin \varepsilon}{2 \sin \psi} \text{ and} \tag{36}$$

$$h_2 = \frac{w \sin \xi}{2 \sin \varphi}. \tag{37}$$

The sum $h_1+h_2$ is an upper bound on the uncertainty along the z-axis (the "vertical uncertainty") for reconstruction using two corresponding measurement points $P_l$ and $P_r$. For the sensor configuration shown in FIG. 9, the maximum $\zeta$ is 26.7° and the maximum $h_1+h_2$ is 0.15 inches. Errors in the sensor calibration may increase this uncertainty by about 50%. Increasing the "baseline" of the sensors (i.e., putting them farther apart) reduces the vertical uncertainty, but also makes integrating the separate images obtained by each sensor into a tile more challenging. Similarly, reducing the distance between the sensors and the xy plane reduces the vertical uncertainty, but also reduces the depth of field.

As discussed previously, individual tiles are reconstructed, combining the images of all sensors of the digitizing apparatus. Each measurement point in each tile has a local array coordinate $[u_{local}, v_{local}]$ that reflects its position in the array of measurement points appearing in the tile. Each measurement point also has a global array coordinate $[u,v]$ that reflects its position in the array of all measurement points associated with the measurement article. The relationship between the local and global array coordinates can be expressed as $[u,v]=[u_{local}+u_0, v_{local}+v_0]$, where $[u_0, v_0]$ is the array offset. An array offset $[u_0, v_0]$ may be determined by selecting a measurement point in each tile and providing software means running on computer 402 with the measurement point's global array coordinate $[u,v]$. The array offset then may be calculated by software means running on computer 402 as the difference between the selected measurement point's local array coordinate $[u_{local}, v_{local}]$ and global array coordinate $[u,v]$. Thereafter, the global array coordinate $[u,v]$ for each other measurement point in the tile can be established based on its local array coordinate $[u_{local}, v_{local}]$ in the tile and the calculated array offset $[u_0, v_0]$. Determining the array offsets, $[u_0, v_0]$, for measurement points in each tile not only yields the global array coordinates of each measurement point, but also establishes the correspondences between tiles needed to recover three-dimensional $[x,y,z]$ coordinates of each measurement point.

For measurement articles larger than the working volume of the sensors, the reconstructed tiles are "stitched together" or "mosaicked." After mosaicking, all of the reconstructed measurement points from all of the tiles are expressed in global $[u,v]$ and $[x,y,z]$ coordinate systems.

If the position, $\vec{T}$, and orientation, $\Re$, of the sensors relative to the global coordinate system are known or can be estimated for each tile reconstructed, then the $[x,y,z]$ coordinates of measurement points in a tile, $P_{TILE}$, can be converted to global $[x,y,z]$ coordinates using $$P_{GLOBAL} = \Re P_{TILE} + \vec{T} \tag{38}$$

Figure 20:
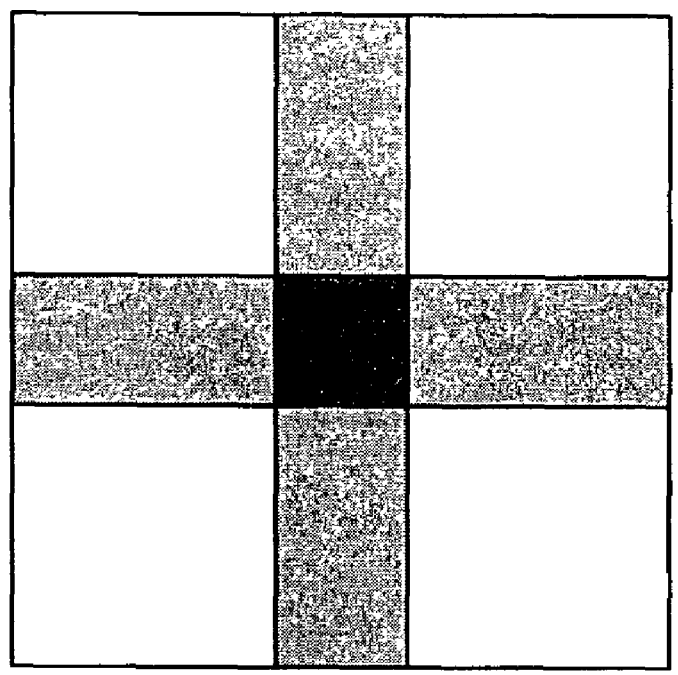
FIG. 20 shows a diagram illustrating a top view of a graphical representation of four overlapping tiles according to an embodiment of the present invention.

FIG. 20 shows a top view of a graphical representation of 4 overlapping tiles. The white areas contain reconstructed measurement points from a single tile; the light grey areas contain reconstructed measurement points from 2 tiles; and, the dark grey areas contain reconstructed measurement points from all 4 tiles. The measurement point array $[u,v]$ coordinates recovered using the procedure described previously herein are used to correspond three-dimensional $[x,y,z]$ coordinates of the measurement points recovered from different tiles. The error for measurement point $[u,v]$, $\epsilon_{u,v}$ is $$\varepsilon_{u,v} = \sum_k \kappa_{u,v,k} \left( \Re_k P_{u,v,k} + \vec{T}_k - \overline{P}_{u,v} \right)^2 \tag{39}$$

where $\Re_k$ and $\vec{T}_k$ are the rotation and translation for the $k^{th}$ tile, and $P_{u,v,k}$ is the reconstructed three-dimensional $[x,y,z]$ coordinates of measurement point $[u,v]$ in the $k^{th}$ tile, $$\overline{P}_{u,v} = \frac{\sum_k \kappa_{u,v,k} P_{u,v,k}}{\sum_k \kappa_{u,v,k}} \tag{40}$$

and $\kappa_{u,v,k}$ is 1 if tile k contains measurement point $[u,v]$ and 0 otherwise. Equation 39 leads to the straightforward minimization $$\underset{\{\Re\},\{\vec{T}\}}{\arg\min} \sum_{u,v} \varepsilon_{u,v} \tag{41}$$

where $\{\Re\}$ is the set of all $\Re_k$'s except $\Re_0$, and $\{\vec{T}\}$ is the set of all $\vec{T}_k$'s except $\vec{T}_0$. $\Re_0$ is fixed as the identity matrix and $\vec{T}_0$ as $[0, 0, 0]$. The optimized $\Re$'s and $\vec{T}$'s enable the reconstructed tile points to be placed into a single global $[x,y,z]$ coordinate frame. Equation 41 is a good candidate for optimization techniques such as Powell's method.

Figure 21A:
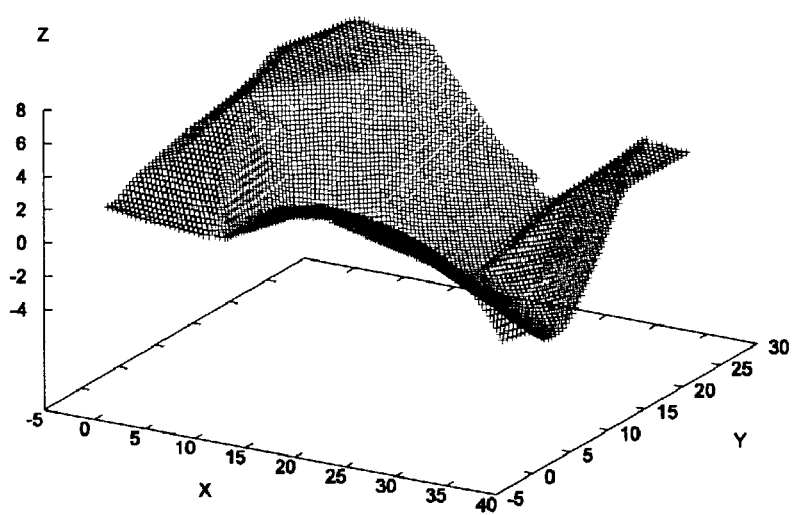
FIGS. 21A-B each shows a perspective views of an exemplary three-dimensional grid produced according to an embodiment of the present invention.
Figure 21B:
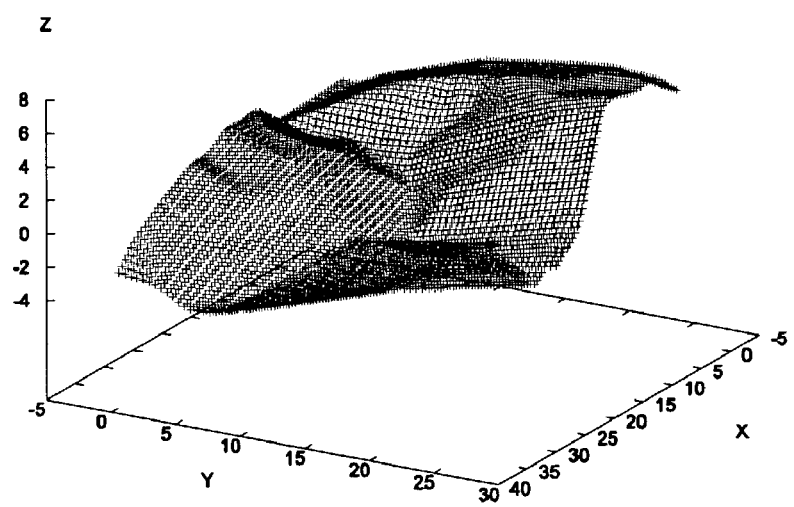

The output of the step shown as block 1214 of FIG. 12 is a three-dimensional grid representative of the topography of the measurement article. The three-dimensional grid may be in one of many file formats known in the art such as, for example, DXF (.dxf), IGES (.igs), SoftImage model files (.hrc), Alias, Wavefront (.obj), Lightwave, Parasolids, Trim Surface, ProEngineer, SmartCAM, CATIA, and the like. FIGS. 21A-B show two different perspective views of an exemplary three-dimensional grid produced according to an embodiment of the present invention. The same three-dimensional grid is shown both FIG. 21A and FIG. 21B. The view of the three-dimensional grid shown in FIG. 21A is rotated 90° counterclockwise about the z-axis to produce the view of the three-dimensional grid shown in FIG. 21B.

The vertices ("grid points") of a three-dimensional grid produced according to the present invention correspond to the measurement points recovered during the imaging process. Also provided as an output of the step shown as block 1214 is computer information comprising the $[x,y,z]$ coordinate of each grid point and the global array $[u,v]$ coordinate of each grid point. The grid points are approximations in a computer image of the actual, physical positions of the measurement points on the measurement article. The "grid lines" connecting the grid points approximate the contours of the portion of the topography of the measurement article between the grid points. The grid lines form a plurality of adjacent quadrangles that comprise the three-dimensional grid.

Although the present invention is described in terms of a single three-dimensional grid representative of the topography of a single measurement article, it is within the scope of the present invention a plurality of measurement articles and a plurality of three dimension grids may be used to produce a transformed graphical image. For example, grid points in a three-dimensional grid produced as an output of the step shown as block 1214 of FIG. 12 may comprise averages of measurement points of two or more measurement articles. Similarly, grid points in a three-dimensional grid produced as an output of the step shown as block 1214 of FIG. 12 may comprise an average of the grid points from two or more sample three-dimensional grids created from the same measurement article.

If the three-dimensional grid does not contain a grid point corresponding to each measurement point of the measurement article, such as, for example, if one or more measurement points were not obtained by the imaging process of the step shown as block 1212, the missing grid points must be added. If the three-dimensional grid does not contain a grid point corresponding to each measurement point in the array of measurement points, the flattening process discussed hereinafter in regard to the step shown as block 1218 of FIG. 12 will not produce accurate results.

Missing grid points may be added automatically by software means of the present invention, through interpolation from grid points adjacent to the position of the missing grid point. Alternatively, a user operating a computer data entry means may operate the present invention's software means to manually add one or more missing grid points. Missing grid points may be added before the three-dimensional grid is created. For example, a user may notice a missing measurement point on while viewing an image of a tile on a computer video display means. Using a computer data entry means, the user may add the missing point to the tile image.

Alternatively, the tile images may be mosaicked in a three-dimensional grid, even though one or more grid points is missing. Thus, the three-dimensional grid does not accurately represent the topography of the measurement article due to the missing grid point(s). However, it is within the scope of the software means of the present invention that a user of the software means may manipulated the shape of the three-dimensional grid using one or more computer data entry means. Such manipulation may include adding grid points where necessary.

In an embodiment, the three-dimensional grid of the present invention is formatted in accordance with a Cardinal mesh. The Cardinal mesh format is useful in the present invention, because grid lines comprising Cardinal splines extend through the grid vertices. Cardinal splines also simulate plastic deformation well. Thus, a Cardinal format is preferred for applications of the present invention in the plastic forming arena. Alternatively, other grid or mesh formats known in the art may be used, such as, for example, linear, Bezier, b-spline, and non-uniform rational b-spline ("nurbs").

Referring back to FIG. 12, in the step shown as block 1215 thereof, at least one texture map of graphical image (called a "base graphical image") is provided. A texture map according to the present invention represents a planar rendering of a three-dimensional graphical image. Preferably, at least one of the texture maps provides an image of the base graphical image taken from substantially the same point of view as the point of view from which the three-dimensional grid was recovered. The texture map(s) may be in one of many file formats known in the art such as, for example, raster formats including TIFF, Targa, EPS, JPEG, Pict, Gif, PhotoShop, and the like; vector formats including EPS, CDR, SWF, AI, DXF, Softimage, and the like; as well as line art formats known in the art such as, for example, EPS, Illustrator, Corel Draw, and the like. The IGES interchange format also may be used. In an embodiment, the software means of the present invention is configured to permit a user thereof to select the file format of the texture map. The software means of the present invention is further configured such that, in response to such a selection, the software means is operable to convert the texture map to the selected file format from another file format.

In the steps shown as blocks 1216 and 1218 of FIG. 12, the three-dimensional grid provided as an output of the step shown as block 1214, and the at least one base graphical image texture map provided in the step shown as block 1215, are processed into a transformed graphical image that is adapted to be applied to the topography of a substrate.

Figure 22A:
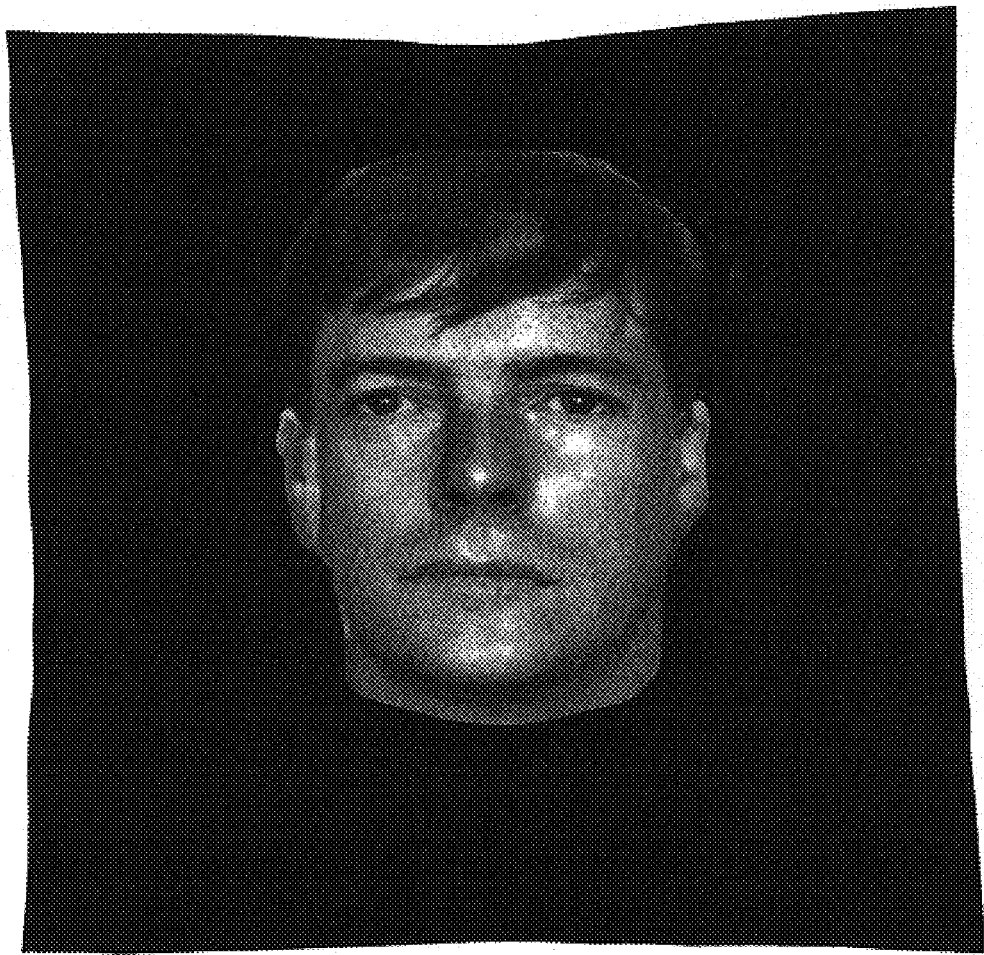
FIGS. 22A-D collectively show a graphical flowchart illustrating the production of a transformed graphical image according to an embodiment of the present invention.
Figure 22B:
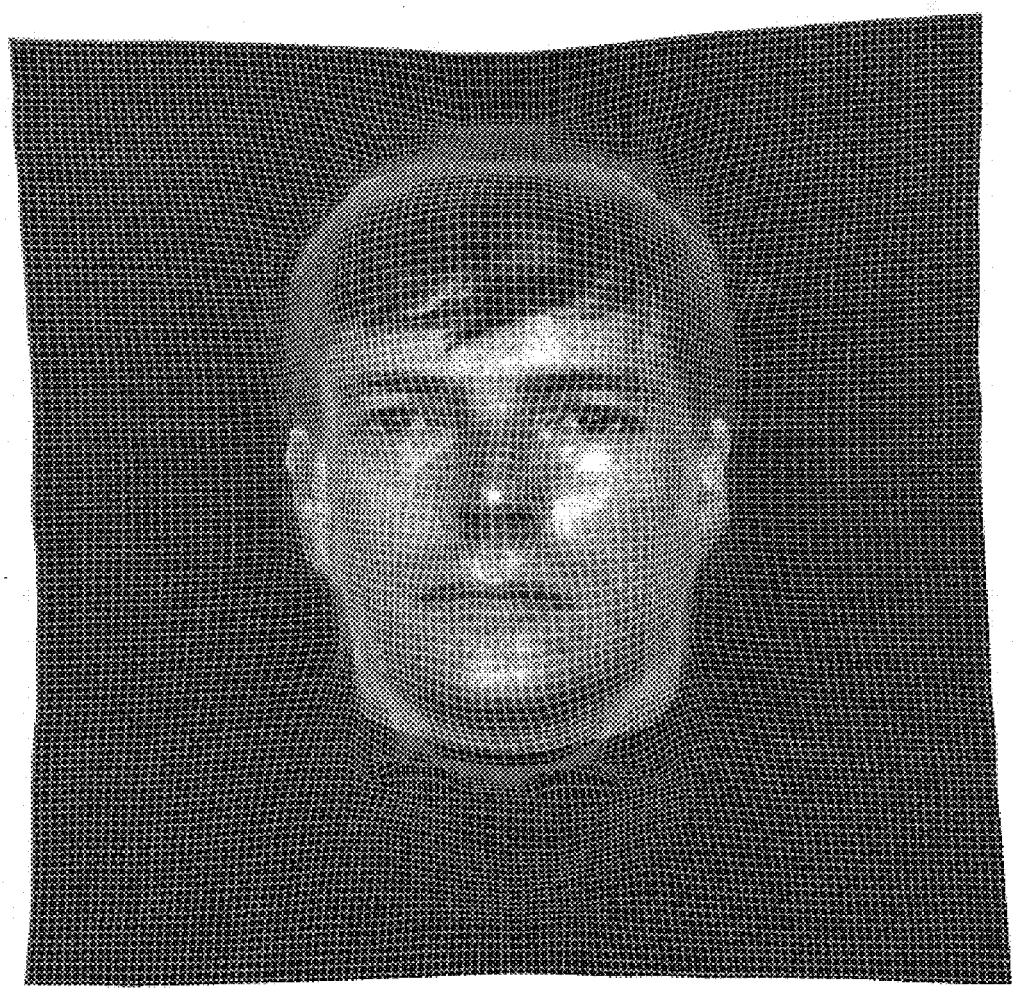

FIGS. 22A-D show a graphical flowchart illustrating the process of transforming the three-dimensional grid and the at least one base graphical image texture map according to an embodiment of the present invention. FIG. 22A shows a top view of an exemplary base graphical image texture map showing a human face. FIG. 22B shows a top view of the base graphical image texture map of FIG. 22A combined with a three-dimensional grid. The three-dimensional grid comprises the topography of the face and head of the human subject whose face is shown in the base graphical image texture map. Grid points on the three-dimensional grid are "locked" to points on the base graphical image texture map. Each texel in the texture map is assigned to one quadrangle in the three-dimensional grid.

Figure 22C:
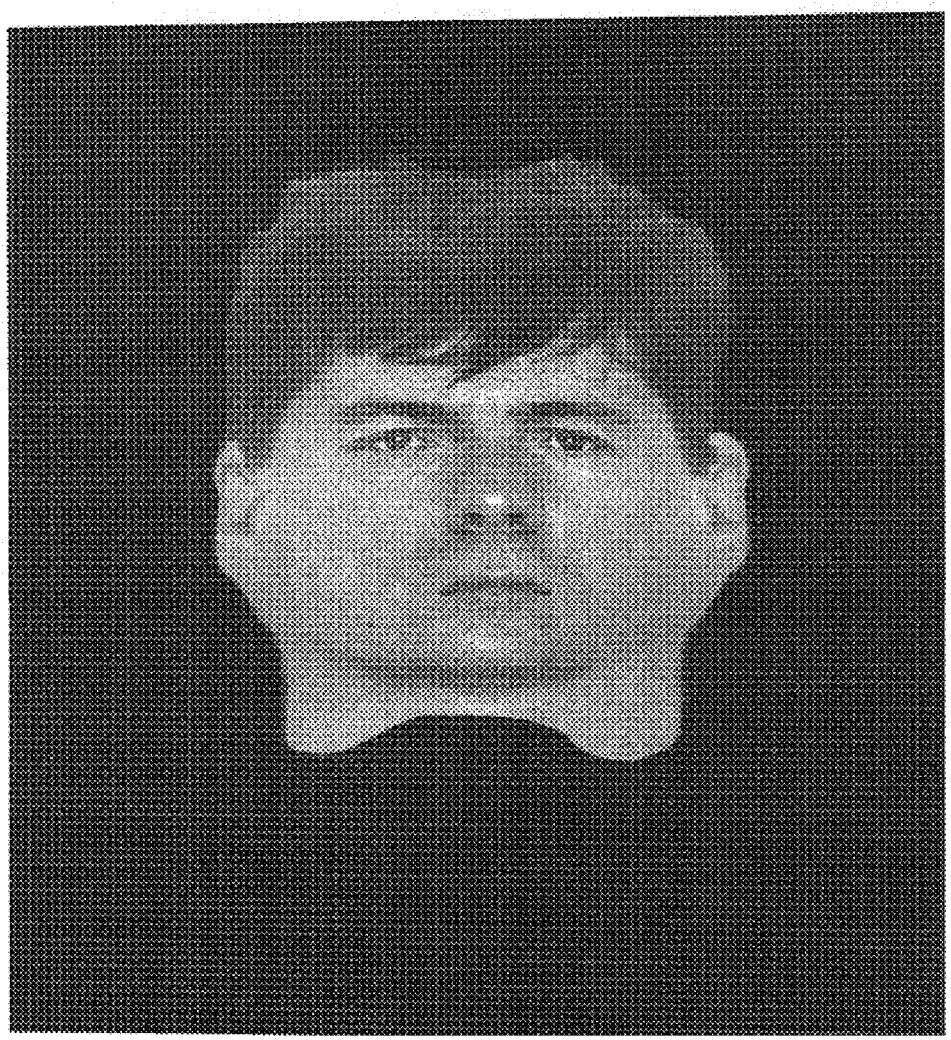

FIG. 22C shows a top view of a transformed graphical image of the base graphical image texture map shown in FIG. 22A. According to the present invention, the transformed graphical image shown in FIG. 22C is created when the three-dimensional grid is flattened into a planar grid. The grid quadrangles change shape when the three-dimensional grid is flattened into a planar grid. However, texture map texels assigned to a quadrangle remain within the quadrangle as the texture map is flattened into the transformed graphical image.

Figure 22D:
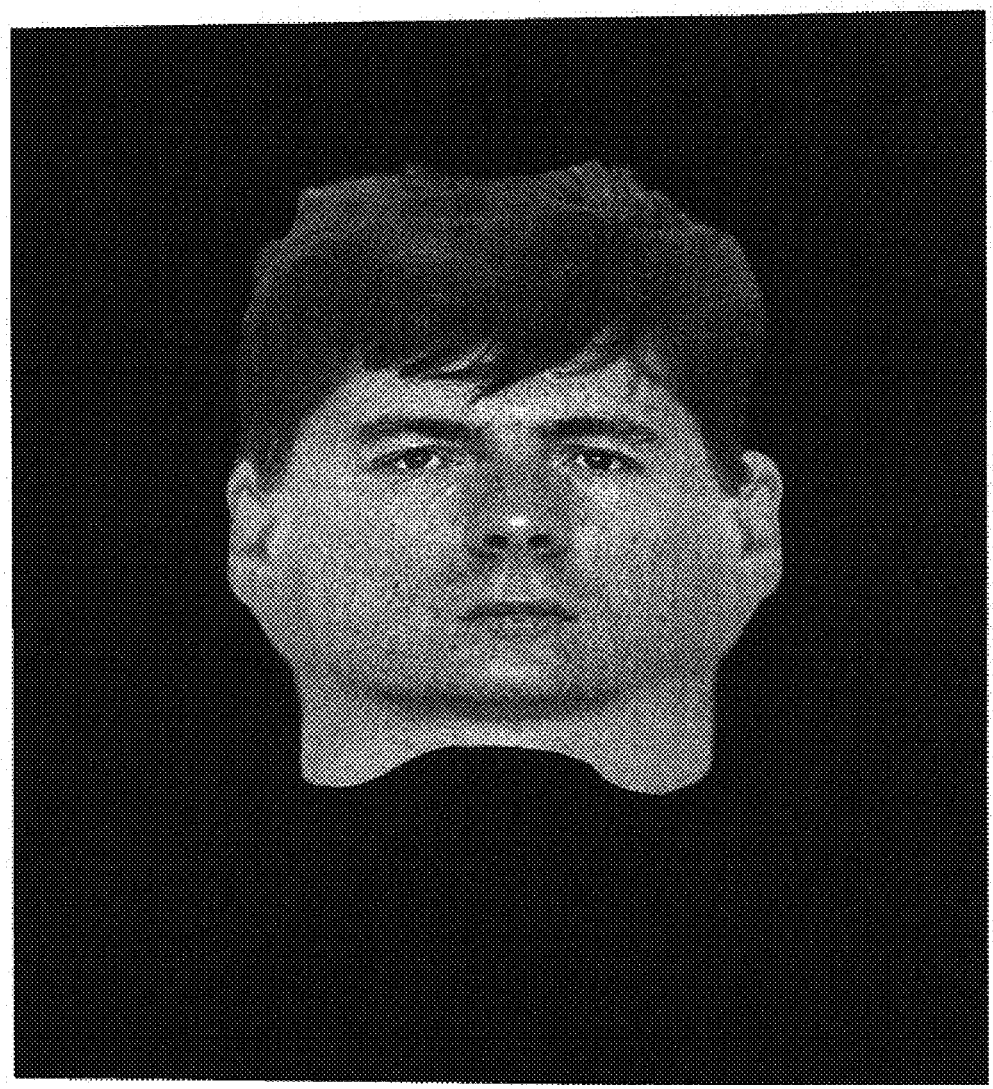

FIG. 22D shows a top view of the transformed graphical image shown in FIG. 22C, after the grid lines are removed from the transformed graphical image. The transformed graphical image shown in FIG. 22D is ready for application to a substrate. Note, however, that in the case of a graphical image that is transformed according to the present invention for application to a flat substrate material, wherein the flat substrate material then is to be formed into a three-dimensional shape, the flat substrate to which the transformed graphical image is to be applied generally must be of the same material as the flat substrate that was used in the measurement article from which the three-dimensional grid was created. For example, it is unlikely that satisfactory results will be achieved where a graphical image that is transformed according to the present invention for application to a flat plastic substrate material that is to be formed using a thermoforming process, instead is applied to a flat metal substrate that is to be formed using a stamping process. Even if the topography of the thermoformed plastic part is substantially identical to the topography of the stamped metal part, the surface changes experienced by the plastic substrate during the thermoforming process likely will be different from the surface changes experienced by the metal substrate during the stamping process. Accordingly, the changes experienced by the transformed graphical image likely will be different in the plastic thermoforming process than in the metal stamping process.

Figure 23:
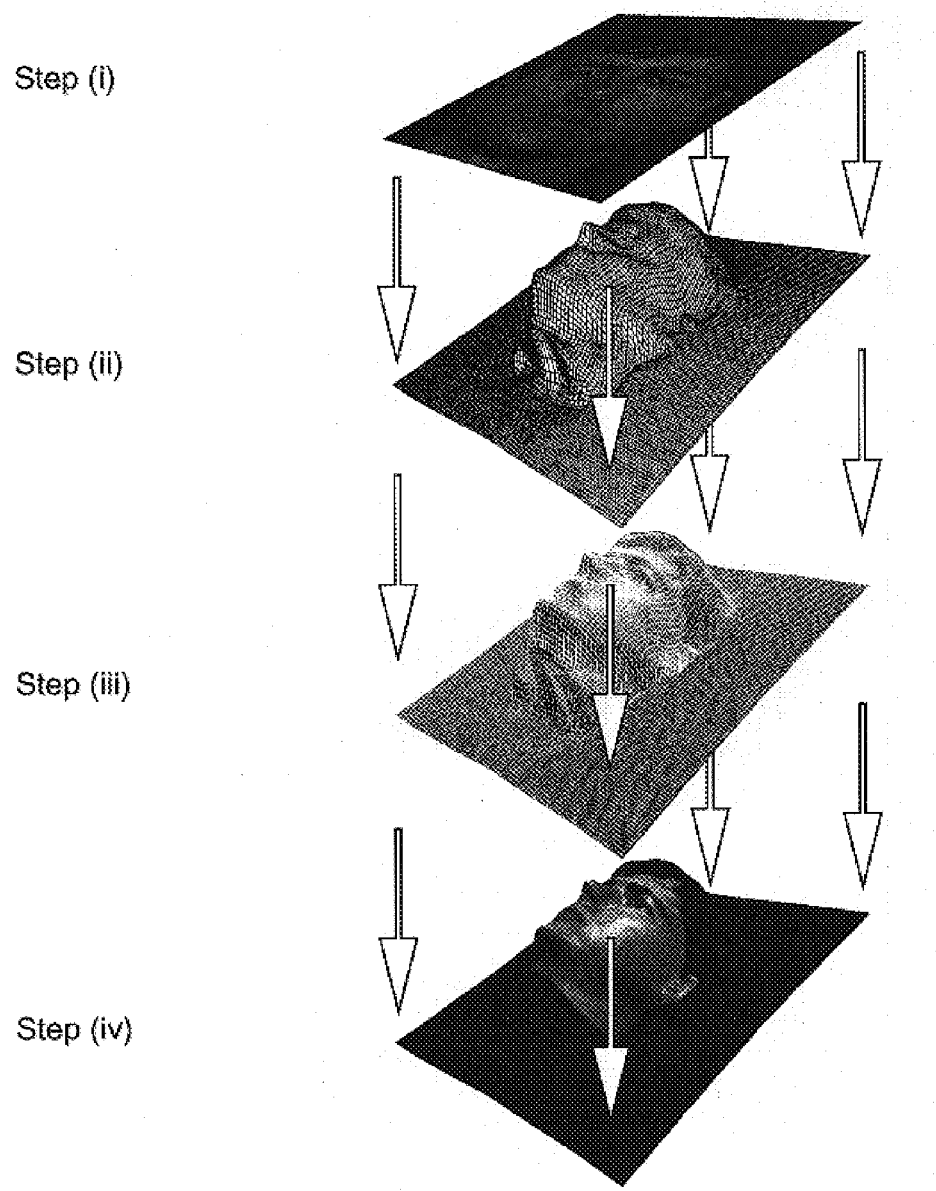
FIG. 23 shows a graphical flowchart illustrating the process of combining a three-dimensional grid and at least one texture map according to an embodiment of the present invention.

The steps of transforming the three-dimensional grid and the at least one base graphical image texture map into a transformed graphical image will now be explained in more detail. Referring back to FIG. 12, in the step shown as block 1216 thereof, the three-dimensional grid and the base graphical image texture map(s) are combined in a computer memory, such as a computer memory of computer 402 and/or computer 405 of FIGS. 4A-D. FIG. 23 shows a graphical flow chart illustrating the process of combining a three-dimensional grid and at least one base graphical image texture map. View (i) of FIG. 23 shows an exemplary base graphical image texture map, in this case showing a front view of a human face. View (ii) of FIG. 23 shows a perspective view of an exemplary three-dimensional grid of the type produced by the present invention as an output of the step shown as block 1214 of FIG. 12. In this case, the three-dimensional grid comprises the topography of the face and head of the human subject whose face is shown in the base graphical image texture map of view (i).

In view (iii) of FIG. 23, an image of the combined base graphical image texture map and three-dimensional grid is shown. View (iv) of FIG. 23 shows another image of the combined base graphical image texture map and three-dimensional grid, however in view (iv) the grid lines of the three-dimensional grid are suppressed to better show the base graphical image texture map as it appears after combination with the three-dimensional grid.

Although FIG. 23 shows a single base graphical image texture map combined with a three-dimensional grid, it is common that a plurality of base graphical image texture maps are used to accurately depict the graphical image. For example, the topography of the measurement article portrayed in the three-dimensional grid may possess steep surfaces or other features that make the accurate projection of a single base graphical image texture map difficult. In the human face image shown in FIG. 23, details of certain features, such as the subject's ears, likely cannot be accurately projected onto the three-dimensional grid by the use of a single base graphical image texture map showing a front view. Thus, it is within the scope of the present invention that two or more base graphical image texture maps are applied to areas of the three-dimensional grid where a projected base graphical image texture map is smeared, shadowed by parallax, or is otherwise unclear. Each such base graphical image texture map may be projected from a different point of view. Multiple base graphical image texture maps having varying degrees of opacity may be used. In an embodiment, the software means of the present invention is configured to permit a user thereof to adjust the opacity of a base graphical image texture map before it is applied to the three-dimensional grid. Alpha channels may be used to mask areas of a base graphical image texture map before it is applied to a three-dimensional grid.

The software mean of the present invention is operable to blend two or more base graphical image texture maps. Thus, a second base graphical image texture map projected onto a three-dimensional grid does not obscure a first base graphical image texture map previously applied to the three-dimensional grid in areas where the first and the second base graphical image texture maps overlap. Instead, the first and the second base graphical image texture maps are blended to produce a finished base graphical image texture map.

In an embodiment of the software means of the present invention, "ramping" is used to blend two or more base graphical image texture maps. According to the present invention, "ramping" comprises the use of the relationship between the surface of the three-dimensional grid and the point of view from which each texel in a base graphical image texture map is projected, to determine the extent to which two or more base graphical image texture maps are to be blended. As between two texels, the texel that represents a point-of-view that is more normal (i.e., perpendicular) to the surface of the three-dimensional grid, is allocated more weight. For example, where a first texel and a second texel from a first and a second base graphical image texture map, respectively, overlap on a three-dimensional grid, the texel that is projected from a more perpendicular point of view is automatically accorded more weight in the blending process by the software means of the present invention. The software means of the present invention is operable to automatically measure the perpendicularity of each texel's projection onto the surface of the three-dimensional grid. Then, the software means is operable to compare the texels' perpendicularity measurements. The texel whose angle is closer to perpendicular (90°) is accorded more "weight." Total weight cannot exceed 100%. Thus, for example, if a first texel is projected from an 80° angle, and a second text is projected from a 40° angle, when the texels are blended the colors of the first texel may be given 67% of the weight and the colors of the second texel may be given 33% of the weight.

In an embodiment of the software means of the present invention, an initial weighting for each texel is automatically determined by the software means. However, in this embodiment, the weighting is adjustable by the user of the software means. Using a data entry means of a computer upon which the software means is operating, a user may change the weighting of the competing texels to emphasize or de-emphasize certain texels. In an embodiment, the software means is configured to permit a user to adjust the relative weighting of the texels assigned to a particular quadrangle, two or more quadrangles, or the entire base graphical image texture map. In addition, adjusting the opacity of the base graphical image texture map before it is applied to the three-dimensional grid (as previously discussed) also may be used to adjust the texel weighting.

Accordingly, smeared, shadowed, or unclear areas of a first base graphical image texture map may be overlayed and blended with a second base graphical image texture map that is more accurate for those areas. This enables details to be applied to near vertical surfaces of the final substrate to which the transformed graphical image is to be applied. In practice, it is not unusual to require ten or more different base graphical image texture maps to accurately portray all details desired in a graphical image. Stochastic sampling may be used to enhance the appearance of the blended base graphical image texture maps. In an embodiment, the software means of the present invention is configured to permit a user thereof to adjust the stochastic sampling.

It may be desired that line art such as, for example, text, logos, or specific coloring is desired in the transformed graphical image. Where line art is desired in the transformed graphical image, it is preferred that line art is not blended with other base graphical image texture maps, so that the clarity, color integrity, and/or smooth edges of the line art are maintained. Instead, each line art element is aligned and locked on the three-dimensional grid as its own "layer." The line art then may be flattened along with the three-dimensional grid and the blended texture maps, but will not lose its desired clarity, color integrity, and/or smooth edges.

Even if line art is maintained on its own layer, the process of flattening the three-dimensional grid with the line art projected thereon and locked thereto, as well as the Gaussian filtering of the flattened image, may tend to blur or distort line art in an unsatisfactory way. The software means of the present invention comprises tools for restoring line art to its desired appearance. In an embodiment of the software means of the present invention, line art restoration can be accomplished with an edge detection filter after the three-dimensional grid is flattened, or by edge detecting before the three-dimensional grid is flattened. Where edge detecting before the three-dimensional grid is flattened is employed, a Bezier curve is drawn along the detected edges of the line art. The Bezier curve is locked to the three-dimensional grid. The Bezier curve then is distorted as the three-dimensional grid is flattened. The distorted Bezier curve then may be used as a mask or guide for an edge sharpening filter of a type known in the art. The distorted Bezier curve overrides the other distorted texture maps in areas near the Bezier curve.

Where only line art is applied to the three-dimensional grid, Bezier curves may be drawn along the detected edges of the line art colors and gradients, and locked to the three-dimensional grid. After the grid is flattened and the Bezier curves are distorted, the boundaries formed by the Bezier curves may be refilled using the colors and gradients from the original line art.

Figure 24:
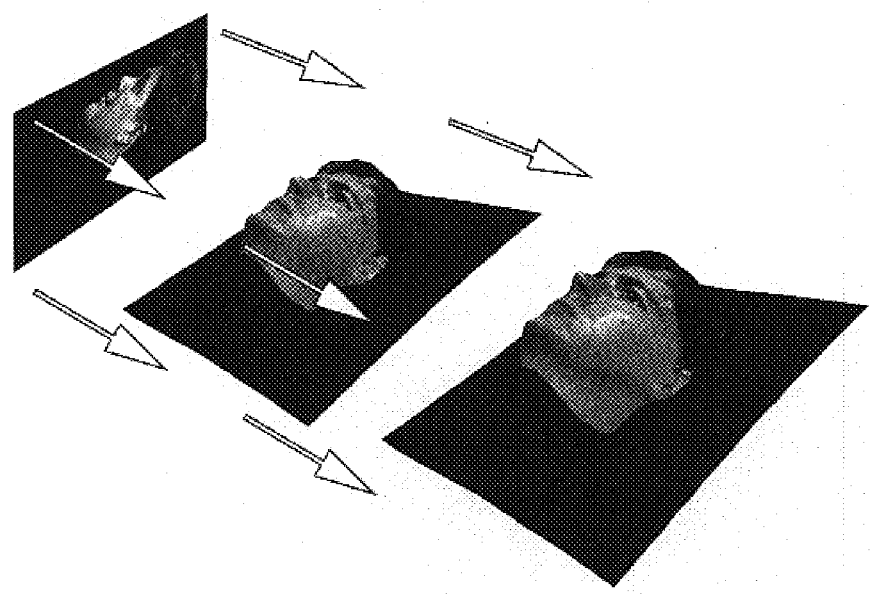
FIG. 24 shows a graphical representation of the use of multiple texture maps according to an embodiment of the present invention.

FIG. 24 shows a graphical example of the use of multiple base graphical image texture maps. Shown in FIG. 24 is the combined base graphical image texture map and three-dimensional grid from view (iv) of FIG. 23, wherein the grid lines of the three-dimensional grid are suppressed. Also shown in FIG. 24 is a second base graphical image texture map depicting a profile view of the left side of the human face shown in FIG. 23. This second base graphical image texture map is combined with the first base graphical image texture map and the three-dimensional grid, as shown in FIG. 24. Use of the second base graphical image texture map provides additional graphical details of the left side of the human facial image, such as details about the subject's ears. It is likely that at least one other base graphical image texture map (not shown in FIG. 24) depicting the other side of the human facial image also would be needed.

Referring back to FIG. 23, each base graphical image texture map must be aligned with respect to the three-dimensional grid and then locked in place on the three-dimensional grid. "Alignment" comprises scaling, rotating, and translating the texture map to place it on the three-dimensional grid. "Locking" comprises matching or mapping points on the base graphical image texture map to points on the three-dimensional grid by automated alignment, and assigning each texel in the base graphical image texture map to one quadrangle in the three-dimensional grid. Because the quadrangles of the three-dimensional grid may not be square and may be defined by curved splines, one or more pixels of the base graphical image texture map may project into more than one texel. If the quadrangles are stretched, multiple pixels may project axonometrically into a single texel. The present invention's software means converts the axonometric projection of a base graphical image texture map on the three-dimensional grid to a UV mapping of the base graphical image texture map on the three-dimensional grid. Resampling or weighting of the base graphical image texture map results in calculating the texel color values by using nearest neighbor analysis of the pixels or interpolation between multiple pixels.

The alignment process of "scaling" comprises stretching or compressing the base graphical image texture map in the plane of the base graphical image texture map. The base graphical image texture map is scaled until graphical elements shown in the base graphical image texture map correspond in size and proportion to the representations of such elements in the three-dimensional grid.

The alignment process of "rotating" comprises rotating the base graphical image texture map about an axis. The axis may be one of the axes parallel to the plane in which the base graphical image texture map is portrayed, or may be an axis perpendicular to the plane in which the base graphical image texture map is portrayed, or may be an arbitrary axis selected by the user. The base graphical image texture map is rotated until it is aligned with the features of the three-dimensional grid.

The alignment process of "translating" comprises shifting the base graphical image texture map in one or more directions.

Scaling, rotating, and translating are performed in conjunction with each other to align the three-dimensional grid and the base image texture map. Alignment may be facilitated by the use of registration points. If registration points exist, the base graphical image texture map is translated until registration points in the base graphical image texture map correspond to registration points on the three-dimensional grid. If three such registration points exist, the three-dimensional grid and the base graphical image texture map can be aligned and locked together easily. If only two registration points exist, the scale in one direction is fixed, but the base graphical image texture map still may need to be scaled in the base graphical image texture map's other direction before it can be locked to the three-dimensional grid. If only one registration point exists, scaling and rotating in all directions about that point may be necessary. If no registration points exist, the base graphical image texture map may need to be scaled, rotated, and translated in all directions during the alignment process.

After the first base graphical image texture map is aligned and locked with the three-dimensional grid, the alignment and locking steps are repeated for each other base graphical image texture map that is used.

Referring back to FIG. 12, in the steps shown as blocks 1217-1218 thereof, the combined three-dimensional grid and base graphical image texture map(s) is flattened in computer memory. In the step shown as block 1217, planar grid data is provided. Planar grid data comprises computer information comprising a two-dimensional grid having with grid points that correspond to the grid points in the three-dimensional grid. Each grid point in the planar grid and each grid point in the three-dimensional grid has a [u,v] coordinate. Each grid has the same number of grid points in each of the u and v dimensions. Thus, there is a one-to-one correspondence between the grid points in the planar grid and the grid points in the three-dimensional grid.

Using Cartesian notation, in an embodiment of the present invention the planar grid resides in the xy plane. Each grid point thereof has a Cartesian coordinate $[x_f, y_f, 0]$. As noted previously herein, the three-dimensional grid comprises the Cartesian coordinate of each grid point thereof, which can be denoted as $[x_d, y_d, z_d]$. "Flattening" the combined three-dimensional grid and base graphical image texture map(s) comprises the process of translating the $[x_d, y_d, z_d]$ coordinate of each [u,v] grid point in the three-dimensional grid to the $[x_f, y_f, 0]$ coordinate of the corresponding [u,v] grid point in the planar grid. In an implementation of this embodiment, using software means of the present invention a vector is drawn between each grid point in the planar grid to the corresponding grid point in the three-dimensional grid. Then, software means causes each grid point in the three-dimensional grid to be moved along the vector until it occupies the position of its corresponding grid point in the planar grid. In other implementations of this embodiment, other methods may be used such as, for example, plotting curves between the three-dimensional grid and the planar grid.

Figure 25:
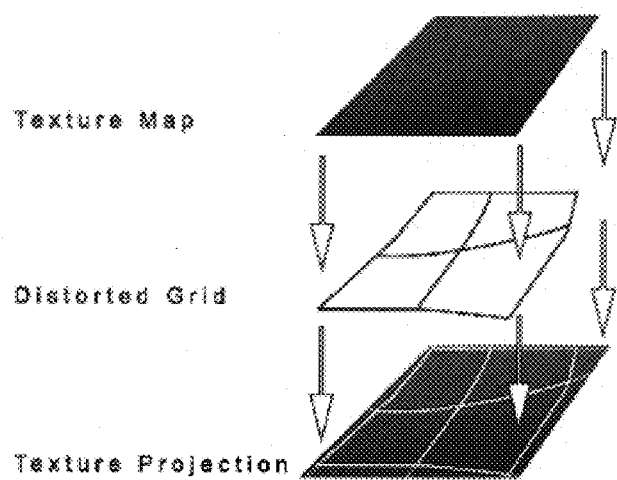
FIGS. 25-26 show a graphical flowchart illustrating the flattening of a small portion of a combined three-dimensional grid and texture map according to an embodiment of the present invention.
Figure 26:
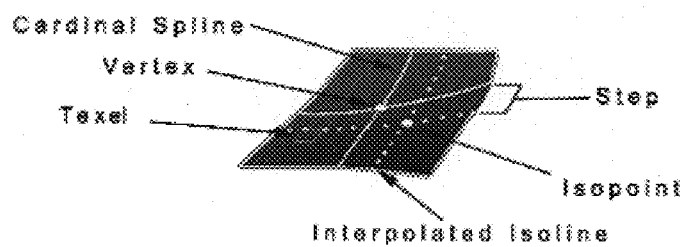

As noted previously herein, texels of the base graphical image texture map that are assigned to quadrangles of the three-dimensional grid remain within the quadrangles when the three-dimensional grid is flattened, even though the shape, size, and proportion of the quadrangles may be altered significantly during flattening. FIGS. 25-26 show a graphical flow chart illustrating the flattening of a small portion of a combined three-dimensional grid and base graphical image texture map. Shown in FIG. 25 is a portion of the base graphical image texture map being combined with a portion of the three-dimensional grid comprising four quadrangles. The [u,v] coordinates of individual texels within each quadrangle are determined by nearest neighbor analysis to subpatch (i.e., intra-quadrangle) intersections called "isopoints." The [u,v] coordinates of isopoints are interpolated from the known [u,v] coordinates of the grid points on the three-dimensional grid, and [u,v] relationship reflected by the grid lines that interconnect the grid points, as shown in FIG. 26. Each isopoint is determined to be a specific "u distance" and "v distance" from a grid line.

Figure 27:
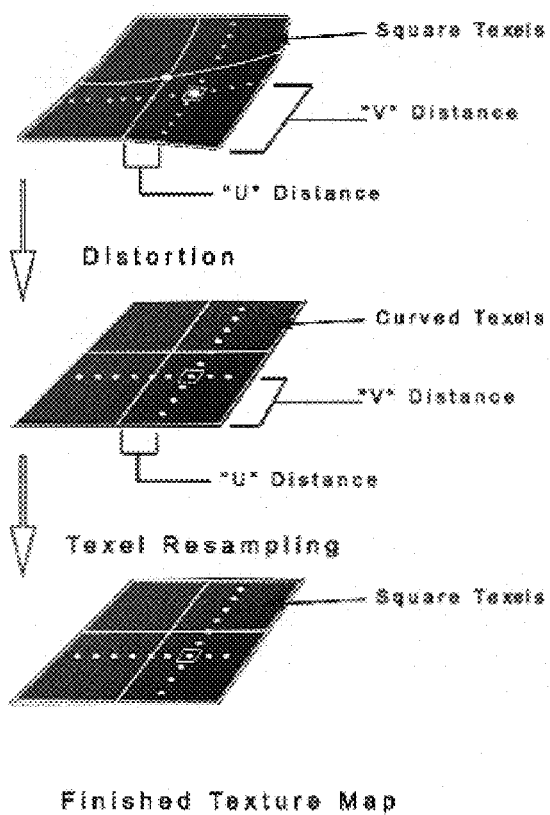
FIG. 27 shows a graphical flowchart illustrating the steps of distortion and texel resampling according to an embodiment of the present invention.

During the flattening process described herein, each quadrangle shown in FIG. 26 is converted into a two-dimensional right quadrangle. As shown in FIG. 27, after flattening, the [u,v] coordinates of the texels remain the same as before, but the texels have undergone a change in [x,y,z] position and shape. Accordingly, after the grid is flattened, the texels are resampled using bilinear, Gaussian, or similar filters to produce a finished image with square pixels.

Although foregoing discussion uses terms such as "three-dimensional grid," "grid points," "planar grid," and "grid lines," and discusses an implementation of the present invention employing an orthogonal grid, this is not meant to imply that the use of an orthogonal grid is required by the present invention. Indeed, the use of an orthogonal grid represents but one possible implementation of the present invention. Any grid pattern may be used, as long as the there is a one-to-one correspondence between the measurement points on the measurement article and the grid points in the three-dimensional grid, and a one-to-one correspondence between the grid points in the three-dimensional grid and the grid points in the planar grid data.

Figure 28:
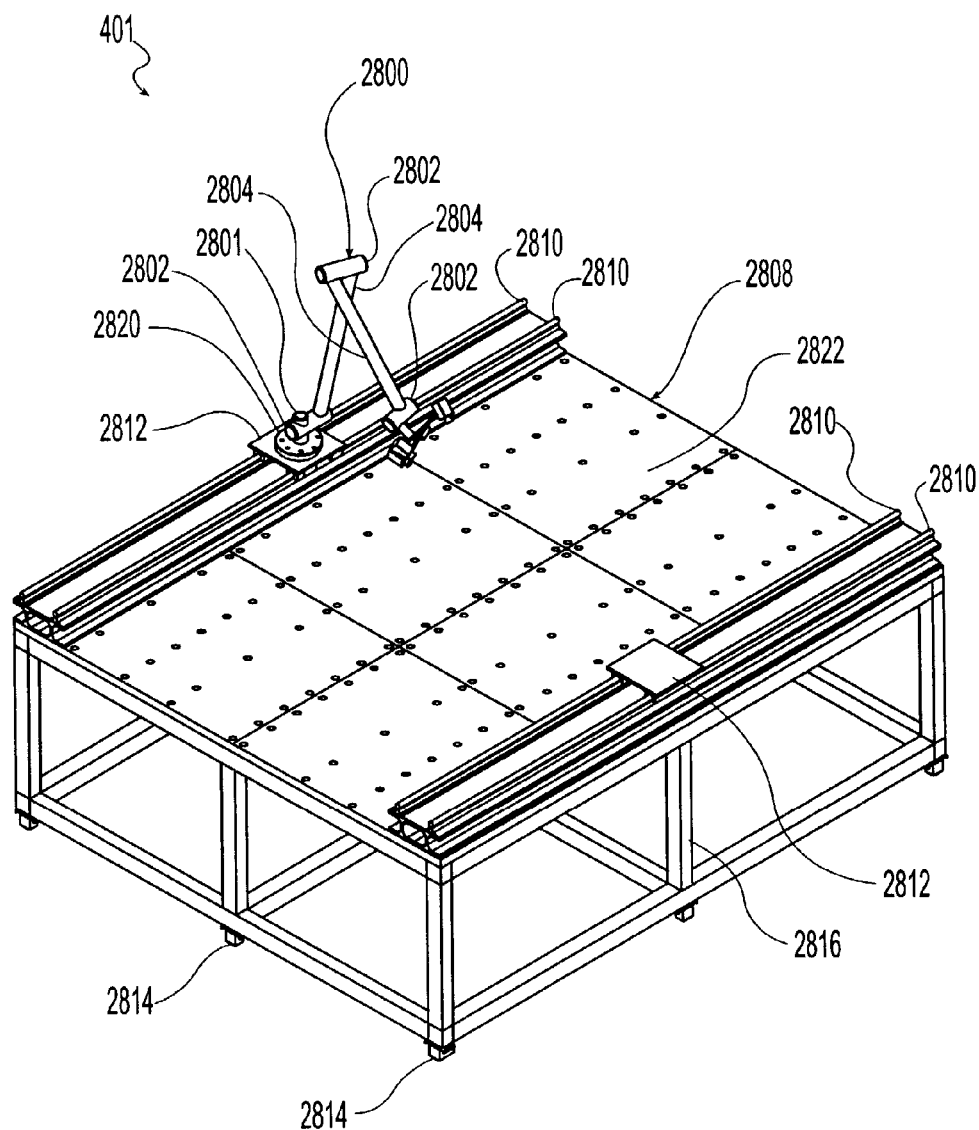
FIG. 28 shows an embodiment of a digitizing apparatus according to the present invention.
Figure 29:
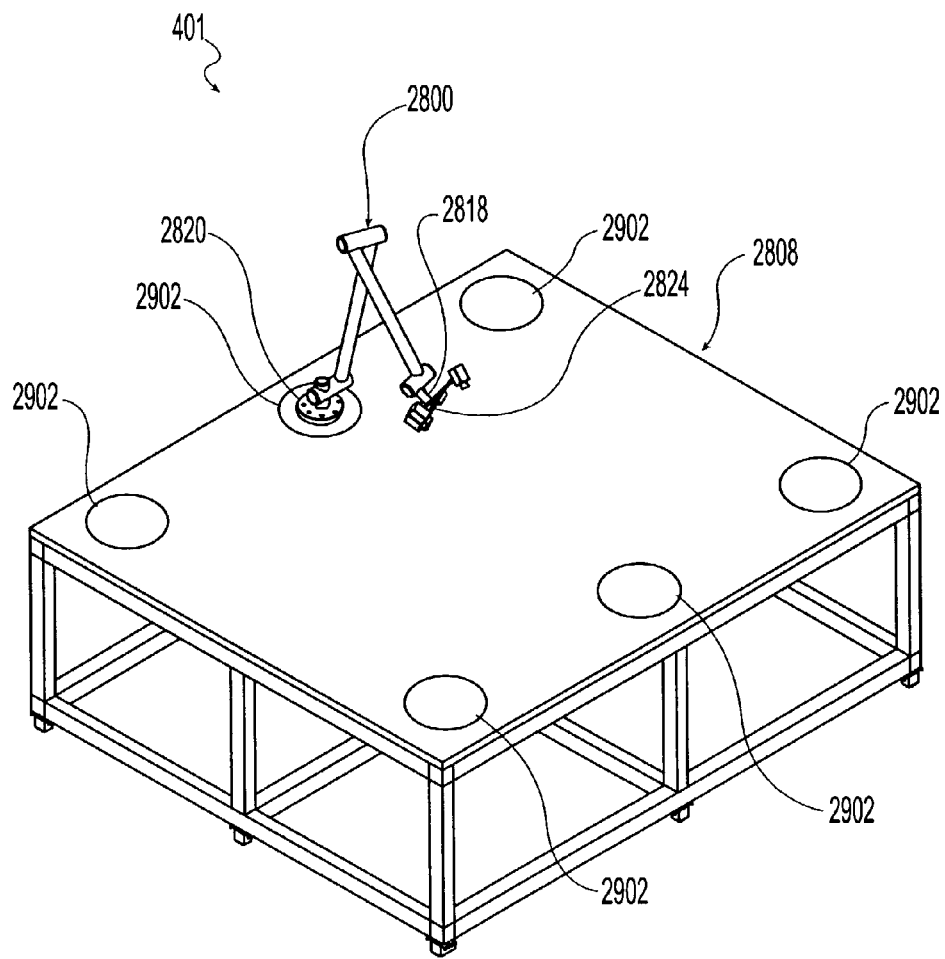
FIG. 29 shows an embodiment of a digitizing apparatus according to the present invention.
Figure 30:
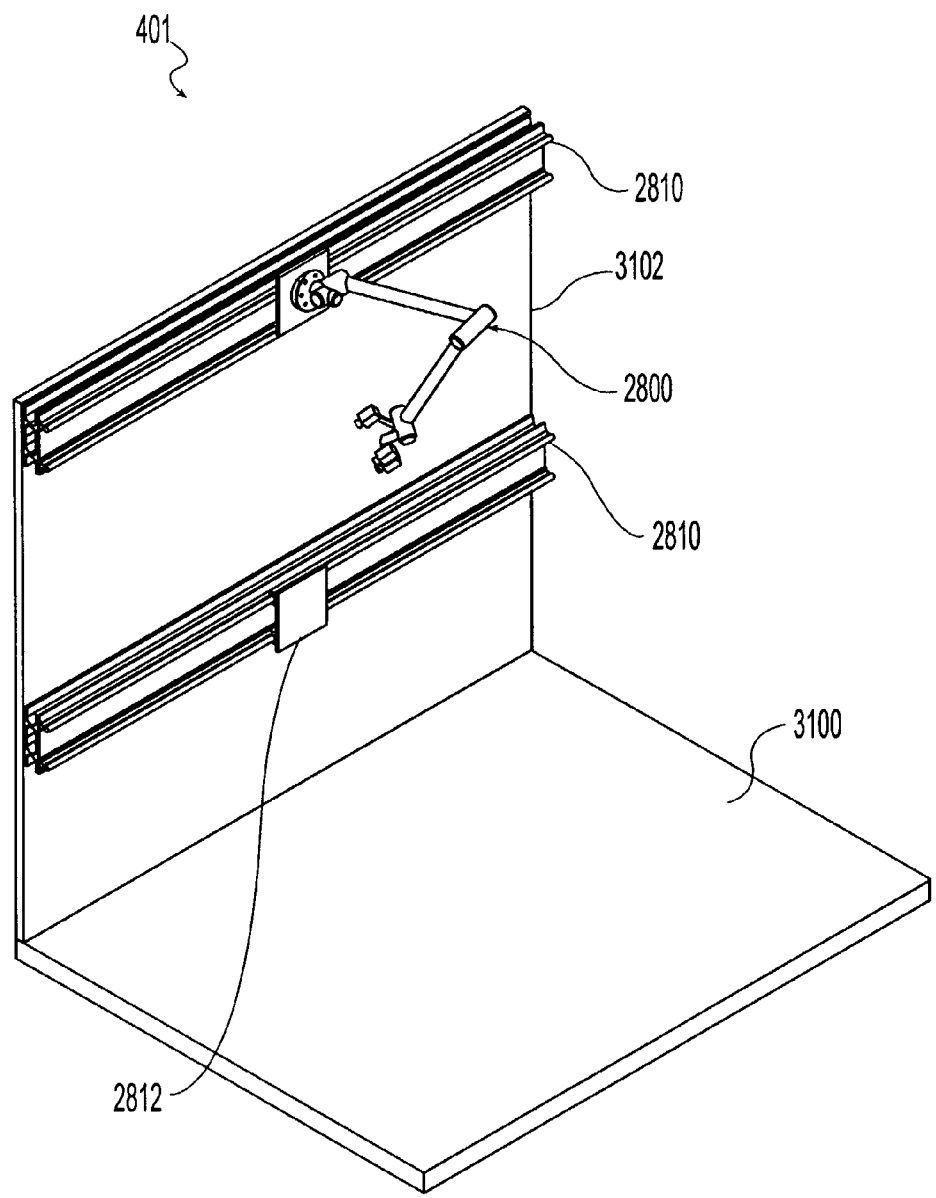
FIG. 30 shows an embodiment of a digitizing apparatus according to the present invention.

FIGS. 28, 29, and 30 show implementations of a second embodiment of digitizing apparatus 401 according to the present invention. As shown in FIGS. 28-30, the second embodiment of digitizing apparatus 401 according to the present invention comprises articulated arm 2800. Articulated arm 2800 has a first end 2818 and a second end 2820. Second end 2820 of articulated arm 2800 comprises a base that is engageable with another surface for the purpose of fixedly mounting articulated arm 2800 during operation of this embodiment of the present invention. Sensor platform 2824 comprising three sensors is mounted on first end 2818 and is used to obtain images of the target subject matter as discussed elsewhere herein. Other implementations of this second embodiment of digitizing apparatus 401 may use more or fewer sensors. In the embodiment shown in FIGS. 28-30, the sensors on sensor platform 2824 are mounted in a substantially equilateral triangle configuration. In an embodiment, sensor platform 2824 may comprise a laser pointer and/or a manual digitizing probe. In an implementation of this embodiment, camera platform 2824 is adapted to comprise a light source positioned within the triangular shape formed by the sensors mounted thereon. The light source is not shown in FIGS. 28-30. The light source illuminates the target subject matter from substantially the same direction as images of the target subject matter are obtained by the sensors. Use of such a lighting configuration may improve the results achieved by the present invention.

In the implementation of this embodiment shown in FIG. 28, digitizing apparatus 401 also comprises table assembly 2808. Table assembly 2808 comprises frame 2816, leveling feet 2814, table top 2822, a plurality of rails 2810, and a plurality of trucks 2812. In the embodiment of table assembly 2808 shown in FIG. 28, frame 2816 comprises a rigid, cage-like framework. In one implementation of this embodiment, frame 2816 is constructed of modular T-slotted aluminum framing fixedly joined using appropriate fasteners. Other methods and materials may be used provided that, after assembly, frame 2816 comprises sufficient sturdiness and rigidity to support the weight of the other components of this embodiment of digitizing apparatus 401 and the weight of the other items that will be placed upon it during operation of the present invention, and to withstand the movement of articulated arm 2800 during operation of the present invention without undue flexing or swaying of digitizing apparatus 401 or any component thereof.

Table top 2822 is installed on top of frame 2816 and affixed thereto. Table top 2822 comprises a rigid material such as wood, aluminum or rigid plastic that is capable of supporting the weight of the items placed upon it during operation of the present invention. In the embodiment of table assembly 2808 shown in FIG. 28, table top 2822 is constructed of a plurality of plastic sheet stock pieces. As in table assembly 510 of FIG. 5, table top 2822 of table assembly 2808 may comprise a plurality of threaded holes regularly spaced over the surface of table top 2822 for engagement with a clamping device such as clamping device 570 of FIG. 6. In an implementation, the components of the second embodiment of digitizing apparatus 401 are dimensioned so that target subject matter as large as 4 ft.×8 ft.×2 ft. may be imaged by the sensors on sensor platform 2824.

In the embodiment of table assembly 2808 shown in FIG. 28, leveling feet 2814 comprise a plurality of vertically adjustable supports installed on the underside of frame 2816. Leveling feet 2814 engage with the surface upon which this embodiment of digitizing apparatus 401 is installed. Leveling feet 2814 can be individually adjusted to raise and lower frame 2816 and table top 2822 in relation to the surface upon which this embodiment of digitizing apparatus 401 is installed, to provide a substantially level surface to table to 2822.

This embodiment of articulated arm 2800 comprises rigid members 2804 and hinges 2801 and 2802. In an implementation of this embodiment, hinges 2801 and 2802 can be powered by means known in the art, such as by electric motors, air pressure, or hydraulics. Hinge 2801 permits articulated arm 2800 to rotate about the z-axis. Rigid members 2804 and hinges 2802 permit sensor platform 2824 mounted on first end 2818 to be positioned in the plurality of locations relative to the target subject matter. The accuracy of articulated arm 2800 should be such that first end 2818 can be repeatably positioned within 0.010 inch. In one implementation, articulated arm 2800 comprises the articulated arm sold by Faro Technologies, Inc. under the trade name FaroArm™ Gold™, which provides seven degrees of freedom for positioning sensor platform 2824.

Table assembly 2808 of this embodiment of digitizing apparatus 401 also comprises rails 2810 mounted on opposite ends of table top 2822. Optionally, table assembly 2808 may comprise only one rail 2810 mounted on an end of table top 2822. Movably engaged with each rail 2810 is truck 2812. Each truck 2812 may travel substantially the length of rails 2810. As shown in FIG. 28, base 2820 of articulated arm 2800 is mounted on one truck 2812. Accordingly, when articulated arm 2800 is mounted on a truck 2812, articulated arm 2800 may be moved substantially the length of a rail 2810. In addition, articulated arm 2800 may be relocated from one truck 2812 to the other, depending on the imaging needs of the user. Optionally, frame 2816 is adapted to include a plurality of truck positioners (not shown in FIG. 28) adjacent to each rail 2810. Each truck 2812 may be adapted to include a truck locator (not shown in FIG. 28) engageable with the truck positioners of frame 2816. Thus, trucks 2812 may be positioned and held in place at predetermined locations along rails 2810.

FIG. 29 shows an implementation of second embodiment of digitizing apparatus 401 comprising articulated arm 2800 and table assembly 2808. In the implementation of table assembly 2808 shown in FIG. 29, rails 2810 and trucks 2812 are replaced with a plurality of mounting pads 2902. Mounting pads 2902 are engageable with second end 2820 of articulated arm 2800. Accordingly, articulated arm 2800 may be moved between the plurality of mounting pads 2902 as the practitioner's imaging needs dictate. Although six mounting pads 2902 are shown in the implementation of FIG. 29, alternative implementations may have more or fewer mounting pads 2902.

FIG. 30 shows yet another implementation of the second embodiment of digitizing apparatus 401. Shown in FIG. 30 are floor 3100, wall 3102, rails 2810, trucks 2812 and articulated arm 2800. Rails 2810 are affixed to wall 3102. Rails 2810 in this implementation are substantially parallel to each other and to floor 3100. As before, each truck 2812 is movable along substantially the entire length of its respective rail 2810. In addition, articulated arm 2800 may be relocated from one truck 2812 to another truck 2812, according to the practitioner's imaging needs. This implementation of table assembly 2808 also comprises a plurality of truck positioners (not shown in FIG. 30) adjacent to each rail 2810. Optionally, each truck 2812 may be adapted to include a truck locator (not shown in FIG. 30) engageable with the truck positioners. Thus, trucks 2812 may be positioned and held in place at predetermined locations along rails 2810.

It is within the scope of the present invention that the movement and positioning of articulated arm 2800, trucks 2812, and sensor platform 2824 in this second embodiment of digitizing apparatus may be computer-controlled.

The embodiment of digitizing apparatus 401 shown in FIGS. 28-30 should be calibrated for best results. Calibration of this embodiment of the digitizing apparatus 401 comprises the following steps:
1. Calibrate first end 2818 of articulated arm 2800 so that the position reported by first end 2818 corresponds to its actual position in three-dimensional space. Most commercially available articulated arms are provided with calibration procedures.
2. Define the coordinate system of articulated arm 2800 to coincide with the coordinate system of the target subject matter. Thus, the x, y, and z axes of articulated arm 2800 are the same as the x, y, and z axes of the target subject matter.
3. Calibrate the cameras, using a camera calibration procedure such as the camera calibration procedure described elsewhere previously herein.
4. Calibrate the relationship between first end 2818 of articulated arm 2800 and sensor platform 2824, so that the position of each camera in three-dimensional space is known at the time an image of the target subject matter is obtained by the camera.

Figure 31A:
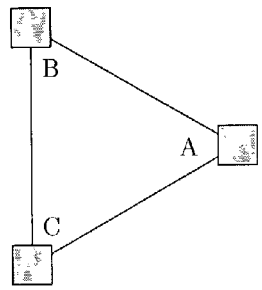
FIGS. 31A-B show block diagrams of a sensor configuration in a three sensor embodiment of the present invention.
Figure 31B:
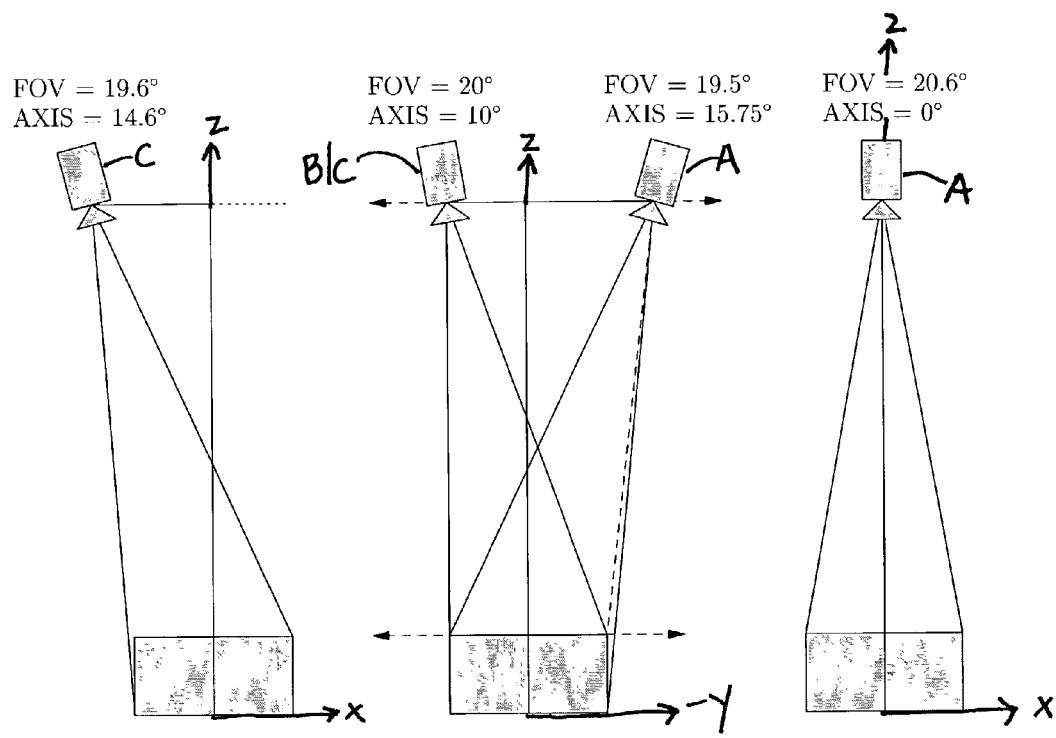

In an implementation of this second embodiment of digitizing apparatus 401 of the present invention, the sensor platform 2824 comprises three optical sensors comprising digital cameras each having a resolution of at least 1280×960 pixels, such as, for example, Sony model DFW-SX900 digital cameras. FIGS. 31A-B show block diagrams of a sensor configuration in the implementation of the second embodiment of digitizing apparatus 401. In this implementation, sensors A, B, and C are mounted in a triangular arrangement about 12 in. apart. The configuration of the cameras on sensor platform 2824 according to this implementation is designed to obtain images of portions of the target subject matter measuring about 6 in.×6 in. with approximately 1 in. of overlap on each side. To achieve the desired field of view (about 6 in.×6 in.) and depth of field (about 4 in.), the cameras should be positioned about 2 ft. above the surface to be digitized and use 15 mm C-mount lenses with an aperture (F-stop) setting of 11. The CCD device in the Sony DFW-SX900 measures 6.4 mm×4.8 mm, thus providing a field of view of about 24°×18°, which equates to a field of view parallel to the camera's image plane of about 10.2 in.×7.6 in. when the camera are positioned 2 ft. above the surface to be digitized.

In describing the sensor implementation shown in FIGS. 31A-B, the familiar Cartesian coordinate system is used. The x-axis and y-axis form a plane parallel to the camera platform. The z-axis is perpendicular to the plane formed by the x and y axes. FIG. 31A shows an overhead view of the sensor configuration. View (ii) of FIG. 31B shows a view looking into the yz plane. Views (i) and (iii) of FIG. 31B show views looking into the xz plane. The shaded region shown in each view of FIG. 31B represents the "working volume" which is simultaneously visible from all three sensors.

In the implementation shown in FIGS. 31A-B, sensor A requires a FOV of about 19.5°×20.6°, and sensors B and C each require a FOV of about 20.0°×19.6° to obtain the desired working volume. In view (i) of FIG. 31B, the AXIS measurement indicates that the angle between the optical axis of sensor C and the yz plane is about 14.6° in this implementation. View (ii) of FIG. 31B shows that the AXIS measurement for the angle between the optical axis of camera C and the xz plane is about 10° in this implementation, and that the angle between the optical axis of sensor A and the xz plane is about 15.75° in this implementation. View (iii) of FIG. 31B shows that the AXIS measurement for the angle between the optical axis of sensor A and the yz plane is about 0° in this implementation. Sensor B is not shown in FIG. 31B. However, the absolute value of the AXIS measurements of sensor B relative to the xz plane and relative to the yz plane as the same as those shown for sensor C. The arrangement of sensors A, B, and C in this implementation provides a working volume sufficient to ensure that a region of the topography of the target subject matter approximately 6 in.×6 in. (measured parallel to the camera platform's xy plane) with approximately 1 in. of overlap on each side, can be obtained anywhere within in the working volume. In this configuration, the limiting factor is recovering the z coordinate of the measurement point to a desired accuracy of about 0.025 in. or better. Increasing the distance between the cameras and the surface to be digitized increases the depth of field and reduces lighting issues, but also decreases the accuracy along the z-axis. The reverse is true for decreasing the camera height. This camera configuration should do well in recovering measurement points where $$\delta z / \sqrt{\delta x^2 + \delta y^2} \leq 1.$$

This second embodiment of digitizing apparatus 401 overcomes much of the steep slope limitation described in regard to FIG. 10. Sensor platform 2824 can be positioned so that the sensors are positioned roughly perpendicular to the surface of the target subject matter. There may still be steep slopes or deep narrow draws which cannot be readily imaged by the digitizing apparatus. However, if the sensor platform is equipped with a digitizing contact probe, the digitizing contact probe may be used to provide measurements of steep regions.

In an embodiment, digitizing apparatus 401 and computer 402 may be adapted for use in a quality assurance or a process control application. According to this adaptation, as a substrate undergoes processing (or at some time thereafter), measurement points on the substrate are recorded by digitizing apparatus 401 and stored in computer 402. The [x,y,z] coordinates of the measurement points are constructed by software mean running on computer 402, as described previously. Then, computer 402 compares the [x,y,z] coordinate of at least one measurement point to a known standard. The known standard may be the [x,y,z] coordinate desired for the measurement based on an engineering specification or some other production document. The known standard may be control limit calculated in accordance with statistical process control techniques known in the art. Based on the, comparison of the measurement point(s) coordinates to the known standard, a user may determine that the material provided by a supplier is defective, or that production process requires corrective action. In an implementation of this adaptation of digitizing apparatus 401 and computer 402, the determination of whether the production process requires corrective action may be done automatically by computer 402, with corrective actions being automatically implemented thereafter by computer 402 alone or in conjunction with other computers and production devices.

The present invention comprises a system and method for transforming the appearance of graphical images. According to the present invention, the appearance of a graphical image is transformed to adapt the graphical image to the topography of a substrate to which the graphical image is to be applied. After the graphical image is applied to the substrate, the graphical image takes on its desired appearance.

Although the present invention is discussed herein in terms of a transformed graphical image, and the images shown in the drawing figures and described herein are decorative or aesthetic in nature, the term "graphical image" is not meant to imply that the image is transformed for an aesthetic purpose, or that the image transformed has an aesthetic value. For example, a graphical image may be the image of a pattern of an adhesive or coating that is to be applied to a substrate. In another example, a graphical image may be the image of an undecorated lamination that is to be applied to a substrate. In yet another example, a graphical image may be an image of an manufacturing blueprint showing positions on a substrate where holes are to be drilled or excess substrate is to be trimmed or an item is to be attached.

The present invention may be advantageously adapted for determining the amount of distortion required for decorations to be applied to three-dimensional parts, and then for transforming a graphical image of decoration into a transformed graphical image suitable for application to a substrate comprising one of a variety of different substrate materials from which the three-dimensional part has been, or will be, fabricated. The pre-distorted decoration compensates for the three-dimensional topography of the part. The resulting product will be a three-dimensional part having a decoration that is in proportion and conforms to the three-dimensional topography of the part. This adaptation of the present invention can be used in conjunction with a variety of manufacturing processes including, without limitation, thermoforming (sheet fed and continuous), pressure forming (sheet fed and continuous), vacuum forming (sheet fed and continuous), cold forming, injection molding, compression molding, rotational molding, blow molding, stamping, ironing, drawing, pressing, stretch forming, shrink forming, punching, explosive forming (also called "high energy rate forming"), sputtering, lamination, in-mold decoration, insert-mold decoration, adhesive application, coating application, lamination, and shrink wrapping. Substrate materials that used in such processes include, without limitation, plastic resins (in the form of pellets, sheet, or film), metal (in solid or powdered form), fibrous materials, rubber, and silicon. Plastic resins including, without limitation, ABS, acrylic, polycarbonate, polyesters, polyethylene, polypropylene, polystyrene, polyvinyl chloride (PVC), polyethylene teraphthalate (PET), acrylonitrile, and other similar plastic resins may be used. Plastic resins containing a portion of recycled content also may be used as a substrate material.

Industries that may benefit from the present invention included any industry in which applied graphics are used, such as, for example, the advertising industry, communications industry, or industries concerned with object aesthetics. Graphical images transformed according to the present invention may be applied to substrates by many processes known in the art including, without limitation, painting, printing, screen printing, offset lithography, flexography, gravure, ink diffusion, pad printing, inkjet printing, laser printing, in-mold decoration, insert-mold decoration, adhesive deposition, coating deposition, lamination, and decaling.

In an embodiment, the present invention is adapted to provide pre-distorted decorations for application to flat substrates prior to forming the substrates into three-dimensional parts. The decoration then appears in proportion and conforms to the topography of the surface of the three-dimensional part after it is formed. In an adaptation of this embodiment, pre-distorted decorations are provided for application to flat substrates, but the flat substrates are formed only in two dimensions. Although the decoration remains planar after forming, the decoration appears in proportion on the surface of the two-dimensional part after it is formed.

In an embodiment, the present invention is adapted to provide pre-distorted decorations for application to a first substrate that is applied to a three-dimensional part comprising a second substrate. The first substrate may be applied to the second substrate by decaling, lamination, or another process known in the art. The decoration takes on its desired appearance as the first substrate takes on the three-dimensional contours of the second substrate.

In an embodiment, the present invention is adapted to provide pre-distorted decorations for in-mold decorating or insert-mold decorating. An appliqué comprising the pre-distorted decoration is inserted into a mold and a second substrate, for example, a plastic or metal material, then is inserted into the mold, with the pre-distorted decoration being applied to the topography of the substrate during the molding process. The decoration takes on its desired appearance as the appliqué takes on the three-dimensional contours of the molded substrate.

In an embodiment, the present invention is adapted to provide pre-distorted decorations for shrink wrapping. A pre-distorted decoration is applied to a shrink wrap plastic substrate. As the shrink wrap plastic substrate shrinks to conform to the three-dimensional contours of an underlying material, the decoration takes on its desired appearance.

In an embodiment, the present invention is adapted to comprise a system and a method for transforming the appearance of a graphical image so that when projected onto a three-dimensional surface, the graphical image appears in proportion and conforms to the topography of the surface.

Although several specific implementations of the present invention are described herein, these are intended to be exemplary in nature and are not intended to limit the scope of the present invention. For example, many parameters of the embodiments of the digitizing apparatus of the present invention may be adjusted within the scope of the present invention. For example, the digitizing apparatus sensors in the implementations of the present invention described herein comprise digital cameras having a resolution of 1280×960 pixels. This is considered the minimum acceptable camera resolution for implementations of the digitizing apparatus using digital cameras. A higher resolution camera may be used. As the camera resolution is increased, the accuracy of the recovered three-dimensional grid reflective of the topography of the measurement article is enhanced. However, higher resolution cameras also require longer to obtain an image, which may have a slight negative effect on throughput.

If the accuracy achieved with the 1280×960 pixel cameras is acceptable, then the substitution of higher resolution cameras can permit the working volume/tile size to be increased. Fewer tiles are required for a given measurement article. Throughput is increased.

For a given camera resolution, it is within the scope of the present invention to increase or decrease the baseline (the distance between cameras). Increasing the baseline tends to increase the accuracy of the three-dimensional grid, but also tends to reduce the working volume and make correspondence between the images obtained by the individual cameras more difficult. Reducing the working volume increases number of tiles required, thereby decreasing throughput. Decreasing the baseline tends to decrease the accuracy of the three-dimensional grid, but also tends to enlarge the working volume and make correspondence between the images obtained by the individual cameras easier. Enlarging the working volume decreases number of tiles required, thereby increasing throughput.

For a given camera resolution, it is within the scope of the present invention to move the cameras closer to or farther from the target subject matter. Moving the cameras closer to the target subject matter tends to decrease the working volume, but also tends to increase the accuracy. Moving the cameras farther from the target subject matter tends to increase the working volume, but also tends to decrease the accuracy.

For a given camera resolution, it is within the scope of the present invention to increase or decrease the focal length of the cameras. Increasing the focal length of the cameras tends to decrease the working volume, but also tends to increase the accuracy. Decreasing the focal length of the cameras tends to increase the working volume, but also tends to decrease the accuracy.

It is within the scope of the present invention to increase or decrease working volume or tile size. Increasing the working volume or tile size also decreases the accuracy. Conversely, reducing the working volume or tile size increase the accuracy. Throughput is proportional to working volume and tile size. Increasing the tile overlap also may increase the accuracy, but decreases throughput.

Those of skill in the art will appreciate that the various software means recited herein and in the claims may be performed by computer software and/or computer hardware. Such computer software may be written in any programming language known in the art, such as, for example, Visual Basic, Java, Perl, C, C++, Pascal, Fortran, and the like.

While this invention has been described as having a preferred design, the present invention can be further modified within the scope and spirit of this disclosure. This application is therefore intended to cover any variations, uses, or adaptations of the invention using its general principles. For example, the methods disclosed herein and in the appended claims represent one possible sequence of performing the steps thereof A practitioner of the present invention may determine in a particular implementation of the present invention that multiple steps of one or more of the disclosed methods may be combinable, or that a different sequence of steps may be employed to accomplish the same results. Each such implementation falls within the scope of the present invention as disclosed herein and in the appended claims. Furthermore, this application is intended to cover such departures from the present disclosure as come within known or customary practice in the art to which this invention pertains.

We claim:

1. A method for creating a transformed graphical image, the method comprising the steps of:

providing a measurement article having a three-dimensional topography, said measurement article comprising a plurality of measurement points, wherein said plurality of measurement points collectively are suggestive of at least part of said topography of said measurement article;

obtaining at least one electronic representation of said at least one of said plurality of measurement points with a digitizing apparatus, said digitizing apparatus comprising at least one sensor electronically interconnected with a computer memory, said digitizing apparatus adapted to relocate said at least one sensor, and said measurement article in relation to each other, wherein said electronic representation is obtained in a manner not involving contact between said at least one sensor and said measurement article;

transforming, in said computer memory, at least one graphical image into at least one transformed graphical image using said topography of said measurement article;

applying said at least one transformed graphical image onto a substrate; and producing a three-dimensional part from said substrate, wherein the an appearance of said at least one transformed graphical image on said substrate is altered such that said at least one transformed graphical image takes on an appearance that more closely resembles said graphical image, wherein said alteration only includes deformation of said substrate.

2. The method of claim 1, wherein the step of obtaining at least one electronic representation comprises the steps of:

obtaining two or more separate electronic representations with said at least one sensor, each said separate electronic representation comprising at least one of said plurality of measurement points; and combining said two or more separate electronic representations in said computer memory.

3. The method of claim 1, wherein said at least one sensor comprises at least one optical sensor.

4. The method of claim 1, further comprising, before the step of obtaining at least one electronic representation, the step of:

relocating said at least one sensor and said measurement article in relation to each other so that at least one of said at least one sensor is positioned to obtain at least one electronic representation of said at least one of said plurality of measurement points, said at least one sensor being adapted to obtain said at least one electronic representation from said changed relative position without the need for recalibration of said digitizing apparatus.

5. The method of claim 1, wherein said at least one sensor is not able to obtain at least one electronic representation of all of said plurality of measurement points simultaneously, the method further comprising the steps of:

(a) relocating said at least one sensor and said measurement article in relation to each other so that at least one of said at least one sensor is positioned to obtain at least one electronic representation of said at least one of said plurality of measurement points, said at least one sensor being adapted to obtain said at least one electronic representation from said changed relative position without the need for recalibration of said digitizing apparatus;

(b) obtaining said at least one electronic representation of at least one of said plurality of measurement points with said at least one sensor; and (c) repeating steps (a) and (b) until at least one electronic representation of each of said plurality of measurement points is stored in said computer memory.

6. The method of claim 1, wherein the step of transforming at least one graphical image into at least one transformed graphical image comprises the steps of:

creating a three-dimensional grid in said computer memory, said three-dimensional grid being reflective of said topography of said measurement article;

combining, in said computer memory, said three-dimensional grid and said at least one graphical image; and converting, in said computer memory, said three-dimensional grid into a two-dimensional grid.

7. The method of claim 6, wherein each of said at least one graphical images comprises at least one texture map, and wherein the step of combining said three-dimensional grid and said at least one graphical image comprises the steps of:

aligning said three-dimensional grid and at least one of said at least one texture maps in said computer memory; and applying said at least one of said at least one texture maps to said three-dimensional grid in said computer memory.

8. The method of claim 7, wherein the step of aligning said three-dimensional grid and at least one of said at least one texture maps comprises the steps of:

selecting at least one registration point on said three-dimensional grid; and selecting at least one registration point on at least one of said at least one texture maps, said at least one registration point on at least one of said at least one texture maps corresponding to said at least one registration point on said three-dimensional grid.

9. The method of claim 6, wherein said three-dimensional grid comprises a plurality of three-dimensional grid points, and wherein the step of converting said three-dimensional grid into a two-dimensional grid comprises the steps of:

providing planar grid data in said computer memory, said planar grid data comprising a plurality of planar grid points, said planar grid points being at least equal in number to said plurality of three-dimensional grid points in said three-dimensional grid;

corresponding, in said computer memory, said three-dimensional grid points and said planar grid points; and causing said three-dimensional grid to take on a two-dimensional appearance by translating, in computer memory, each of said three-dimensional grid points into its corresponding said planar grid point.

10. The method of claim 1, wherein the step of applying said at least one transformed graphical image onto said substrate comprises the step of:

projecting said at least one transformed graphical image onto said substrate.

11. The method of claim 1, wherein the step of applying said at least one transformed graphical image onto said substrate comprises an application process selected from a group of application processes consisting of:

painting, printing, screen printing, offset lithography, flexography, gravure, ink diffusion, pad printing, inkjet printing, laser printing, in-mold decoration, insert-mold decoration, adhesive deposition, coating deposition, lamination, and decaling.

12. The method of claim 1, wherein said substrate comprises a three-dimensional part and said transformed graphical image comprises a decoration to be applied to said three-dimensional part.

13. The method of claim 1, wherein said three-dimensional part is produced by a production process, said production process selected from a group consisting of:

sheet fed thermoforming, continuous feed thermoforming, sheet fed pressure forming, continuous feed pressure forming, sheet fed vacuum forming, continuous feed vacuum forming, cold forming, injection molding, compression molding, rotational molding, blow molding, stamping, ironing, drawing, pressing, stretch forming, shrink forming, punching, explosive forming, sputtering, in-mold decoration, insert-mold decoration, lamination, and shrink wrapping.

14. The method of claim 1 wherein said substrate comprises a material selected from a group consisting of:

solid metals, powdered metals, fibrous materials, rubber, and silicon.

15. The method of claim 1, wherein said substrate comprises a plastic material selected from a group consisting of:

ABS, acrylic, polycarbonate, polyesters, polyethylene, polypropylene, polystyrene, polyvinyl chloride, polyethylene teraphthalate, and acrylonitrile.

16. The method of claim 1, wherein said at least one transformed graphical image is formatted to be applied to said substrate by an application process selected from a group of application processes consisting of:

painting, printing, screen printing, offset lithography, flexography, gravure, ink diffusion, pad printing, inkjet printing, laser printing, in-mold decoration, insert-mold decoration, adhesive deposition, coating deposition, lamination, and decaling.

* * * * *